United States Patent
Toyotaka et al.

(10) Patent No.: US 11,733,574 B2
(45) Date of Patent: Aug. 22, 2023

(54) DISPLAY DEVICE, DISPLAY MODULE, AND ELECTRONIC DEVICE

(71) Applicant: SEMICONDUCTOR ENERGY LABORATORY CO., LTD., Atsugi (JP)

(72) Inventors: Kouhei Toyotaka, Kanagawa (JP); Kazunori Watanabe, Tokyo (JP); Susumu Kawashima, Kanagawa (JP); Kei Takahashi, Kanagawa (JP); Koji Kusunoki, Kanagawa (JP); Masataka Nakada, Tochigi (JP); Ami Sato, Tochigi (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

(21) Appl. No.: 16/956,623

(22) PCT Filed: Dec. 25, 2018

(86) PCT No.: PCT/IB2018/060595
§ 371 (c)(1),
(2) Date: Jun. 22, 2020

(87) PCT Pub. No.: WO2019/135147
PCT Pub. Date: Jul. 11, 2019

(65) Prior Publication Data
US 2021/0096409 A1    Apr. 1, 2021

(30) Foreign Application Priority Data

Jan. 5, 2018 (JP) .................................. 2018-000404
Feb. 8, 2018 (JP) .................................. 2018-021262

(51) Int. Cl.
*G02F 1/1368* (2006.01)
*G02F 1/1362* (2006.01)

(52) U.S. Cl.
CPC ...... *G02F 1/1368* (2013.01); *G02F 1/136227* (2013.01)

(58) Field of Classification Search
CPC .................... G02F 1/1368; G02F 1/136227
(Continued)

(56) References Cited

U.S. PATENT DOCUMENTS 7,674,650 B2    3/2010  Akimoto et al.
8,253,873 B2    8/2012  Sasaki et al.
(Continued)

FOREIGN PATENT DOCUMENTS

CN    104617103 A    5/2015
JP    2005-300788 A    10/2005
(Continued)

OTHER PUBLICATIONS

International Search Report (Application No. PCT/IB2018/060595) dated Apr. 9, 2019.
(Continued)

*Primary Examiner* — Charles S Chang
(74) *Attorney, Agent, or Firm* — Nixon Peabody LLP; Jeffrey L. Costellia

(57) ABSTRACT

A liquid crystal display device with a high aperture ratio is provided. The display device includes a transistor, a first insulating layer, a second insulating layer, a third insulating layer, a first conductive layer, a pixel electrode, a common electrode, and a liquid crystal layer in a pixel. The first insulating layer is positioned over a channel formation region of the transistor. The first conductive layer is positioned over the first insulating layer. The second insulating layer is positioned over the transistor, the first insulating (Continued)

layer, and the first conductive layer. The pixel electrode is positioned over the second insulating layer, the third insulating layer is positioned over the pixel electrode, the common electrode is positioned over the third insulating layer, and the liquid crystal layer is positioned over the common electrode. The common electrode includes a region overlapping with the first conductive layer with the pixel electrode positioned therebetween. The pixel includes a first connection portion where the pixel electrode is electrically connected to the transistor and a second connection portion where the first conductive layer is electrically connected to the common electrode. The first conductive layer, the pixel electrode, and the common electrode each have a function of transmitting visible light.

6 Claims, 27 Drawing Sheets

(58) Field of Classification Search
USPC .................................................. 349/48, 141
See application file for complete search history.

(56) References Cited

U.S. PATENT DOCUMENTS

| | | |
|---|---|---|
| 8,368,830 B2 | 2/2013 | Sasaki et al. |
| 8,476,625 B2 | 7/2013 | Kimura |
| 8,502,220 B2 | 8/2013 | Yamazaki et al. |
| 8,860,108 B2 | 10/2014 | Yamazaki et al. |
| 8,879,036 B2 | 11/2014 | Sasaki et al. |
| 8,999,750 B2 | 4/2015 | Kimura |
| 9,201,280 B2 | 12/2015 | Kimura |
| 9,261,747 B2 | 2/2016 | Sasaki et al. |
| 9,466,756 B2 | 10/2016 | Yamazaki et al. |
| 9,640,557 B2 | 5/2017 | Oda et al. |
| 9,865,665 B2 | 1/2018 | Eguchi et al. |
| 10,008,609 B2 | 6/2018 | Koezuka et al. |
| 10,243,005 B2 | 3/2019 | Yamazaki et al. |
| 10,303,012 B2 | 5/2019 | Chu et al. |
| 10,409,122 B2 | 9/2019 | Sasaki et al. |
| 10,504,924 B2 | 12/2019 | Yamazaki et al. |
| 10,622,426 B2 | 4/2020 | Eguchi et al. |
| 10,718,983 B2 | 7/2020 | Sasaki et al. |
| 11,016,351 B2 | 5/2021 | Sasaki et al. |
| 11,112,895 B2 | 9/2021 | Tominaga et al. |
| 11,171,190 B2 | 11/2021 | Eguchi et al. |
| 11,385,512 B2 | 7/2022 | Sasaki et al. |
| 2016/0276486 A1 | 9/2016 | Koezuka et al. |
| 2017/0168333 A1 | 6/2017 | Kubota et al. |
| 2017/0176798 A1* | 6/2017 | Ahn .................... G02F 1/13439 |
| 2017/0176826 A1* | 6/2017 | Tsuda .................... G02F 1/1368 |
| 2017/0219893 A1* | 8/2017 | Morita .................. G02F 1/1368 |
| 2019/0179440 A1* | 6/2019 | Beak ..................... G06F 3/0443 |
| 2020/0142229 A1 | 5/2020 | Kusunoki et al. |
| 2020/0193928 A1 | 6/2020 | Kawashima et al. |
| 2020/0194527 A1 | 6/2020 | Kawashima et al. |

FOREIGN PATENT DOCUMENTS

| | | |
|---|---|---|
| JP | 2007-096055 A | 4/2007 |
| JP | 2007-123861 A | 5/2007 |
| JP | 2009-058913 A | 3/2009 |
| JP | 2011-119674 A | 6/2011 |
| JP | 2014-179622 A | 9/2014 |
| JP | 2014-202838 A | 10/2014 |
| JP | 5600818 | 10/2014 |
| JP | 2015-228367 A | 12/2015 |
| JP | 2016-178299 A | 10/2016 |
| JP | 2017-010301 A | 1/2017 |
| JP | 2017-111438 A | 6/2017 |
| JP | 2017-204641 A | 11/2017 |
| KR | 2018-0093000 A | 8/2018 |
| TW | I600954 | 10/2017 |
| WO | WO-2017/098376 | 6/2017 |
| WO | WO-2017/213173 | 12/2017 |

OTHER PUBLICATIONS

Written Opinion (Application No. PCT/IB2018/060595) dated Apr. 9, 2019.
Taiwanese Office Action (Application No. 108100146) dated Jun. 21, 2022.
Chinese Office Action (Application No. 201880084907.7) dated Jan. 3, 2023.

* cited by examiner

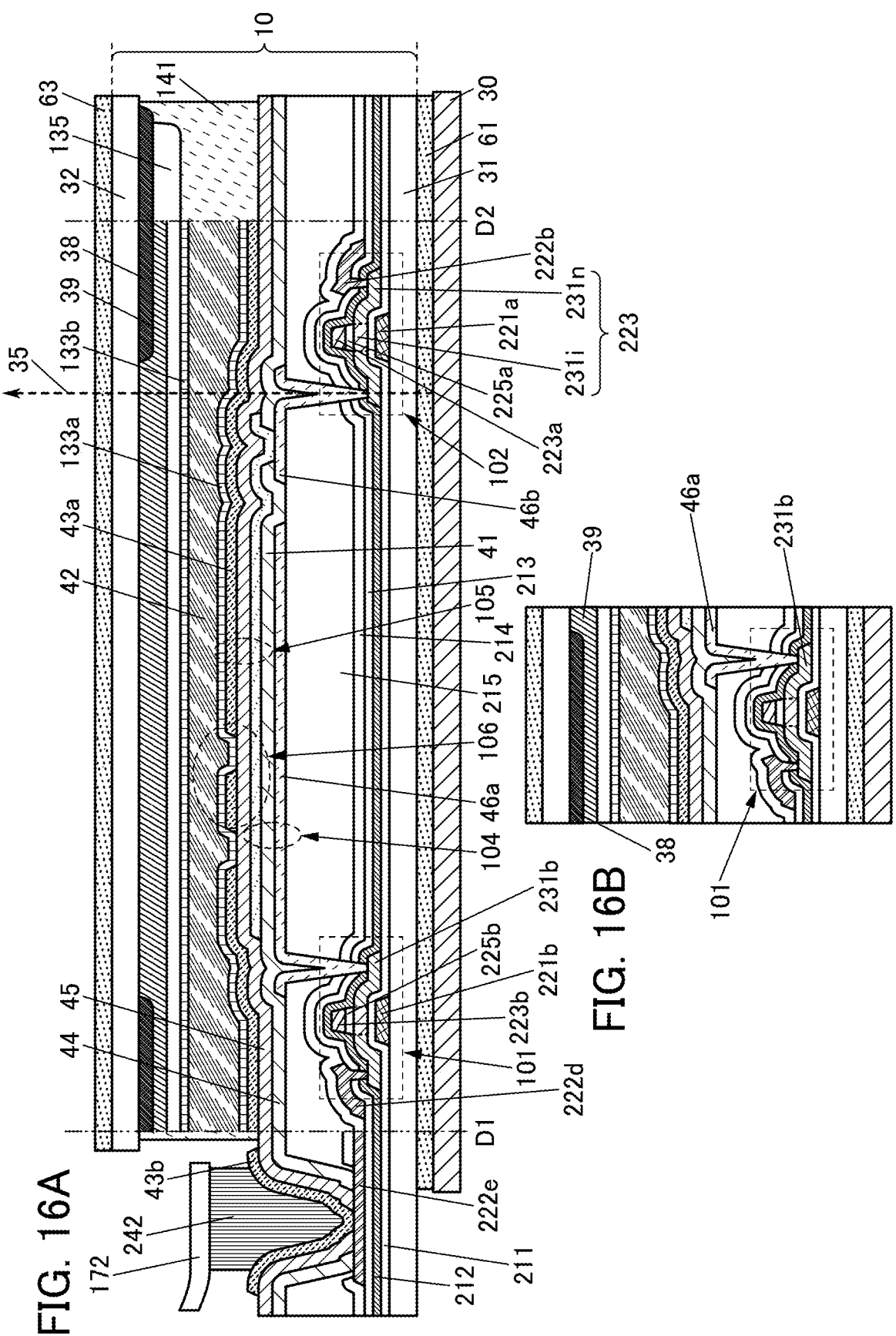

DISPLAY DEVICE, DISPLAY MODULE, AND ELECTRONIC DEVICE

TECHNICAL FIELD

Embodiments of the present invention relate to a liquid crystal display device, a display module, and an electronic device.

Note that one embodiment of the present invention is not limited to the above technical field. Examples of the technical field of one embodiment of the present invention include a semiconductor device, a display device, a light-emitting device, a power storage device, a memory device, an electronic device, a lighting device, an input device (e.g., a touch sensor), an input/output device (e.g., a touch panel), a driving method thereof, and a manufacturing method thereof.

BACKGROUND ART

Flat panel displays typified by liquid crystal display devices and light-emitting display devices are widely used as display devices. Silicon is mainly used as a semiconductor material of transistors included in these display devices; recently, a technique in which a transistor using a metal oxide is used in a pixel of a display device has also been developed.

Patent Document 1 and Patent Document 2 each disclose a technique in which a transistor including a metal oxide as a semiconductor material is used for a switching element or the like in a pixel of a display device.

Patent Document 3 discloses a memory device using a transistor with an extremely low off-state current in a memory cell.

REFERENCE

Patent Document

[Patent Document 1] Japanese Published Patent Application No. 2007-123861
[Patent Document 2] Japanese Published Patent Application No. 2007-96055
[Patent Document 3] Japanese Published Patent Application No. 2011-119674

SUMMARY OF THE INVENTION

Problems to be Solved by the Invention

An object of one embodiment of the present invention is to provide a liquid crystal display device with a high aperture ratio. Alternatively, one object of one embodiment of the present invention is to provide a liquid crystal display device with low power consumption. Alternatively, one object of one embodiment of the present invention is to provide a liquid crystal display device with high resolution. Alternatively, one object of one embodiment of the present invention is to provide a highly reliable display device. Alternatively, one object of one embodiment of the present invention is to provide a liquid crystal display device which can operate stably at a wide range of temperatures.

Note that the descriptions of these objects do not disturb the existence of other objects. One embodiment of the present invention does not need to achieve all the objects. Other objects can be derived from the descriptions of the specification, the drawings, and the claims.

Means for Solving the Problems

A display device of one embodiment of the present invention includes a first transistor, a first insulating layer, a second insulating layer, a third insulating layer, a first conductive layer, a pixel electrode, a common electrode, and a liquid crystal layer in a pixel. The first insulating layer is positioned over a channel formation region of the first transistor. The first conductive layer is positioned over the first insulating layer. The second insulating layer is positioned over the first transistor, the first insulating layer, and the first conductive layer. The pixel electrode is positioned over the second insulating layer. The third insulating layer is positioned over the pixel electrode. The common electrode is positioned over the third insulating layer. The liquid crystal layer is positioned over the common electrode. The common electrode includes a region overlapping with the first conductive layer with the pixel electrode therebetween. The pixels further includes a first connection portion and a second connection portion. In the first connection portion, the pixel electrode is electrically connected to the first transistor. In the second connection portion, the first conductive layer is electrically connected to the common electrode. The first conductive layer, the pixel electrode, and the common electrode each have a function of transmitting visible light. In the first connection portion, the first transistor preferably has a function of transmitting visible light.

In the second connection portion, the first conductive layer preferably includes a region in contact with the common electrode.

Alternatively, a display device of one embodiment of the present invention includes a first transistor, a second transistor, a first insulating layer, a second insulating layer, a third insulating layer, a first conductive layer, a pixel electrode, a common electrode, and a liquid crystal layer in a pixel. The first insulating layer is positioned over a channel formation region of the first transistor. The first conductive layer is positioned over the first insulating layer. The second insulating layer is positioned over the first transistor, the second transistor, the first insulating layer, and the first conductive layer. The pixel electrode is positioned over the second insulating layer. The third insulating layer is positioned over the pixel electrode. The common electrode is positioned over the third insulating layer. The liquid crystal layer is positioned over the common electrode. The common electrode includes a region overlapping with the first conductive layer with the pixel electrode therebetween. The pixel further includes a first connection portion and a second connection portion. In the first connection portion, the pixel electrode is electrically connected to the first transistor. In the second connection portion, the first conductive layer is electrically connected to the second transistor. The first conductive layer, the pixel electrode, and the common electrode each have a function of transmitting visible light. In the first connection portion, the first transistor preferably has a function of transmitting visible light.

The pixel may further include a second conductive layer. The second conductive layer is positioned over the first insulating layer. The first conductive layer and the second conductive layer can be formed using the same process and the same material. In the first connection portion, the pixel electrode preferably includes a region in contact with the second conductive layer and the second conductive layer preferably includes a region in contact with a source or a drain of the first transistor. The source or the drain of the first transistor preferably has a function of transmitting visible light.

The first transistor may include a gate over the first insulating layer. At this time, the first insulating layer functions as a gate insulating layer of the first transistor. The gate and the first conductive layer can be formed using the same process and the same material. Alternatively, the first insulating layer may be positioned over the first transistor.

The area of a region where the pixel electrode and the first conductive layer overlap with each other is preferably larger than the area of a region where the pixel electrode and the common electrode overlap with each other.

The thickness of the second insulating layer between the first conductive layer and the pixel electrode is preferably smaller than the thickness of the third insulating layer between the pixel electrode and the common electrode.

The display device of one embodiment of the present invention preferably has a function of performing display by a field-sequential driving method. At this time, the liquid crystal layer preferably contains a liquid crystal material whose rotational viscosity coefficient is higher than or equal to 10 mPa·sec and lower than or equal to 150 mPa·sec.

One embodiment of the present invention is a display module including the display device having any of the above structures, where a connector such as a flexible printed circuit board (hereinafter also referred to as FPC) or a TCP (Tape Carrier Package) is attached or an integrated circuit (IC) is implemented by a COG (Chip On Glass) method, a COF (Chip On Film) method, or the like.

One embodiment of the present invention is an electronic device including the above module and at least one of an antenna, a battery, a housing, a camera, a speaker, a microphone, and an operation button.

Effect of the Invention

One embodiment of the present invention can provide a liquid crystal display device with a high aperture ratio. Another embodiment of the present invention can provide a liquid crystal display device with low power consumption. Another embodiment of the present invention can provide a liquid crystal display device with high resolution. Another embodiment of the present invention can provide a liquid crystal display device with high reliability. Another embodiment of the present invention can provide a liquid crystal display device which can operate stably at a wide range of temperatures.

Note that the descriptions of the effects do not disturb the existence of other effects. One embodiment of the present invention does not need to have all the effects. Other effects can be derived from the descriptions of the specification, the drawings, and the claims.

BRIEF DESCRIPTION OF THE DRAWINGS

FIG. 16 Cross-sectional views illustrating an example of a display device.

MODE FOR CARRYING OUT THE INVENTION

Figure 1A:
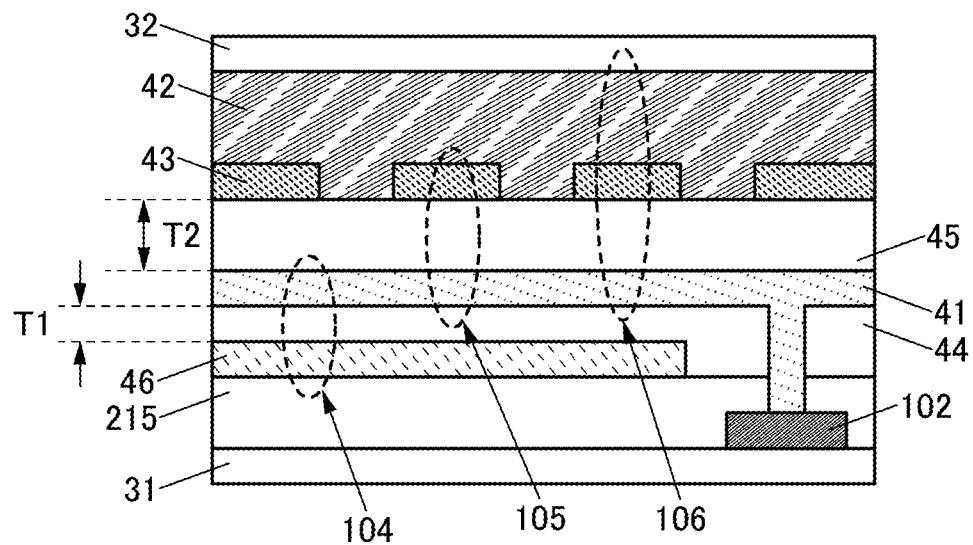
FIG. 1 Cross-sectional views illustrating examples of display devices.

Embodiments are described in detail with reference to the drawings. Note that the present invention is not limited to the following description, and it is be readily appreciated by those skilled in the art that modes and details of the present invention can be modified in various ways without departing from the spirit and scope of the present invention. Thus, the present invention should not be construed as being limited to the descriptions in the following embodiments.

Note that in structures of the present invention described below, the same portions or portions having similar functions are denoted by the same reference numerals in different drawings, and a description thereof is not repeated. Furthermore, the same hatch pattern is used for the portions having similar functions, and the portions are not especially denoted by reference numerals in some cases.

In addition, the position, size, range, or the like of each structure illustrated in drawings does not represent the actual position, size, range, or the like in some cases for easy understanding. Therefore, the disclosed invention is not necessarily limited to the position, size, range, or the like disclosed in the drawings.

Note that the term "film" and the term "layer" can be interchanged with each other depending on the case or circumstances. For example, the term "conductive layer" can be changed into the term "conductive film". As another example, the term "insulating film" can be changed into the term "insulating layer".

Embodiment 1

In this embodiment, display devices of embodiments of the present invention are described with reference to FIG. 1 to FIG. 12.

<Structure Example 1 of Display Device>

FIG. 1(A) shows a cross-sectional view of a transmissive liquid crystal display device. The liquid crystal display device illustrated in FIG. 1(A) includes a substrate 31, a transistor 102, an insulating layer 215, a conductive layer 46, an insulating layer 44, a pixel electrode 41, an insulating layer 45, a common electrode 43, a liquid crystal layer 42, and a substrate 32.

The transistor 102 is positioned over the substrate 31. The insulating layer 215 is positioned over the transistor 102. The conductive layer 46 is positioned over the insulating layer 215. The insulating layer 44 is positioned over the transistor 102, the insulating layer 215, and the conductive layer 46. The pixel electrode 41 is positioned over the insulating layer 44. The insulating layer 45 is positioned over the pixel electrode 41. The common electrode 43 is positioned over the insulating layer 45. The liquid crystal layer 42 is positioned over the common electrode 43. The common electrode 43 includes a region overlapping with the conductive layer 46 with the pixel electrode 41 positioned therebetween. The pixel electrode 41 is electrically connected to a source or a drain of the transistor 102. The conductive layer 46, the pixel electrode 41, and the common electrode 43 each have a function of transmitting visible light.

In the liquid crystal display device of this embodiment, the pixel electrode 41 and the common electrode 43 are stacked with the insulating layer 45 positioned therebetween, and operates in an FFS (Fringe Field Switching) mode. The pixel electrode 41, the liquid crystal layer 42, and the common electrode 43 can function as a liquid crystal element 106.

The conductive layer 46, the insulating layer 44, and the pixel electrode 41 can function as one capacitor 104. The pixel electrode 41, the insulating layer 45, and the common electrode 43 can function as one capacitor 105. The liquid crystal display device in this embodiment thus includes two capacitors in a pixel. As a result, the storage capacity of the pixel can be increased.

The two capacitors each include a material transmitting visible light and a region where they overlap with each other. Accordingly, the pixel can achieve high aperture ratio and high storage capacity.

When the aperture ratio of the transmissive liquid crystal display device (also referred to as the aperture ratio of a pixel) is increased, a high-resolution liquid crystal display device can be obtained. Furthermore, a higher aperture ratio increases the light extraction efficiency (or the transmittance of the pixel). Thus, the power consumption of the liquid crystal display device can be reduced.

With the increase in the storage capacity of the pixel, stable display can be performed even when a liquid crystal element or the like has a large leakage current. In addition, a liquid crystal material with a high capacity can be driven. Therefore, the range of choices of the liquid crystal materials can be widened.

With the increase in the storage capacity of the pixel, the gray level of the pixel can be retained for a long time. Specifically, with the increase in the storage capacity of the pixel, an image signal that has been written in the previous period can be retained without rewriting an image signal every frame period, and for example, the gray level of pixel can be retained for several frame periods or several ten frame periods.

The capacity of the capacitor 104 is preferably greater than the capacity of the capacitor 105. For example, the area of a region where the pixel electrode 41 overlaps with the conductive layer 46 is preferably larger than the area of a region where the pixel electrode 41 and the common electrode 43 overlap with each other. It is preferable that the thickness T1 of the insulating layer 44 between the conductive layer 46 and the pixel electrode 41 be thinner than the thickness T2 of the insulating layer 45 positioned between the pixel electrode 41 and the common electrode 43.

Figure 1B:
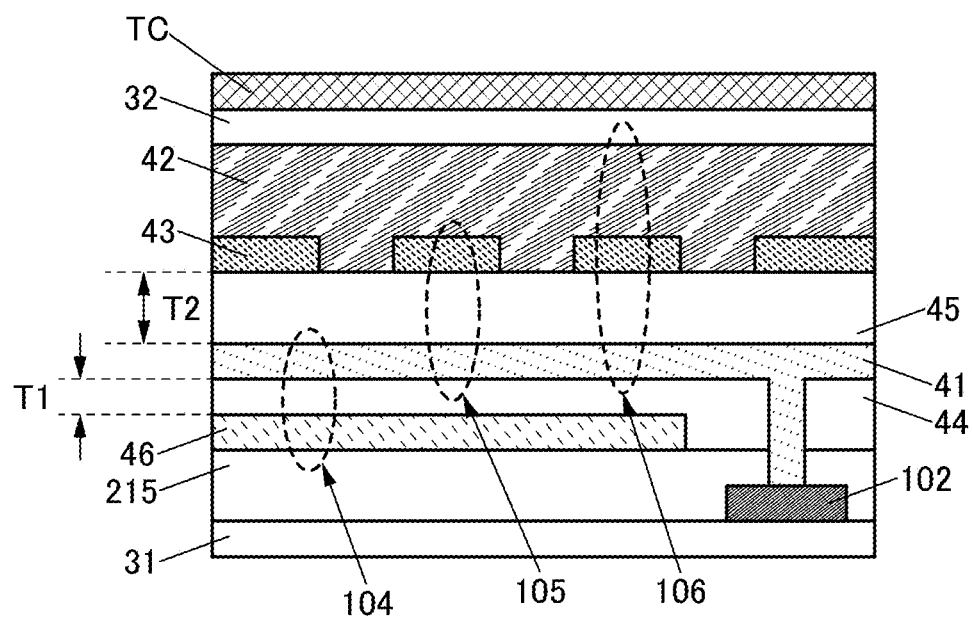

The structures of the display devices of this embodiment can be used also for a touch panel. FIG. 1(B) illustrates an example of the display device in FIG. 1(A) including a touch sensor TC. The sensitivity of the touch sensor TC can be increased by providing the touch sensor TC on a position close to the display surface of the display device.

There is no particular limitation on a detection element (also referred to as a sensor element) included in the touch panel of one embodiment of the present invention. A variety of sensors that can sense proximity or touch of a sensing target such as a finger or a stylus can be used as the sensor element.

For example, a variety of types such as a capacitive type, a resistive type, a surface acoustic wave type, an infrared type, an optical type, and a pressure-sensitive type can be used for the sensor.

Examples of the capacitive sensor element include a surface capacitive sensor element and a projected capacitive sensor element. Examples of the projected capacitive sensor element include a self-capacitive sensor element and a mutual capacitive sensor element. The use of a mutual capacitive sensor element is preferable because multiple points can be sensed simultaneously.

The touch panel of one embodiment of the present invention can have a variety of structures, including a structure in which a display device and a sensor element that are separately formed are attached to each other and a structure in which electrodes and the like included in a sensor element are provided on one or both of a substrate supporting a display element and a counter substrate.

<Structure Example 2 of Display Device>

Structure examples of a display device including one transistor and two capacitors in a pixel are described with reference to FIG. 2 to FIG. 7.

<<Circuit>>

Figure 2A:
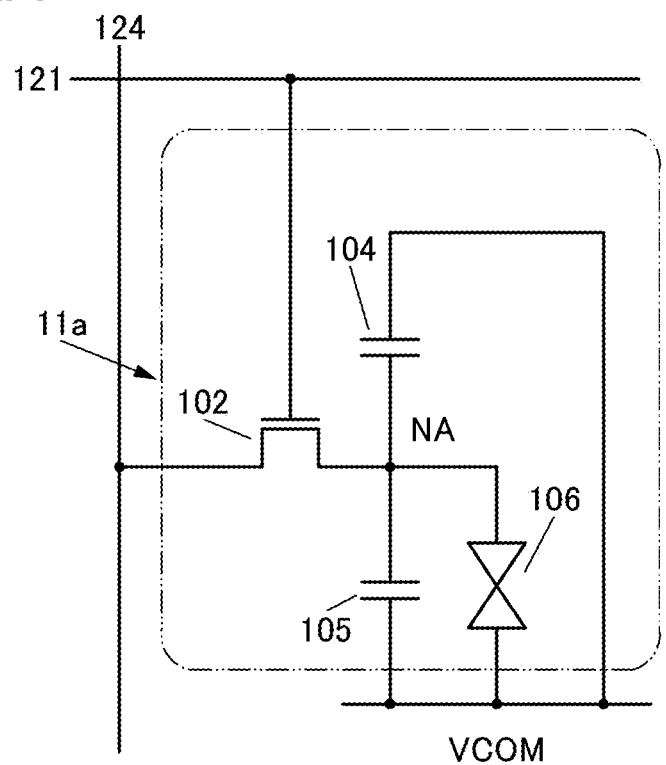
FIG. 2 Circuit diagrams illustrating examples of a pixel.
Figure 2B:
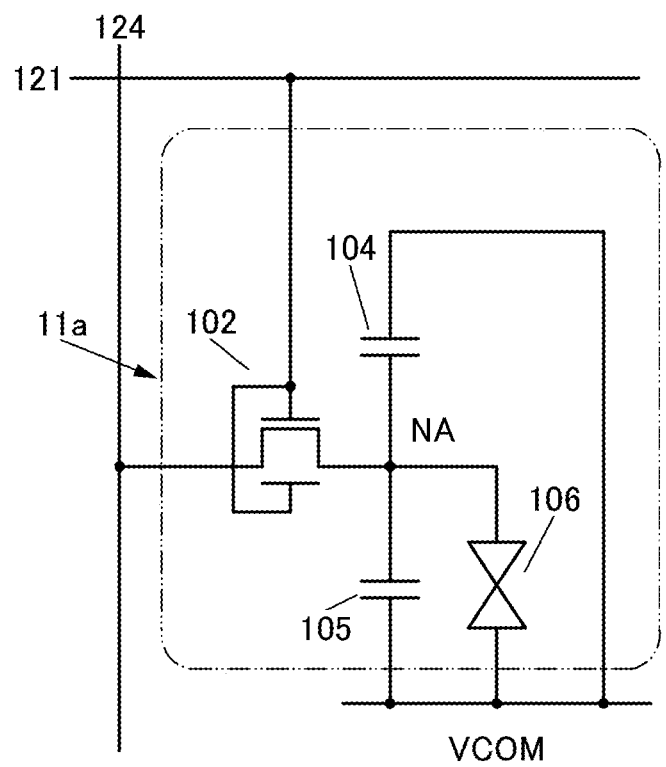

FIGS. 2(A) and 2(B) illustrate circuit diagrams of a pixel 11a.

The pixel 11a illustrated in FIGS. 2(A) and 2(B) includes the transistor 102, the capacitor 104, the capacitor 105, and the liquid crystal element 106. A wiring 121 and a wiring 124 are connected to the pixel 11a.

FIG. 2(A) illustrates an example in which the transistor 102 does not have a back gate, and FIG. 2(B) illustrates an example in which the transistor 102 has a back gate. Although the back gate is electrically connected to the gate of the transistor in FIG. 2(B), the connection of the back gate is not limited thereto.

One of a source and a drain of the transistor 102 is electrically connected to one electrode of the capacitor 104, one electrode of the capacitor 105, and one electrode of the liquid crystal element 106.

Here, a node at which the one of the source and the drain of the transistor 102, the one electrode of the capacitor 104, the one electrode of the capacitor 105, and the one electrode of the liquid crystal element 106 are connected is referred to as the node NA.

A gate of the transistor 102 is electrically connected to the wiring 121. The other of the source and the drain of the transistor 102 is electrically connected to the wiring 124. Each of the other electrode of the capacitor 104, the other electrode of the capacitor 105, and the other electrode of the liquid crystal element 106 is electrically connected to a common wiring VCOM. A given potential can be supplied to the common wiring VCOM.

The wiring 121 can be referred to as a scan line and has a function of controlling the operation of the transistor. The wiring 124 can function as a signal line for supplying an image signal.

The use of a transistor with extremely low off-state current as the transistor 102 enables long-term retention of the potential of the node NA. As the transistor, a transistor using a metal oxide in a channel formation region (hereinafter referred to as an OS transistor) can be used, for example.

A transistor containing silicon in a channel formation region (hereinafter referred to as a Si transistor) may be used as the transistor included in the pixel. Examples of the Si transistor include a transistor containing amorphous silicon and a transistor containing crystalline silicon (typically, low-temperature polysilicon or single crystal silicon).

For example, in the case where an image signal is rewritten every frame period, an OS transistor or a Si transistor may be used. When the potential of the node NA needs to be retained for a long time, an OS transistor, rather than a Si transistor, is preferably used.

<<Top Surface Layout of Display Module>>

Figure 3:
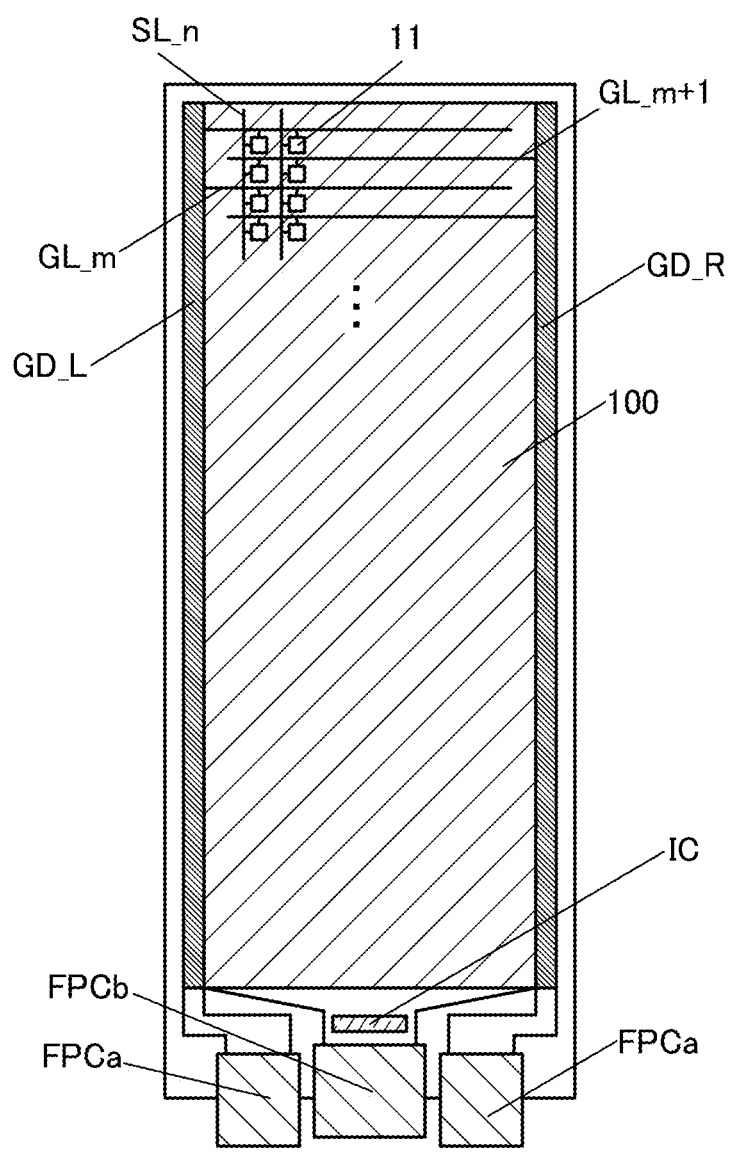
FIG. 3 A top view illustrating an example of a display device.

FIG. 3 is a top view of a display module.

The display module illustrated in FIG. 3 includes a display device, an integrated circuit (IC) connected to the display device, and flexible printed circuit boards (FPCa and FPCb).

The display device includes a display region 100, a gate driver GD_L, and a gate driver GD_R.

The display region 100 includes a plurality of pixels 11 and has a function of displaying images.

The pixel 11 can also be referred to as a subpixel. For example, a full-color image can be displayed in the display region 100 when one pixel unit is composed of a subpixel exhibiting a red color, a subpixel exhibiting a green color, and a subpixel exhibiting a blue color. Note that the colors exhibited by subpixels are not limited to red, green, and blue. For example, a subpixel exhibiting a color such as white, yellow, magenta, or cyan may be used for the pixel unit. Note that in this specification, a subpixel and the like is simply referred to as a pixel in some cases.

The display device may include one or a plurality of a scan line driver circuit (a gate driver), a signal line driver circuit (a source driver), and a driver circuit for a touch sensor. One or a plurality of these may be externally attached. The display device illustrated in FIG. 3 incorporates a gate driver and is externally provided with an IC including a source driver.

One of the gate driver GD_L and the gate driver GD_R has a function of controlling the pixels in the odd-numbered rows and the other has a function of controlling the pixels in even-numbered rows. For example, the pixels in an m-th row are connected to a scan line GL_m and controlled by the gate driver GD_L. The pixels in an (m+1)-th row are connected to a scan line GL_m+1 and controlled by the gate driver GD_R. A signal line SL_n in an n-th column is alternately connected to the pixel 11 electrically connected to the gate driver GD_L and the pixel 11 electrically connected to the gate driver GD_R. The pitch of wirings connected to one gate driver can be widened by separately providing the gate drivers on two opposite sides. In the case where the gate driver is provided only on one side, a non-display region on the side is wider. Thus, the gate driver is provided separately on two side of the display device, whereby a non-display region of the display device can be made smaller and the bezel can be narrowed.

Signals and power are supplied from the outside to the gate driver GD_L and the gate driver GD_R through the FPCa. A signal and power are supplied from the outside to the IC through the FPCb.

<<Top Surface Layout of Pixel>>

Figure 4A:
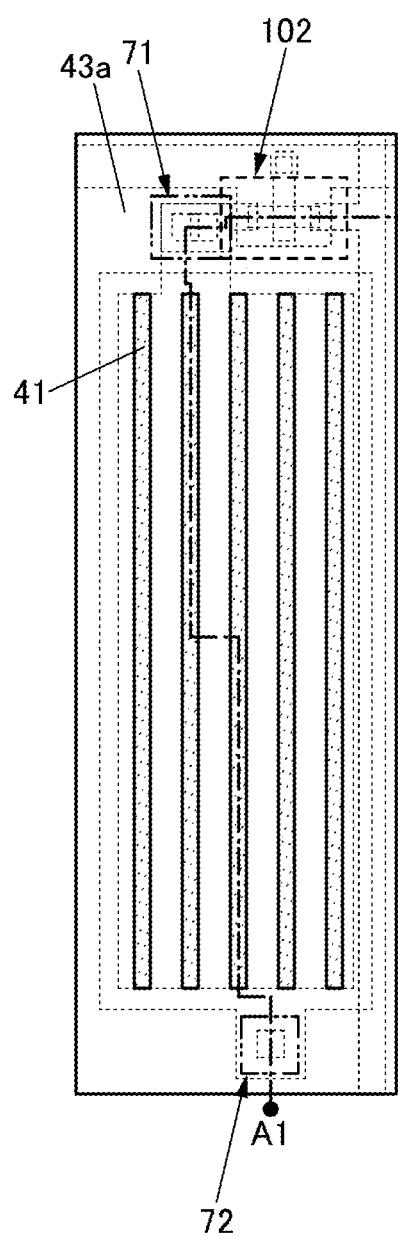
FIG. 4 Top views illustrating an example of a pixel.
Figure 4B:
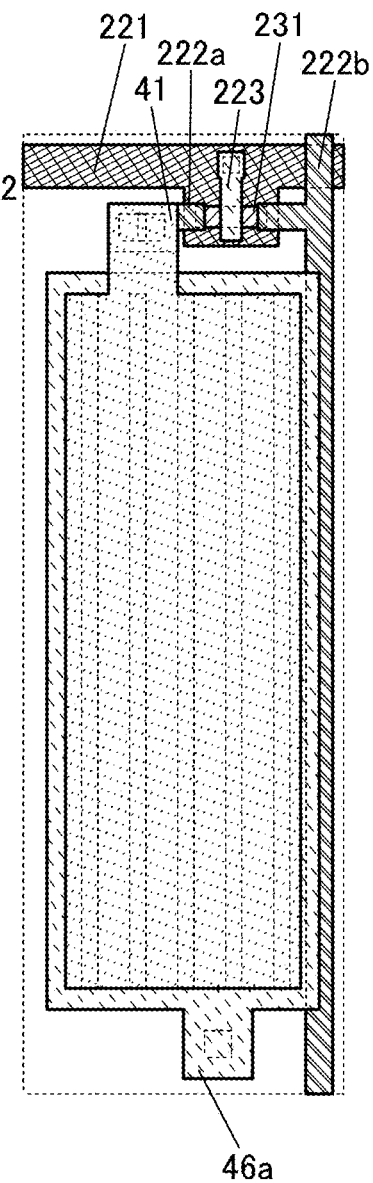
Figure 4C:
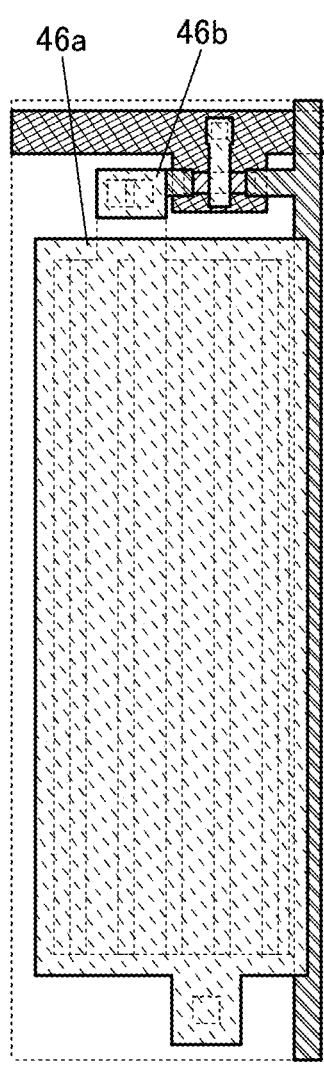

FIGS. 4(A) to 4(C) are top views of a pixel. FIG. 4(A) is a top view of a stacked-layer structure from a gate 221 to a common electrode 43a, which is seen from the common electrode 43a side. FIG. 4(B) is a top view of the stacked-layer structure of FIG. 4(A) except the common electrode 43a, and FIG. 4(C) is a top view of the stacked-layer structure of FIG. 4(A) except the common electrode 43a and the pixel electrode 41.

The pixel includes a connection portion 71 and a connection portion 72. In the connection portion 71, the pixel electrode 41 is electrically connected to the transistor 102. Specifically, a conductive layer 222a functioning as the source or the drain of the transistor 102 is in contact with a conductive layer 46b, and the conductive layer 46b is in contact with the pixel electrode 41. Note that the conductive layer 46b is not necessarily provided, and the conductive layer 222a may be in contact with the pixel electrode 41. In the connection portion 72, a conductive layer 46a is electrically connected to the common electrode 43a. Specifically, the conductive layer 46a is in contact with the common electrode 43a.

The common electrode 43a may have one or a plurality of slits or a comb-like shape top surface. The common electrode 43a illustrated in FIG. 4(A) has atop surface shape including a plurality of slits. The pixel electrode 41 includes both a region overlapping with the common electrode 43a and a region not overlapping with the common electrode 43a. Both these two regions are provided in a position overlapping with a coloring layer 39 (see FIG. 5).

The pixel electrode 41 may have one or a plurality of slits or a comb-like shape top surface. The pixel electrode 41 is preferably formed to have a large area because an area overlapping with the common electrode 43a can be large. For this reason, the pixel electrode 41 is preferably formed so as to have an island shape with no slit.

<<Cross-Sectional Structure of Display Module>>

Figure 5:
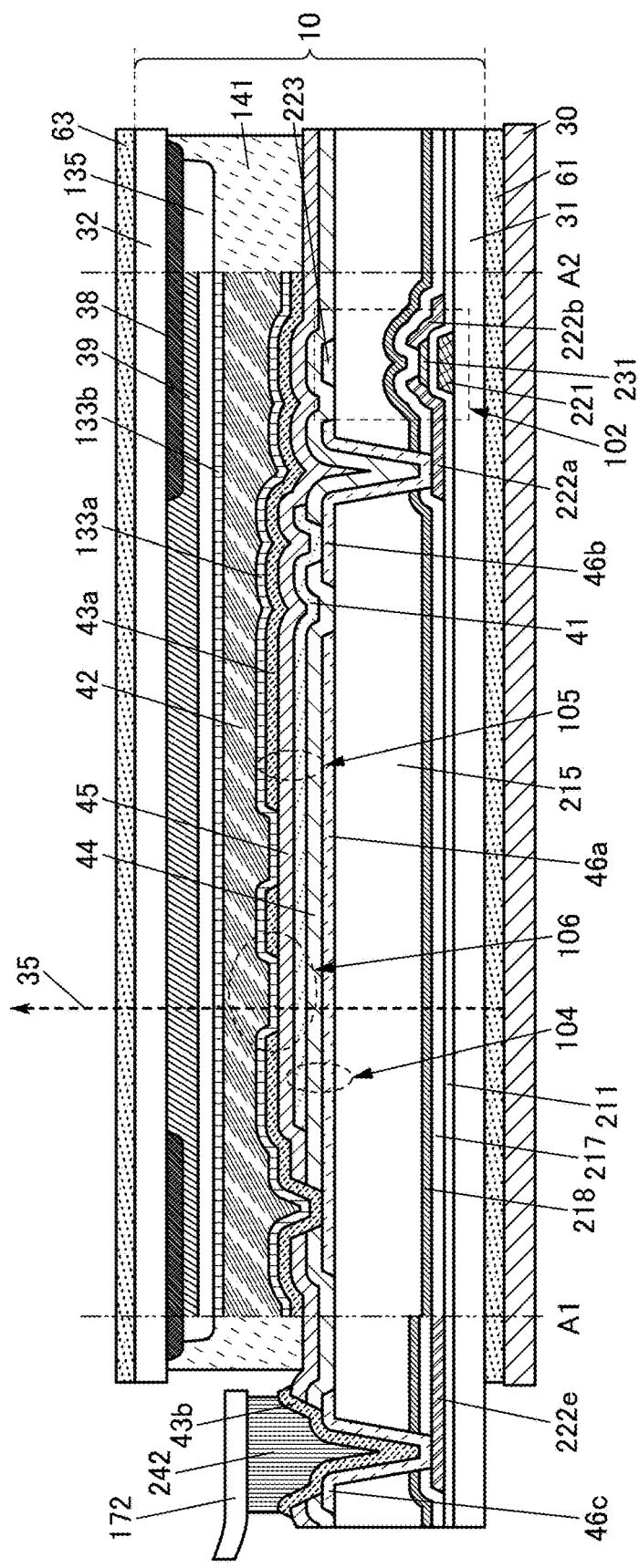
FIG. 5 A cross-sectional view illustrating an example of a display device.

FIG. 5 is a cross-sectional view of a display module. Note that the cross-sectional structure of the pixel corresponds to the cross-sectional view taken along dashed-dotted line A1-A2 in FIG. 4(A).

The display module illustrated in FIG. 5 includes a display device 10, a polarizing plate 61, a polarizing plate 63, a backlight unit 30, an FPC 172, and the like.

Light 35 emitted from a light source included in the backlight unit 30 is transmitted through the polarizing plate 61, the display device 10, and the polarizing plate 63, in this order, and is emitted to the outside of the display module. As materials for these layers that transmit the light 35, materials transmitting visible light are used.

The display device 10 includes the coloring layer 39; thus, a color image can be displayed. In the light 35 emitted from the light source included in the backlight unit 30, light other than a particular wavelength region is absorbed by the coloring layer 39. Thus, for example, light emitted from the red pixel (subpixel) to the outside of the display module is red, light emitted from the green subpixel (subpixel) to the outside of the display module is green, and light emitted from the blue subpixel (subpixel) to the outside of the display module is blue.

The display device 10 is an active matrix liquid crystal display device using an FFS mode. The display device 10 is a transmissive liquid crystal display device.

The display device 10 includes the substrate 31, the substrate 32, the transistor 102, the conductive layer 46a, the conductive layer 46b, a conductive layer 46c, the insulating layer 44, the insulating layer 45, the pixel electrode 41, the liquid crystal layer 42, the common electrode 43a, a conductive layer 43b, a conductive layer 222e, an alignment film 133a, an alignment film 133b, an adhesive layer 141, an overcoat 135, a light-blocking layer 38, the coloring layer 39, and the like.

The transistor 102 is provided over the substrate 31. The transistor 102 includes the gate 221, a gate insulating layer 211, a semiconductor layer 231, the conductive layer 222a, a conductive layer 222b, an insulating layer 217, an insulating layer 218, the insulating layer 215, and a gate 223. One of the conductive layer 222a and the conductive layer 222b functions as a source and the other functions as a drain. The insulating layer 217, the insulating layer 218, and the insulating layer 215 function as gate insulating layers.

Here, an example in which a metal oxide is used for the semiconductor layer 231 is described.

The gate insulating layer 211 and the insulating layer 217 in contact with the semiconductor layer 231 are preferably oxide insulating layers. In the case where the gate insulating layer 211 or the insulating layer 217 has a stacked-layer structure, at least a layer in contact with the semiconductor layer 231 is preferably an oxide insulating layer. Accordingly, generation of oxygen vacancies in the semiconductor layer 231 can be suppressed, and thus, the reliability of the transistor can be improved.

The insulating layer 218 is preferably a nitride insulating layer. As a result, entry of impurities into the semiconductor layer 231 can be suppressed, and the reliability of the transistor can be improved.

The insulating layer 215 preferably has a planarization function, and is preferably an organic insulating layer, for example. Note that the insulating layer 215 is not necessarily formed, and the conductive layer 46a may be formed over and in contact with the insulating layer 218.

The conductive layer 46b is positioned over the insulating layer 215, the insulating layer 44 is positioned over the conductive layer 46b, and the pixel electrode 41 is positioned over the insulating layer 44. The pixel electrode 41 is electrically connected to the conductive layer 222a. Specifically, the conductive layer 222a is in contact with the conductive layer 46b, and the conductive layer 46b is in contact with the pixel electrode 41.

The conductive layer 46a is positioned over the insulating layer 215. The insulating layer 44 and the insulating layer 45 are positioned over the conductive layer 46a. The common electrode 43a is positioned over the insulating layer 45. The common electrode 43a is electrically connected to the conductive layer 46a. Specifically, the common electrode 43a is in contact with the conductive layer 46a through an opening provided in the insulating layer 44 and the insulating layer 45.

The substrate 32 is provided with the light-blocking layer 38 and the coloring layer 39 and the overcoat 135 is provided to cover the light-blocking layer 38 and the coloring layer 39. The alignment film 133b is provided in contact with the overcoat 135. The alignment film 133a is provided over the common electrode 43a. The liquid crystal layer 42 is sandwiched between the alignment film 133a and the alignment film 133b. The overcoat 135 can inhibit the diffusion of impurities contained in the coloring layer 39, the light-blocking layer 38, and the like into the liquid crystal layer 42.

The substrate 31 and the substrate 32 are attached to each other with the adhesive layer 141.

The FPC 172 is electrically connected to the conductive layer 222e. Specifically, the FPC 172 is in contact with a connector 242, the connector 242 is in contact with the conductive layer 43b, the conductive layer 43b is in contact with the conductive layer 46c, and the conductive layer 46c is in contact with the conductive layer 222e. The conductive layer 43b is formed over the insulating layer 45, the conductive layer 46c is formed over the insulating layer 215, and the conductive layer 222e is formed over the gate insulating layer 211. The conductive layer 43b can be formed using the same process and the same material as those for the common electrode 43a. The conductive layer 46c can be formed using the same process and the same material as those for the gate 223, the conductive layer 46a, and the conductive layer 46b. The conductive layer 222e can be formed using the same process and the same material as those for the conductive layer 222a and the conductive layer 222b.

The conductive layer 46a, the insulating layer 44, and the pixel electrode 41 can function as one capacitor 104. The pixel electrode 41, the insulating layer 45, and the common electrode 43a can function as one capacitor 105. The display device 10 thus includes two capacitors in one pixel. As a result, the storage capacity of the pixel can be increased.

The two capacitors each include a material transmitting visible light and a region where they overlap with each other. Accordingly, the pixel can achieve high aperture ratio and high storage capacity.

The capacity of the capacitor 104 is preferably greater than the capacity of the capacitor 105. Therefore, the area of a region where the pixel electrode 41 and the conductive layer 46a overlap with each other is preferably larger than the area of a region where the pixel electrode 41 and the common electrode 43a overlap with each other. The insulating layer 44 positioned between the conductive layer 46a and the pixel electrode 41 is preferably thinner than the insulating layer 45 positioned between the pixel electrode 41 and the common electrode 43a.

Figure 6:
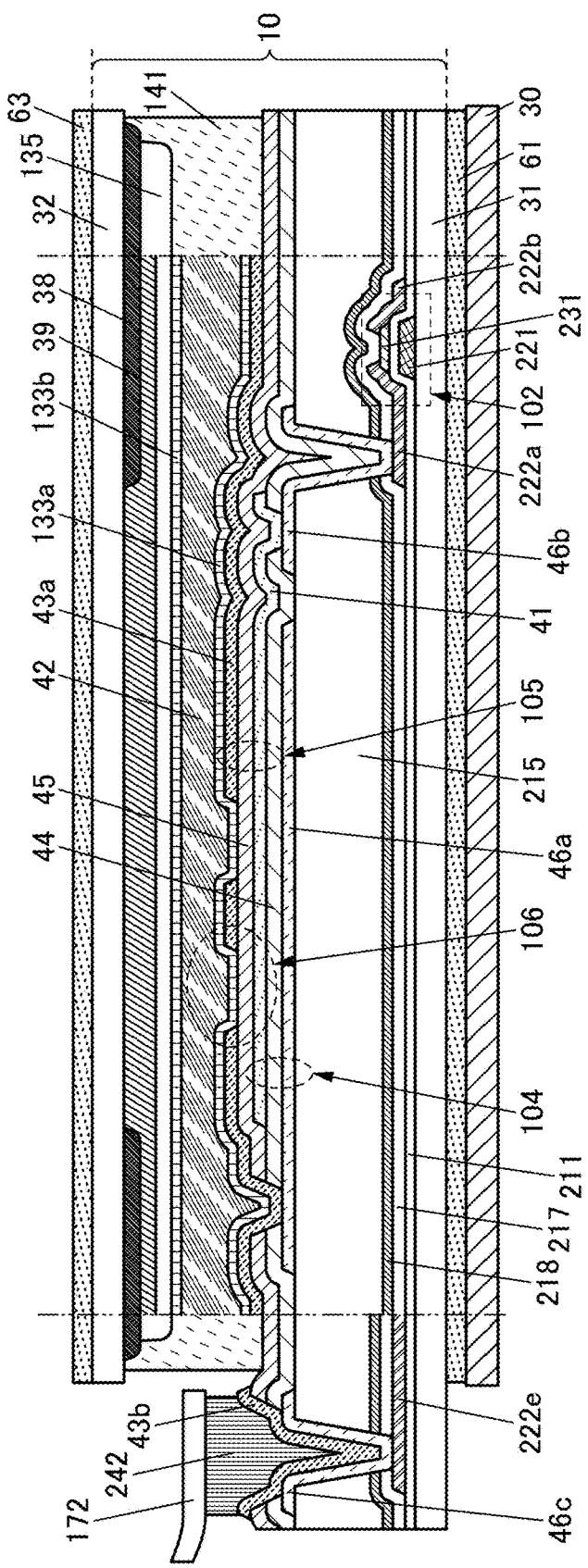
FIG. 6 A cross-sectional view illustrating an example of a display device.

FIG. 5 illustrates an example in which the transistor 102 has the back gate (the gate 223 in FIG. 5); however, the transistor 102 does not necessarily include the back gate as illustrated in FIG. 6. The transistor 102 illustrated in FIG. 6 includes the gate 221, the gate insulating layer 211, the semiconductor layer 231, the conductive layer 222a, and the conductive layer 222b. The transistor 102 illustrated in FIG. 6 is covered with the insulating layer 217, the insulating layer 218, and the insulating layer 215.

Figure 7:
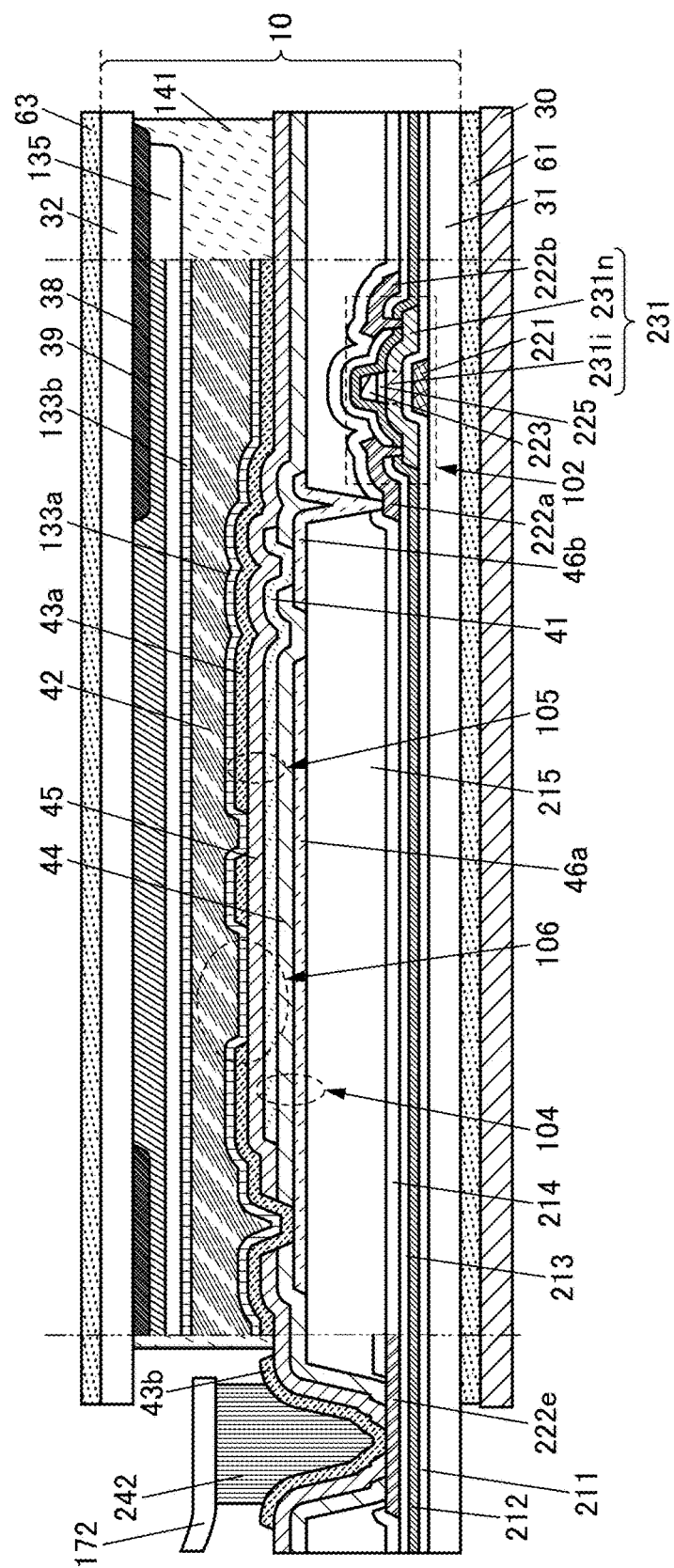
FIG. 7 A cross-sectional view illustrating an example of a display device.

The display device 10 illustrated in FIG. 7 is different from those in FIG. 5 and FIG. 6 in the structure of the transistor 102.

The transistor 102 illustrated in FIG. 7 includes the gate 221, the gate insulating layer 211, the semiconductor layer 231, the conductive layer 222a, the conductive layer 222b, an insulating layer 212, an insulating layer 213, a gate insulating layer 225, and the gate 223. One of the conductive layer 222a and the conductive layer 222b functions as a source and the other functions as a drain. The transistor 102 is covered with an insulating layer 214 and the insulating layer 215.

The transistor 102 illustrated in FIG. 7 includes the gates above and below the channel. It is preferable that the two gates be electrically connected to each other. A transistor with two gates that are electrically connected to each other can have a higher field-effect mobility and thus have higher on-state current than other transistors. Consequently, a circuit capable of high-speed operation can be obtained. Furthermore, the area occupied by a circuit portion can be reduced. The use of the transistor having a high on-state current can reduce signal delay in each wiring and can suppress display unevenness even in a display device in which the number of wirings is increased because of an increase in size or an increase in resolution. In addition, the area occupied by a circuit portion can be reduced, whereby the bezel of the display device can be narrowed. Moreover, with such a structure, a highly reliable transistor can be fabricated.

The semiconductor layer 231 includes a pair of low-resistance regions 231n and a channel formation region 231i between the pair of low-resistance regions 231n.

The channel formation region 231i overlaps with the gate 221 with the gate insulating layer 211 provided therebetween and overlaps with the gate 223 with the gate insulating layer 225 provided therebetween.

Here, an example in which a metal oxide is used for the semiconductor layer 231 is described.

The gate insulating layer 211 and the gate insulating layer 225 in contact with the channel formation region 231i are preferably oxide insulating layers. In the case where the gate insulating layer 211 or the gate insulating layer 225 has a stacked-layer structure, it is preferable that at least a layer in contact with the channel formation region 231i be the oxide insulating layer. Accordingly, generation of oxygen vacancies in the channel formation region 231i can be suppressed, and the reliability of the transistor can be improved.

Either one or both of the insulating layer 213 and the insulating layer 214 are preferably a nitride insulating layer. As a result, entry of impurities into the semiconductor layer 231 can be suppressed, and the reliability of the transistor can be improved.

The insulating layer 215 preferably has a planarization function and, for example, is preferably an organic insulating layer. Note that one or both of the insulating layer 214 and the insulating layer 215 are not necessarily formed.

The resistivity of the low-resistance regions 231n is lower than that of the channel formation region 231i. The low-resistance regions 231n are regions of the semiconductor layer 231 that are in contact with the insulating layer 212. Here, the insulating layer 212 preferably contains nitrogen or hydrogen. Accordingly, nitrogen or hydrogen in the insulating layer 212 enters the low-resistance regions 231n to increase the carrier concentration of the low-resistance regions 231n. Alternatively, the low-resistance regions 231n may be formed by the addition of an impurity with the gate 223 used as a mask. Examples of the impurity include hydrogen, helium, neon, argon, fluorine, nitrogen, phosphorus, arsenic, antimony, boron, aluminum, magnesium, and silicon, and the impurity can be added by an ion implantation method or an ion doping method. Other than the above impurities, for example, indium, which is a constituent element of the semiconductor layer 231, may be added to form the low-resistance regions 231n. The concentration of indium in the low-resistance region 231n is higher than that in the channel formation region 231i in some cases when indium is added.

Furthermore, after a gate insulating layer 235 and a gate 233 are formed, a first layer is formed to be in contact with part of a region of the semiconductor layer 231 and heat treatment is performed, whereby the resistance of the region can be reduced and the low-resistance regions 231n can be formed.

For the first layer, a film containing at least one of metal elements such as aluminum, titanium, tantalum, tungsten, chromium, and ruthenium can be used. The first layer preferably contains at least one of aluminum, titanium, tantalum, and tungsten. Alternatively, it is preferable to use a nitride containing at least one of these metal elements or an oxide containing at least one of these metal elements. In particular, it is preferable to use a metal film such as a tungsten film or a titanium film, a nitride film such as an aluminum titanium nitride film, a titanium nitride film, or an aluminum nitride film, or an oxide film such as an aluminum titanium oxide film, for example.

The thickness of the first layer can range, for example, from 0.5 nm to 20 nm, preferably from 0.5 nm to 15 nm, further preferably from 0.5 nm to 10 nm, still further preferably 1 nm to 6 nm. Typically, the thickness can be approximately 5 nm or approximately 2 nm. With such a thin first layer, the resistance of the semiconductor layer 231 can be sufficiently lowered.

It is important that the low-resistance regions 231n are made to have a higher carrier density than the channel formation region 231i. For example, the low-resistance regions 231n can be a region having a higher hydrogen content than the channel formation region 231i, or a region containing more oxygen vacancies than the channel formation region 231i. When bonded to a hydrogen atom, an oxygen vacancy in the oxide semiconductor functions as a carrier generation source.

The heat treatment is performed while the first layer is provided in contact with part of a region of the semiconductor layer 231, whereby oxygen in the region is absorbed into the first layer, and thus, a large amount of oxygen vacancy can be generated in the region. Thus, the low-resistance regions 231n can have extremely low resistance.

The low-resistance regions 231n formed in the above manner have a feature in that its resistance is not likely to be increased by subsequent process. There is no possibility that the conductivity of low-resistance regions 231n is impaired by heat treatment in an atmosphere containing oxygen or by deposition process in an atmosphere containing oxygen, for example; thus, a transistor with favorable electrical characteristics and high reliability can be fabricated.

When the first layer that has undergone the heat treatment has conductivity, the first layer is preferably removed after the heat treatment. In contrast, when the first layer has insulating properties, the first layer can function as a protective insulating film when remaining.

The FPC 172 is electrically connected to the conductive layer 222e. Specifically, the FPC 172 is in contact with the connector 242, the connector 242 is in contact with the conductive layer 43b, and the conductive layer 43b is in contact with the conductive layer 222e. The conductive layer 43b is formed over the insulating layer 45, and the conductive layer 222e is formed over the insulating layer 214. The conductive layer 43b can be formed using the same process and the same material as those for the common electrode 43a. The conductive layer 222e can be formed using the same process and the same material as those for the conductive layer 222a and the conductive layer 222b.

<Structure Example 3 of Display Device>

Structure examples of a display device including two transistors and two capacitors in a pixel are described with reference to FIG. 8 to FIG. 12.

One embodiment of the present invention is a display device having a function of adding a correction signal to an image signal.

The correction signal is added to an image signal by capacitive coupling, and is supplied to a liquid crystal element. Thus, the liquid crystal element can display a corrected image. For example, the gray levels greater than those that can be expressed by use of only image signals can be expressed by the correction in the liquid crystal element.

Owing to the correction, the liquid crystal element can be driven at a voltage higher than the output voltage of a source driver. A voltage supplied to the liquid crystal element can be changed to a desired value in the pixel; therefore, an existing source driver can be used and the cost for designing a novel source driver can be reduced. Furthermore, an increase in output voltage of the source driver can be suppressed, so that power consumption of the source driver can be reduced.

When a liquid crystal element is driven with application of high voltage, the display device can be used in a wide temperature range, and highly reliable display can be performed in both low temperature environment and high temperature environment. For example, the display device can be used as a display device for a vehicle or a camera.

Furthermore, a liquid crystal element can be driven with application of high voltage; therefore, a liquid crystal material having a high driving voltage such as a liquid crystal material exhibiting a blue phase can be used, and the range of choices of a liquid crystal material can be widened.

Furthermore, a liquid crystal element can be driven with application of high voltage; thus, the response speed of the liquid crystal can be increased by overdriving in which a voltage applied to the liquid crystal element is increased temporarily so that the alignment of the liquid crystal is rapidly changed.

In addition, the liquid crystal element can be driven with application of high voltage, whereby the display burn-in can every be reduced.

The correction signal is generated in an external device and written to the pixel. The correction signal may be generated in real time using an external device, or a correction signal stored in a storage medium may be read and synchronized with the image signal.

In the display device of one embodiment of the present invention, an image signal supplied thereto is not changed, and a new image signal can be generated in a pixel to which a correction signal is supplied. As compared with the case where a new image signal itself is generated using an external device, load on an external device can be reduced. Furthermore, the operation for generating a new image signal in a pixel can be performed in a small number of steps and thus can be performed even in a display device with a large number of pixels and a short horizontal period.

<<Circuit>>

Figure 8A:
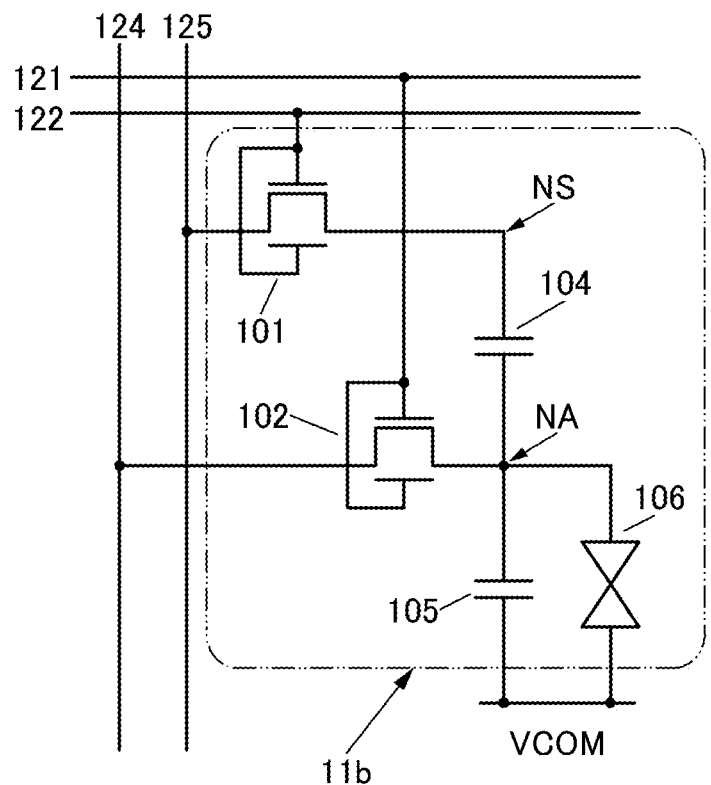
FIG. 8 (A) A circuit diagram illustrating an example of a pixel. (B) and (C) Timing charts.

FIG. 8(A) shows a circuit diagram of a pixel 11b.

The pixel 11b includes the transistor 101, the transistor 102, the capacitor 104, the capacitor 105, and the liquid crystal element 106.

The one of the source and the drain of the transistor 101 is electrically connected to one electrode of the capacitor 104. The other electrode of the capacitor 104 is electrically connected to one of a source and a drain of the transistor 102, one electrode of the capacitor 105, and one electrode of the liquid crystal element 106.

Here, a node at which the one of the source and the drain of the transistor 101 and the one electrode of the capacitor 104 are connected is referred to as a node NS. A node at which the other electrode of the capacitor 104, the one of the source and the drain of the transistor 102, the one electrode of the capacitor 105, and the one electrode of the liquid crystal element 106 are connected is referred to as a node NA.

A gate of the transistor 101 is electrically connected to a wiring 122. A gate of the transistor 102 is electrically connected to the wiring 121. The other of the source and the drain of the transistor 101 is electrically connected to a wiring 125. The other of the source and the drain of the transistor 102 is electrically connected to the wiring 124.

The other electrode of the capacitor 105 and the other electrode of the liquid crystal element 106 are each electrically connected to the common wiring VCOM. A given potential can be supplied to the common wiring VCOM.

The wiring 121 and the wiring 122 can each be referred to as a scan line, and have a function of controlling the operation of the transistor. The wiring 125 can function as a signal line for supplying an image signal. The wiring 124 can function as a signal line for writing data into the node NA.

The transistors illustrated in FIG. 8(A) each include a back gate electrically connected to its gate; however, the connection of the back gate is not limited thereto. The back gate is not necessarily provided in the transistor.

When the transistor 102 is turned off, the potential of the node NS can be retained. Furthermore, when the transistor 102 is turned off, the potential of the node NA can be retained. When a predetermined potential is supplied to the node NS through the transistor 101 with the transistor 102 being in an off state, the potential of the node NA can be changed in accordance with a change of the potential of the node NS owing to capacitive coupling through the capacitor 104.

In the pixel 11b, the correction signal written from the wiring 124 to the node NA is coupled with the image signal supplied from the wiring 125 and is supplied to the liquid crystal element 106 Thus, the liquid crystal element 106 can display a corrected image.

The use of a transistor with a noticeably low off-state current as the transistor 101 allows the potential at the node NS to be retained for along time. Similarly, the use of a transistor with extremely low off-state current as the transistor 102 enables long-term retention of the potential of the node NA. An OS transistor can be given as an example of an OS transistor having an extremely low off-state current. A Si transistor may also be used as the transistor included in the pixel. Alternatively, both an OS transistor and a Si transistor may be used.

For example, in the case where a correction signal and an image signal are rewritten every frame period, an OS transistor or a Si transistor may be used as each of the transistor 101 and the transistor 102. In the case where the potential of the node NS or the node NA needs to be retained for a long time, an OS transistor, rather than a Si transistor, is preferably used as the transistor 101 and the transistor 102.

<<Timing Chart>>

Figure 8B:
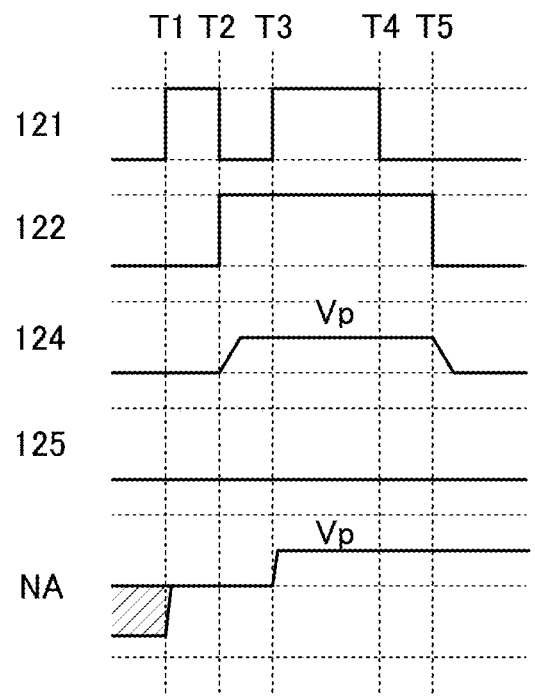

The operation of writing a correction signal (Vp) into the node NM in the pixel 11b is described with reference to the timing chart in FIG. 8(B). To correct an image signal (Vs), the correction signal Vp is preferably written every frame. Note that although a given positive or negative signal can be used as a correction signal (Vp) supplied to the wiring 124, the case where a positive signal is supplied is described here. In the following description, a high potential is represented by "H", and a low potential is represented by "L".

At time T1, the potential of the wiring 121 is set to "H", the potential of the wiring 122 is set to "L", the potential of the wiring 124 is set to "L", and the potential of the wiring 125 is set to "H", so that the transistor 102 is turned on and the potential of the node NA becomes the potential of the wiring 124. At this time, the potential of the wiring 124 is set to a reset potential (e.g., "L"), whereby the operation of the liquid crystal element 106 can be reset.

Note that before Time T1, the display operation of the liquid crystal element 106 in the previous frame is performed.

At time T2, the potential of the wiring 121 is set to "L", the potential of the wiring 122 is set to "H", the potential of the wiring 124 is set to "Vp", and the potential of the wiring 125 is set to "L", so that the transistor 101 is turned on and the potential of the other electrode of the capacitor 104 becomes "L". The operation is a reset operation for capacitive coupling operation that is to be performed later.

At time T3, the potential of the wiring 121 is set to "H", the potential of the wiring 122 is set to "H", the potential of the wiring 124 is set to "Vp", and the potential of the wiring 125 is set to "L", so that the potential (correction signal (Vp)) of the wiring 124 is written to the node NA.

At time T4, the potential of the wiring 121 is set to "L", the potential of the wiring 122 is set to "H", the potential of the wiring 124 is set to "Vp", and the potential of the wiring 125 is set to "L", so that the transistor 102 is turned off and the correction signal (Vp) is retained in the node NA.

At time T5, the potential of the wiring 121 is set to "L", the potential of the wiring 122 is set to "L", the potential of the wiring 125 is set to "L", and the potential of the wiring 126 is set to "L", so that the transistor 101 is turned off; thus, the operation of writing the correction signal (Vp) is completed.

Figure 8C:
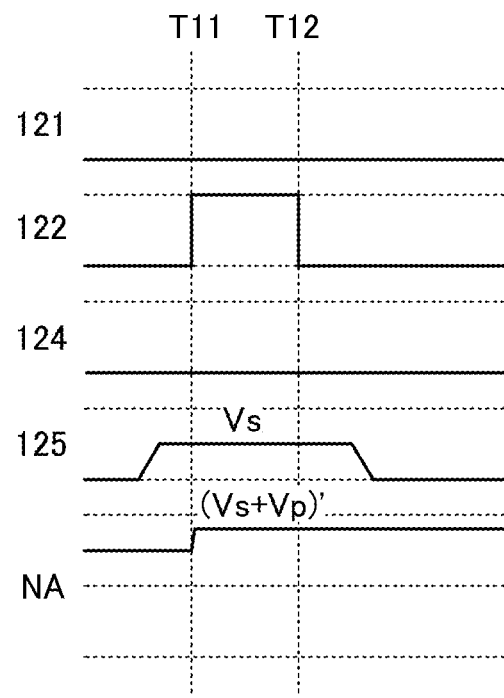

Next, the operation of correcting the image signal (Vs) in the pixel 11b and the display operation of the liquid crystal element 106 are described with reference to a timing chart in FIG. 8(C). Note that an intended potential is supplied to the wiring 125 at an appropriate timing.

At time T11, the potential of the wiring 121 is set to "L", the potential of the wiring 122 is set to "H", and the potential of the wiring 124 is set to "L", so that the transistor 101 is turned on and the potential of the wiring 125 is added to the potential of the node NA by capacitive coupling of the capacitor 104. That is, the potential of the node NA becomes a potential (Vs+Vp)' obtained by adding the correction signal (Vp) to the image signal (Vs). Note that the potential (Vs+Vp)' includes a potential variation due to capacitive coupling between wirings, for example.

At time T12, the potential of the wiring 121 is set to "L", the potential of the wiring 122 is set to "L", and the potential of the wiring 124 is set to "L", so that the transistor 101 is turned off and the potential (Vs+Vp)' is retained in the node NM. Then, the display operation based on the potential is performed by the liquid crystal element 106.

The above is the description of the operation of correcting the image signal (Vs) and the display operation of the liquid crystal element 106. Note that the operation of writing the correction signal (Vp) described above and an operation of inputting the image signal (Vs) may be successively performed but the operation of inputting the image signal (Vs) is preferably performed after the correction signal (Vp) is written to all the pixels.

Note that when the correction operation is not performed, the display operation with the liquid crystal element 106 may be performed by supplying an image signal to the wiring 124 and controlling the on and off of the transistor 102. At this time, the transistor 101 may be always off or may be always on while a constant potential is supplied to the wiring 125.

<<Top Surface Layout of Pixel>>

Figure 9A:
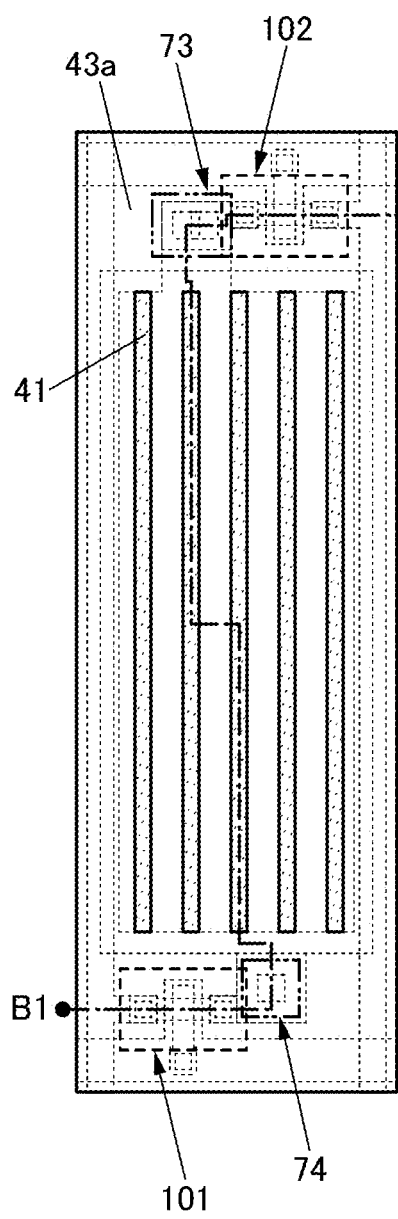
FIG. 9 Top views illustrating an example of a pixel.
Figure 9B:
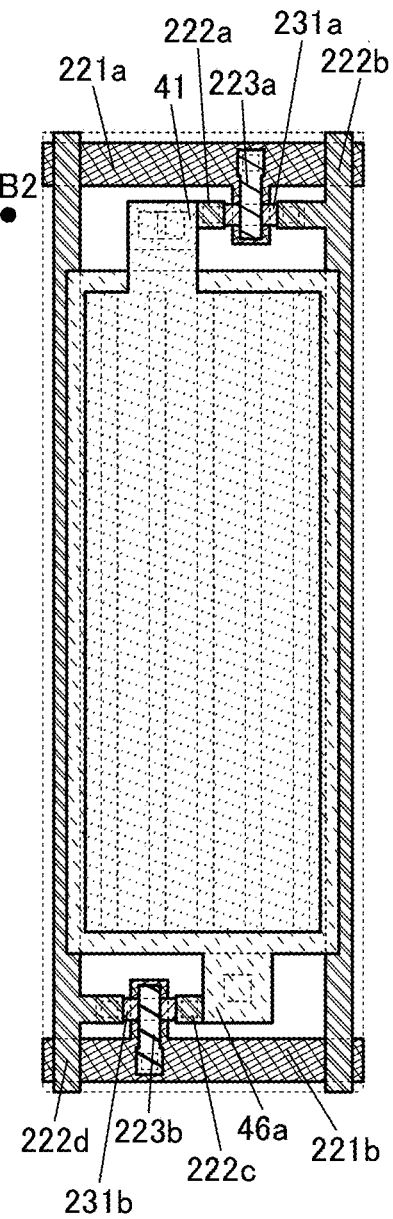
Figure 9C:
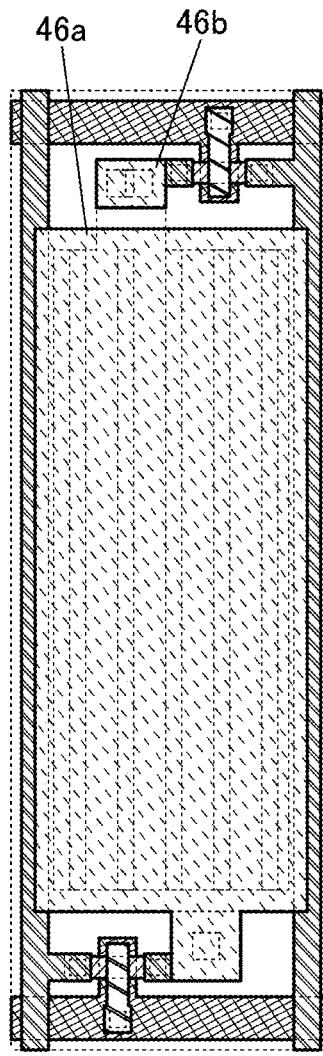

FIGS. 9(A) to 9(C) illustrate top views of a pixel. FIG. 9(A) is a top view of a stacked-layer structure from a gate 221a and a gate 221b to the common electrode 43a, which is seen from the common electrode 43a side. FIG. 9(B) is a top view of the stacked-layer structure of FIG. 9(A) except the common electrode 43a, and FIG. 9(C) is a top view of the stacked-layer structure of FIG. 9(A) except that the common electrode 43a and the pixel electrode 41.

The pixel includes a connection portion 73 and a connection portion 74. The pixel electrode 41 is electrically connected to the transistor 102 in the connection portion 73. Specifically, the conductive layer 222a functioning as the source or the drain of the transistor 102 is in contact with the conductive layer 46b, and the conductive layer 46b is in contact with the pixel electrode 41. The conductive layer 46a is electrically connected to the transistor 101 in the connection portion 74. Specifically, the conductive layer 46a is in contact with the conductive layer 222c functioning as the source or the drain of the transistor 101.

<<Cross-Sectional Structure of Display Module>>

Figure 10:
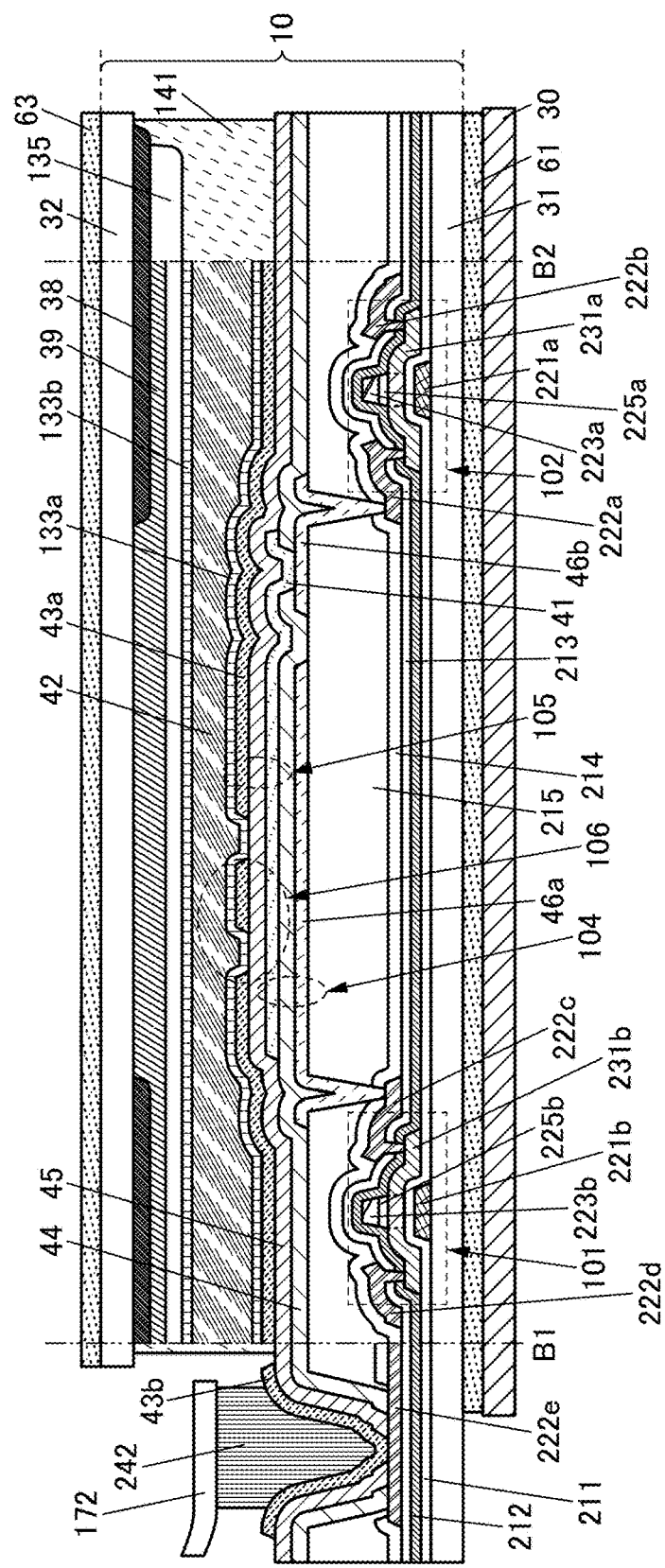
FIG. 10 A cross-sectional view illustrating an example of a display device.

FIG. 10 is a cross-sectional view of a display module. Note that the cross-sectional structure of the pixel corresponds to the cross-sectional view taken along dashed-dotted line B1-B2 in FIG. 9(A).

The display module illustrated in FIG. 10 includes the display device 10, the polarizing plate 61, the polarizing plate 63, the backlight unit 30, the FPC 172, and the like.

The display device 10 includes the substrate 31, the substrate 32, the transistor 102, the conductive layer 46a, the conductive layer 46b, the insulating layer 44, the insulating layer 45, the pixel electrode 41, the liquid crystal layer 42, the common electrode 43a, the conductive layer 43b, the conductive layer 222e, the alignment film 133a, the alignment film 133b, the adhesive layer 141, the overcoat 135, the light-blocking layer 38, the coloring layer 39, and the like.

The transistor 101 and the transistor 102 are positioned over the substrate 31. The transistor 102 includes the gate 221a, the gate insulating layer 211, a semiconductor layer 231a, the conductive layer 222a, the conductive layer 222b, the insulating layer 212, the insulating layer 213, agate insulating layer 225a, and agate 223a. The transistor 101 includes the gate 221b, the gate insulating layer 211, a semiconductor layer 231b, the conductive layer 222c, a conductive layer 222d, the insulating layer 212, the insulating layer 213, a gate insulating layer 225b, and a gate 223b. The structure of the transistor 101 and the transistor 102 in FIG. 10 is the same as that of the transistor 102 in FIG. 7; therefore, the detailed description thereof is omitted.

The conductive layer 46b is positioned over the insulating layer 215, the insulating layer 44 is positioned over the conductive layer 46b, and the pixel electrode 41 is positioned over the insulating layer 44. The pixel electrode 41 is electrically connected to the conductive layer 222a. Specifically, the conductive layer 222a is in contact with the conductive layer 46b, and the conductive layer 46b is in contact with the pixel electrode 41.

The conductive layer 46a is positioned over the insulating layer 215. The conductive layer 46a is electrically connected to the conductive layer 222c. Specifically, the conductive layer 46a is in contact with the conductive layer 222c through an opening provided in the insulating layer 214 and the insulating layer 215.

The light-blocking layer 38 and the coloring layer 39 are provided with the substrate 32 and the overcoat 135 is provided to cover the light-blocking layer 38 and the coloring layer 39. The alignment film 133b is provided in contact with the overcoat 135. The alignment film 133a is provided over the common electrode 43a. The liquid crystal layer 42 is sandwiched between the alignment film 133a and the alignment film 133b. The overcoat 135 can inhibit the diffusion of impurities contained in the coloring layer 39, the light-blocking layer 38, and the like into the liquid crystal layer 42.

The substrate 31 and the substrate 32 are attached to each other with the adhesive layer 141.

The FPC 172 is electrically connected to the conductive layer 222e. Specifically, the FPC 172 is in contact with the connector 242, the connector 242 is in contact with the conductive layer 43b, and the conductive layer 43b is in contact with the conductive layer 222e. The conductive layer 43b is formed over the insulating layer 45, and the conductive layer 222e is formed over the insulating layer 214. The conductive layer 43b can be formed using the same process and the same material as those for the common electrode 43a. The conductive layer 222e can be formed using the same process and the same material as those for the conductive layer 222a to the conductive layer 222d.

The conductive layer 46a, the insulating layer 44, and the pixel electrode 41 can function as one capacitor 104. The pixel electrode 41, the insulating layer 45, and the common electrode 43a can function as one capacitor 105. The display device 10 thus includes two capacitors in one pixel. As a result, the storage capacity of the pixel can be increased.

The two capacitors each include a material transmitting visible light and a region where they overlap with each other. Accordingly, the pixel can achieve high aperture ratio and high storage capacity.

The capacity of the capacitor 104 is preferably greater than the capacity of the capacitor 105. Therefore, the area of a region where the pixel electrode 41 overlaps with the conductive layer 46a is preferably greater than the area of a region where the pixel electrode 41 and the common electrode 43a overlap with each other. The insulating layer 44 positioned between the conductive layer 46a and the pixel electrode 41 is preferably thinner than the insulating layer 45 positioned between the pixel electrode 41 and the common electrode 43a.

Although FIG. 10 illustrates an example in which both the transistor 101 and the transistor 102 have a back gate (the gates 223a and 223b in FIG. 10), one or both of the transistor 101 and the transistor 102 do not necessarily have a back gate.

Figure 11:
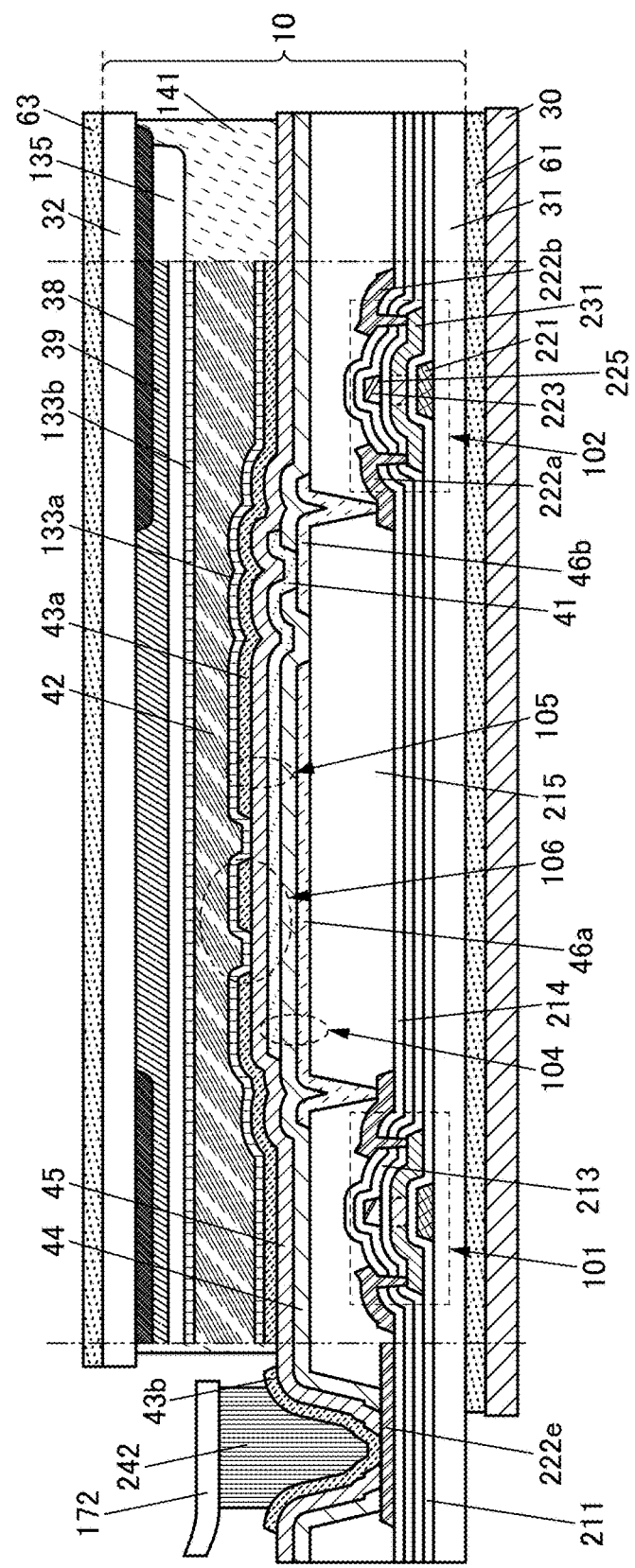
FIG. 11 A cross-sectional view illustrating an example of a display device.

Although FIG. 10 illustrates an example in which the gate insulating layer 225 is provided only over the channel formation region 231i and does not overlap with the low-resistance region 231n, the gate insulating layer 225 may overlap with at least part of the low-resistance region 231n. FIG. 11 illustrates an example in which the gate insulating layer 225 is formed to be in contact with the low-resistance region 231n and the gate insulating layer 211. The gate insulating layer 225 illustrated in FIG. 11 has an advantage in that the step of processing the gate insulating layer 225 with the gate 223 used as a mask is not necessary, the step height of a surface on which the insulating layer 214 is formed can be lowered, and the like.

In the case where the gate insulating layer 225 is an oxide film having a function of releasing oxygen by heating, oxygen is supplied to the low-resistance regions 231n by heating, and thus a reduction in carrier density and an increase in electric resistance might be generated. Thus, impurities are preferably added to part of the semiconductor layer 231 through the gate insulating layer 225, so that the low-resistance regions 231n are formed. Accordingly, impurities are added also to the gate insulating layer 225. The impurities are added to the oxide film having a function of releasing oxygen by heating, whereby the amount of released oxygen can be reduced. Accordingly, by heating, supply of oxygen from the gate insulating layer 225 to the low-resistance regions 231n can be suppressed, so that the low-resistance regions 231n can be kept with low electrical resistance.

Figure 12:
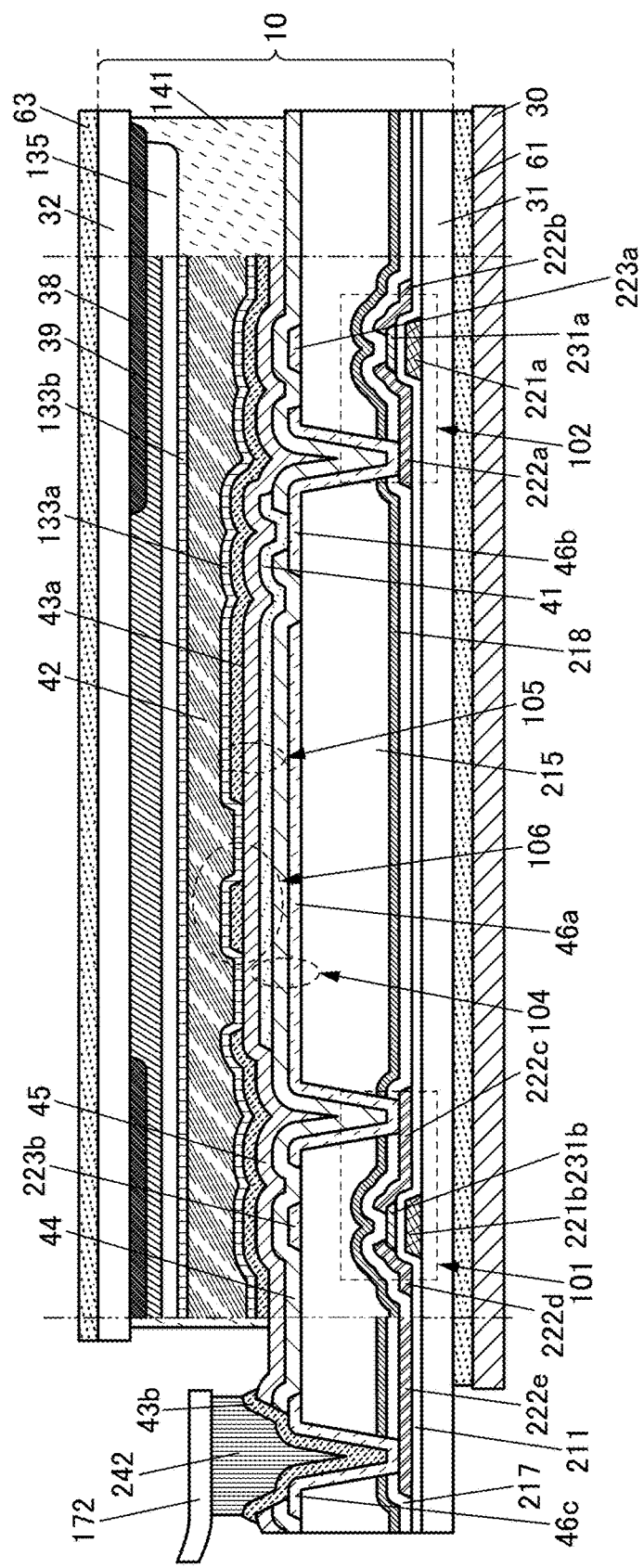
FIG. 12 A cross-sectional view illustrating an example of a display device.

The display device 10 illustrated in FIG. 12 differs from the structures of the transistor 101 and the transistor 102 in FIG. 10 and FIG. 11.

The transistor 102 in FIG. 12 includes the gate 221a, the gate insulating layer 211, the semiconductor layer 231a, the conductive layer 222a, the conductive layer 222b, the insulating layer 217, the insulating layer 218, the insulating layer 215, and the gate 223a. The transistor 101 includes the gate 221b, the gate insulating layer 211, the semiconductor layer 231b, the conductive layer 222c, the conductive layer 222d, the insulating layer 217, the insulating layer 218, the insulating layer 215, and the gate 223b. The structure of the transistor 101 and the transistor 102 in FIG. 12 is similar to the structure of the transistor 102 in FIG. 5; thus, detailed description thereof is omitted.

<<Materials of Components>>

Next, the details of materials and the like that can be used for components of the display device and the display module of this embodiment are described.

There are no strict limitation on the material for a substrate included in the display device: a variety of substrates can be used. For example, a glass substrate, a quartz substrate, a sapphire substrate, a semiconductor substrate, a ceramic substrate, a metal substrate, a plastic substrate, or the like can be used.

The use of a thin substrate can reduce the weight and thickness of the display device. Furthermore, the use of a substrate that is thin enough to have flexibility allows a flexible display device to be obtained.

Liquid crystal materials include a positive liquid crystal material with a positive dielectric anisotropy (A) and a negative liquid crystal material with a negative dielectric anisotropy. Either of the materials can be used in one embodiment of the present invention, and an optimal liquid crystal material can be used according to the employed mode and design.

The display device of this embodiment can employ a liquid crystal element having a variety of modes. For example, other than the above-described FFS mode, an IPS mode, a TN mode, an ASM (Axially Symmetric aligned Micro-cell) mode, an OCB (Optically Compensated Birefringence) mode, an FLC (Ferroelectric Liquid Crystal) mode, an AFLC (AntiFerroelectric Liquid Crystal) mode, an ECB (Electrically Controlled Birefringence) mode, a VA-IPS mode, a guest-host mode, or the like can be used for a liquid crystal element.

Note that the liquid crystal element is an element that controls transmission and non-transmission of light by the optical modulation action of liquid crystal. The optical modulation action of the liquid crystal is controlled by an electric field applied to the liquid crystal (including a horizontal electric field, a vertical electric field, and an oblique electric field). As the liquid crystal used for the liquid crystal element, thermotropic liquid crystal, low-molecular liquid crystal, high-molecular liquid crystal, polymer dispersed liquid crystal (PDLC), ferroelectric liquid crystal, anti-ferroelectric liquid crystal, or the like can be used. Such a liquid crystal material exhibits a cholesteric phase, a smectic phase, a cubic phase, a chiral nematic phase, an isotropic phase, or the like depending on conditions.

As described above, in the display device of this embodiment, a liquid crystal element can be driven with application of high voltage; therefore, a liquid crystal exhibiting a blue phase may be used. The blue phase is one of the liquid crystal phases, which appears just before a cholesteric phase changes into an isotropic phase when the temperature of a cholesteric liquid crystal is increased. Since the blue phase appears only in a narrow temperature range, a liquid crystal composition in which a chiral material is mixed to account for 5 weight % or more is used for the liquid crystal layer in order to improve the temperature range. The liquid crystal composition that contains liquid crystal exhibiting a blue phase and a chiral material has a short response speed and exhibits optical isotropy. In addition, the liquid crystal composition containing a liquid crystal exhibiting a blue phase and a chiral material does not need alignment treatment and has small viewing angle dependence. Since an alignment film does not need to be provided and rubbing treatment is unnecessary, electrostatic discharge damage caused by the rubbing treatment can be prevented and defects or damage of the display panel in the manufacturing process can be reduced.

Since the display device of this embodiment is a transmissive liquid crystal display device, a visible-light-transmitting conductive material is used for both of a pair of electrodes (the pixel electrode 41 and the common electrode 43*a*). In addition, when the conductive layer 46*b* is formed using a conductive material that transmits visible light, a decrease in aperture ratio in a pixel can be suppressed even when the capacitor 104 is provided. Note that a silicon nitride film is preferable as the insulating layer 44 and the insulating layer 45 functioning as a dielectric of the capacitor.

For example, a material containing one or more kinds selected from indium (In), zinc (Zn), and tin (Sn) is preferably used as the conductive material transmitting visible light. Specifically, indium oxide, indium tin oxide (ITO), indium zinc oxide, indium oxide containing tungsten oxide, indium zinc oxide containing tungsten oxide, indium oxide containing titanium oxide, indium tin oxide containing titanium oxide, indium tin oxide containing silicon oxide (ITSO), zinc oxide, zinc oxide containing gallium, and the like are given. Note that a film containing graphene can be used as well. The film including graphene can be formed, for example, by reducing a film including graphene oxide.

A conductive film that transmits visible light can be formed using an oxide semiconductor (hereinafter also referred to as an oxide conductive layer). For example, the oxide conductive layer preferably includes indium and further preferably includes an In-M-Zn oxide (M is Al, Ti, Ga. Y, Zr, La, Ce, Nd, Sn, or Hf).

An oxide semiconductor is a semiconductor material whose resistance can be controlled by oxygen vacancies in the film and/or the concentration of impurities such as hydrogen and water in the film. Thus, the resistivity of the oxide conductive layer can be controlled by selecting treatment for increasing oxygen vacancies and/or impurity concentration or treatment for reducing oxygen vacancies and/or impurity concentration, for an oxide semiconductor layer.

Note that such an oxide conductive layer formed using an oxide semiconductor can also be referred to as an oxide semiconductor layer having a high carrier density and a low resistance, an oxide semiconductor layer having conductivity, or an oxide semiconductor layer having high conductivity.

A transistor included in the display device of this embodiment may have either a top-gate structure or a bottom-gate structure. Gate electrodes may be provided above and below a channel. A semiconductor material used in the transistor is not particularly limited, and examples of the semiconductor material include an oxide semiconductor, silicon, and germanium.

There is no particular limitation on the crystallinity of a semiconductor material used for the transistors, and an amorphous semiconductor or a semiconductor having crystallinity (a microcrystalline semiconductor, a polycrystalline semiconductor, a single-crystal semiconductor, or a semiconductor partly including crystal regions) may be used. It is preferable that a semiconductor having crystallinity be used, in which case deterioration of the transistor characteristics can be suppressed.

For example, a Group 14 element, a compound semiconductor, or an oxide semiconductor can be used for the semiconductor layer. Typically, a semiconductor containing silicon, a semiconductor containing gallium arsenide, an oxide semiconductor containing indium, or the like can be used for the semiconductor layer.

An oxide semiconductor is preferably used as a semiconductor in which a channel of the transistor is formed. In particular, an oxide semiconductor having a wider band gap than silicon is preferably used. Using a semiconductor material having a wider band gap and a lower carrier density than silicon is preferable because the off-state current of a transistor can be reduced.

The use of an oxide semiconductor makes it possible to provide a highly reliable transistor in which a change in the electrical characteristics is reduced.

Charge accumulated in a capacitor through the transistor can be retained for a long time because of the low off-state current. The use of such a transistor in a pixel allows a driver circuit to stop with the gray level of a displayed image maintained. As a result, the display device with significantly reduced power consumption can be obtained.

The transistors preferably contain an oxide semiconductor layer that is highly purified to inhibit the formation of oxygen vacancies. This can reduce the current in an off state (off-state current) of the transistors. Accordingly, the holding time of an electrical signal such as an image signal can be made longer, and a writing interval can also be set longer in an on state. Accordingly, the frequency of refresh operation can be reduced, which leads to an effect of suppressing power consumption.

The transistor using the oxide semiconductor can have relatively high field-effect mobility and thus can operate at high speed. With the use of such transistors that are capable of high-speed operation in the display device, the transistor in the display portion and the transistors in the driver circuit portion can be formed over the same substrate. That is, a semiconductor device separately formed with a silicon wafer or the like does not need to be used as the driver circuit, which enables a reduction in the number of components of the display device. In addition, with the use of the transistor that can operate at high speed also in the display portion, a high-quality image can be provided.

The transistors included in the gate driver GD_L and the gate driver GD_R and the transistor included in the display region 100 may have the same structure or different structures. The transistors included in the gate drivers may have the same structure or the combination of two or more kinds of structures. Similarly, the transistors included in the display region 100 may have the same structure or the combination of two or more kinds of structures.

An organic insulating material or an inorganic insulating material can be used as an insulating material that can be used for the insulating layers, the overcoat, or the like included in the display device. Examples of the organic insulating material include an acrylic resin, an epoxy resin, a polyimide resin, a polyamide resin, a polyimide-amide resin, a siloxane resin, a benzocyclobutene-based resin, and a phenol resin. As inorganic insulating layers, a silicon oxide film, a silicon oxynitride film, a silicon nitride oxide film, a silicon nitride film, an aluminum oxide film, a hafnium oxide film, an yttrium oxide film, a zirconium oxide film, a gallium oxide film, a tantalum oxide film, a magnesium oxide film, a lanthanum oxide film, a cerium oxide film, a neodymium oxide film, and the like can be given.

The conductive layers for the gate, the source, and the drain of the transistor and various wirings, electrodes, and the like of the display device can have a single-layer structure or a stacked-layer structure using any of metals such as aluminum, titanium, chromium, nickel, copper, yttrium, zirconium, molybdenum, silver, tantalum, and tungsten, or an alloy containing any of these metals as its main component. For example, a two-layer structure in which a titanium film is stacked over an aluminum film; a two-layer structure in which a titanium film is stacked over a tungsten film; a two-layer structure in which a copper film is stacked over a molybdenum film; a two-layer structure in which a copper film is stacked over an alloy film containing molybdenum and tungsten; a two-layer structure in which a copper film is stacked over an alloy film containing copper, magnesium, and aluminum; a three-layer structure in which a titanium film or a titanium nitride film, an aluminum film or a copper film, and a titanium film or a titanium nitride film are stacked in this order; a three-layer structure in which a molybdenum film or a molybdenum nitride film, an aluminum film or a copper film, and a molybdenum film or a molybdenum nitride film are stacked in this order; or the like can be employed. For example, in the case where the conductive layer has a three-layer structure, it is preferable that each of the first layer and the third layer be a film formed of titanium, titanium nitride, molybdenum, tungsten, an alloy containing molybdenum and tungsten, an alloy containing molybdenum and zirconium, or molybdenum nitride, and that the second layer be a film formed of a low-resistance material such as copper, aluminum, gold, silver, or an alloy containing copper and manganese. Note that light-transmitting conductive materials such as ITO, indium oxide containing tungsten oxide, indium zinc oxide containing tungsten oxide, indium oxide containing titanium oxide, indium tin oxide containing titanium oxide, indium zinc oxide, or ITSO may be used. Note that an oxide conductive layer may be formed by controlling the resistivity of an oxide semiconductor.

A curable resin such as a heat-curable resin, a photocurable resin, or a two-component-mixture-type curable resin can be used as the adhesive layer 141. For example, an acrylic resin, a urethane resin, an epoxy resin, or a siloxane resin can be used.

As the connector 242, for example, an anisotropic conductive film (ACF) or an anisotropic conductive paste (ACP) can be used.

The coloring layer 39 is a colored layer that transmits light in a specific wavelength range. Examples of a material that can be used for the coloring layer 39 include a metal material, a resin material, and a resin material containing a pigment or dye.

The light-blocking layer 38 is provided, for example, between adjacent coloring layers 39 for different colors. A black matrix formed with, for example, a metal material or a resin material containing a pigment or dye can be used as the light-blocking layer 38. Note that it is preferable to provide the light-blocking layer 38 also in a region other than the display portion, such as the driver circuit portion, in which case leakage due to guided light or the like can be inhibited.

As the backlight unit 30, a direct-below backlight, an edge-light type backlight, or the like can be used. As a light source, an LED (Light Emitting Diode), an organic EL (Electroluminescence) element, or the like can be used.

The thin films included in the display device (the insulating film, the semiconductor film, the conductive film, and the like) can be formed by a sputtering method, a chemical vapor deposition (CVD) method, a vacuum evaporation method, a pulsed laser deposition (PLD) method, an atomic layer deposition (ALD) method, or the like. As examples of the CVD method, a plasma-enhanced chemical vapor deposition (PECVD) method, a thermal CVD method, and the like can be given. As an example of the thermal CVD method, a metal organic chemical vapor deposition (MOCVD: Metal Organic CVD) method can be given.

The thin films included in the display device (the insulating film, the semiconductor film, the conductive film, and the like) can each be formed by a method such as spin coating, dipping, spray coating, inkjet printing, dispensing, screen printing, offset printing, a doctor knife, slit coating, roll coating, curtain coating, or knife coating.

The thin films included in the display device can be processed using a photolithography method or the like. Alternatively, island-shaped thin films may be formed by a film formation method using a blocking mask. Alternatively, the thin films may be processed by a nanoimprinting method, a sandblasting method, a lift-off method, or the like. Examples of the photolithography method include a method in which a resist mask is formed over a thin film to be processed, the thin film is processed by etching or the like, and the resist mask is removed, and a method in which a photosensitive thin film is formed and then exposed to light and developed to be processed into a desired shape.

As light used for light exposure in a photolithography method, for example, an i-line (a wavelength of 365 nm), a g-line (a wavelength of 436 nm), an h-line (a wavelength of 405 nm), and light in which the i-line, the g-line, and the h-line are mixed can be given. Alternatively, ultraviolet light, KrF laser light, ArF laser light, or the like can be used. Furthermore, exposure may be performed by liquid immersion light exposure technique. Examples of light used for light exposure include extreme ultraviolet light (EUV) and X-rays. Furthermore, instead of the light used for the exposure, an electron beam can also be used. It is preferable to use extreme ultra-violet light, X-rays, or an electron beam because extremely minute processing can be performed. Note that in the case of performing exposure by scanning of a beam such as an electron beam, a photomask is not needed.

For etching of the thin films, a dry etching method, a wet etching method, a sandblasting method, or the like can be used.

[Metal Oxide]

For a semiconductor layer of the transistor included in the display device of this embodiment, a metal oxide functioning as an oxide semiconductor is preferably used. A metal oxide that can be used for the semiconductor layer is described below.

The metal oxide preferably contains at least indium or zinc. It is particularly preferable that the metal oxide contain indium and zinc. Furthermore, aluminum, gallium, yttrium, tin, or the like is preferably contained in addition to them. Furthermore, one or more kinds selected from boron, titanium, iron, nickel, germanium, zirconium, molybdenum, lanthanum, cerium, neodymium, hafnium, tantalum, tungsten, magnesium, and the like may be contained.

Here, the case where the metal oxide is an In-M-Zn oxide containing indium, an element M, and zinc is considered. Note that the element M is aluminum, gallium, yttrium, tin, or the like. Examples of other elements that can be used as the element M include boron, titanium, iron, nickel, germanium, zirconium, molybdenum, lanthanum, cerium, neodymium, hafnium, tantalum, tungsten, and magnesium. Note that it is sometimes acceptable to use a plurality of the above-described elements in combination as the element M.

Note that in this specification and the like, a metal oxide containing nitrogen is also collectively referred to as a metal oxide in some cases. A metal oxide containing nitrogen may be referred to as a metal oxynitride. For example, a metal oxide containing nitrogen, such as zinc oxynitride (ZnON), may be used for the semiconductor layer.

Note that in this specification and the like, "CAAC (c-axis aligned crystal)" or "CAC (Cloud-Aligned Composite)" might be stated. Note that CAAC refers to an example of a crystal structure, and CAC refers to an example of a function or a material composition.

For example, a CAC (Cloud-Aligned Composite)-OS can be used for the semiconductor layer.

A CAC-OS or a CAC-metal oxide has a conducting function in part of the material and has an insulating function in another part of the material; as a whole, the CAC-OS or the CAC-metal oxide has a function of a semiconductor. Note that in the case where the CAC-OS or the CAC-metal oxide is used in an active layer of a transistor, the conducting function is a function that allows electrons (or holes) serving as carriers to flow, and the insulating function is a function that does not allow electrons serving as carriers to flow. By the complementary action of the conducting function and the insulating function, a switching function (On/Off function) can be given to the CAC-OS or the CAC-metal oxide. In the CAC-OS or the CAC-metal oxide, separation of the functions can maximize each function.

Furthermore, the CAC-OS or the CAC-metal oxide includes conductive regions and insulating regions. The conductive regions have the above-described conducting function, and the insulating regions have the above-described insulating function. Furthermore, in some cases, the conductive regions and the insulating regions in the material are separated at the nanoparticle level. Furthermore, in some cases, the conductive regions and the insulating regions are unevenly distributed in the material. Furthermore, the conductive regions are observed to be coupled in a cloud-like manner with their boundaries blurred, in some cases.

Furthermore, in the CAC-OS or the CAC-metal oxide, the conductive regions and the insulating regions each have a size greater than or equal to 0.5 nm and less than or equal to 10 nm, preferably greater than or equal to 0.5 nm and less than or equal to 3 nm, and are dispersed in the material, in some cases.

Furthermore, the CAC-OS or the CAC-metal oxide includes components having different bandgaps. For example, the CAC-OS or the CAC-metal oxide includes a component having a wide gap due to the insulating region and a component having a narrow gap due to the conductive region. In the case of the structure, when carriers flow, carriers mainly flow in the component having a narrow gap. Furthermore, the component having a narrow gap complements the component having a wide gap, and carriers also flow in the component having a wide gap in conjunction with the component having a narrow gap. Therefore, in the case where the above-described CAC-OS or CAC-metal oxide is used in a channel formation region of a transistor, high current driving capability in an on state of the transistor, that is, a high on-state current and high field-effect mobility can be obtained.

In other words, the CAC-OS or the CAC-metal oxide can also be referred to as a matrix composite or a metal matrix composite.

Oxide semiconductors (metal oxides) can be classified into a single crystal oxide semiconductor and a non-single-crystal oxide semiconductor. Examples of a non-single-crystal oxide semiconductor include a CAAC-OS (c-axis aligned crystalline oxide semiconductor), a polycrystalline oxide semiconductor, an nc-OS (nanocrystalline oxide semiconductor), an amorphous-like oxide semiconductor (a-like OS), and an amorphous oxide semiconductor.

The CAAC-OS has c-axis alignment, a plurality of nanocrystals are connected in the a-b plane direction, and its crystal structure has distortion. Note that the distortion refers to a portion where the direction of a lattice arrangement changes between a region with a regular lattice arrangement and another region with a regular lattice arrangement in a region where the plurality of nanocrystals are connected.

The nanocrystal is basically a hexagon but is not always a regular hexagon and is a non-regular hexagon in some cases. Furthermore, a pentagonal or heptagonal lattice arrangement, for example, is included in the distortion in some cases. Note that it is difficult to observe a clear crystal grain boundary (also referred to as grain boundary) even in the vicinity of distortion in the CAAC-OS. That is, formation of a crystal grain boundary is inhibited by the distortion of a lattice arrangement. This is because the CAAC-OS can tolerate distortion owing to a low density of arrangement of oxygen atoms in the a-b plane direction, an interatomic bond length changed by substitution of a metal element, and the like.

Furthermore, the CAAC-OS tends to have a layered crystal structure (also referred to as a layered structure) in which a layer containing indium and oxygen (hereinafter. In layer) and a layer containing the element M, zinc, and oxygen (hereinafter, (M,Zn) layer) are stacked. Note that indium and the element M can be replaced with each other, and when the element M in the (M,Zn) layer is replaced with indium, the layer can also be referred to as an (In,M,Zn) layer. Furthermore, when indium in the In layer is replaced with the element M, the layer can be referred to as an (In,M) layer.

The CAAC-OS is a metal oxide with high crystallinity. By contrast, in the CAAC-OS, a reduction in electron mobility due to the crystal grain boundary is less likely to occur because it is difficult to observe a clear crystal grain boundary. Entry of impurities, formation of defects, or the like might decrease the crystallinity of a metal oxide; thus, it can be said that the CAAC-OS is a metal oxide that has small amounts of impurities and defects (e.g., oxygen vacancies (also referred to as Vo)). Thus, a metal oxide including a CAAC-OS is physically stable. Therefore, the metal oxide including a CAAC-OS is resistant to heat and has high reliability.

In the nc-OS, a microscopic region (for example, a region with a size greater than or equal to 1 nm and less than or equal to 10 nm, in particular, a region with a size greater than or equal to 1 nm and less than or equal to 3 nm) has a periodic atomic arrangement. Furthermore, there is no regularity of crystal orientation between different nanocrystals in the nc-OS. Thus, the orientation in the whole film is not observed. Accordingly, the nc-OS cannot be distinguished from an a-like OS or an amorphous oxide semiconductor depending on the analysis method.

Note that indium-gallium-zinc oxide (hereinafter referred to as IGZO) that is a kind of metal oxide containing indium, gallium, and zinc has a stable structure in some cases by being formed of the above-described nanocrystals. In particular, crystals of IGZO tend not to grow in the air and thus, a stable structure is obtained when IGZO is formed of smaller crystals (e.g., the above-described nanocrystals) rather than larger crystals (here, crystals with a size of several millimeters or several centimeters).

An a-like OS is a metal oxide having a structure between those of the nc-OS and an amorphous oxide semiconductor. The a-like OS includes a void or a low-density region. That is, the a-like OS has low crystallinity as compared with the nc-OS and the CAAC-OS.

An oxide semiconductor (metal oxide) can have various structures which show different properties. Two or more of the amorphous oxide semiconductor, the polycrystalline oxide semiconductor, the a-like OS, the nc-OS, and the CAAC-OS may be included in an oxide semiconductor of one embodiment of the present invention.

A metal oxide film that functions as a semiconductor layer can be formed using either or both of an inert gas and an oxygen gas. Note that there is no particular limitation on the flow rate ratio of oxygen (the partial pressure of oxygen) at the time of forming the metal oxide film. However, to obtain a transistor having high field-effect mobility, the flow rate ratio of oxygen (the partial pressure of oxygen) at the time of forming the metal oxide film is preferably higher than or equal to 0% and lower than or equal to 30%, further preferably higher than or equal to 5% and lower than or equal to 30%, still further preferably higher than or equal to 7% and lower than or equal to 15%.

The energy gap of the metal oxide is preferably 2 eV or more, further preferably 2.5 eV or more, still further preferably 3 eV or more. With the use of a metal oxide having such a wide energy gap, the off-state current of the transistor can be reduced.

The metal oxide film can be formed by a sputtering method. Alternatively, a PLD method, a PECVD method, a thermal CVD method, an ALD method, a vacuum evaporation method, or the like may be used.

As described above, the display device of one embodiment of the present invention includes, in the pixel, two capacitors that transmit visible light and overlap with each other; therefore, the pixel can achieve both a high aperture ratio and high storage capacity.

Since the display device of one embodiment of the present invention has a function of adding a correction signal to an image signal, a liquid crystal element can be driven at higher voltage than the output voltage of the source driver.

This embodiment can be combined with the other embodiments as appropriate. In this specification, in the case where a plurality of structure examples are shown in one embodiment, the structure examples can be combined as appropriate.

Embodiment 2

In this embodiment, display devices of embodiments of the present invention are described with reference to FIG. 13 to FIG. 24. The display devices described in this embodiment can be regarded as modification examples of the display devices described in Embodiment 1. Therefore, the components described in Embodiment 1 are not described in detail in some cases.

<Structure Example 3 of Display Device>

Structure examples of the display device in which the connection portion where the transistor and the pixel electrode are electrically connected to each other has a function of transmitting visible light are described with reference to FIG. 13 to FIG. 16. When the connection portion has a function of transmitting visible light, the connection portion can be provided in an opening portion of a pixel (a portion used for display). Accordingly, the aperture ratio of a pixel can be increased and the transmittance of the pixel can be increased. When the transmittance of the pixel is increased, the luminance of a backlight unit can be decreased. As a result, the power consumption of the display device can be reduced. Furthermore, high resolution of the display device can be achieved.

<<Top Surface Layout of Pixel>>

Figures 13A, 13B, 13C:
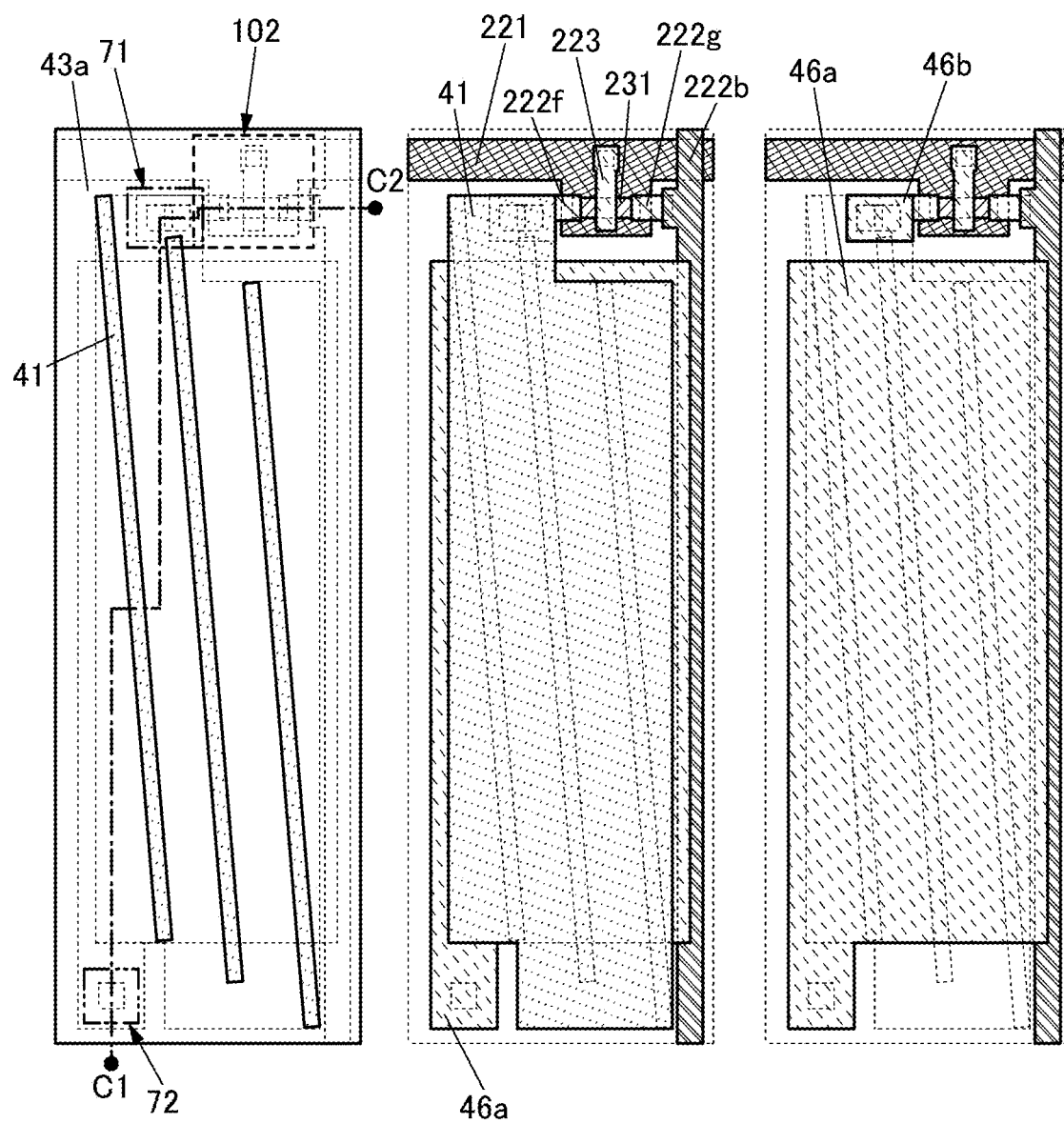
FIG. 13 Top views illustrating an example of a pixel.

FIGS. 13(A) to 13(C) are top views of a pixel. The pixel illustrated in FIGS. 13(A) to 13(C) is a modification example of the pixel illustrated in FIGS. 4(A) to 4(C). FIG. 13(A) is a top view of a stacked-layer structure from the gate 221 to the common electrode 43a, which is seen from the common electrode 43a side. FIG. 13(B) is a top view of the stacked-layer structure of FIG. 13(A) except the common electrode 43a, and FIG. 13(C) is a top view of the stacked-layer structure of FIG. 13(A) except the common electrode 43a and the pixel electrode 41.

The pixel includes the connection portion 71 and the connection portion 72. In the connection portion 71, the pixel electrode 41 is electrically connected to the transistor 102. Specifically, a conductive layer 222f functioning as the source or the drain of the transistor 102 is in contact with the conductive layer 46b, and the conductive layer 46b is in contact with the pixel electrode 41. The conductive layer 222f and a conductive layer 222g that function as the source and the drain of the transistor 102, the conductive layer 46b, and the pixel electrode 41 each have a function of transmitting visible light. That is, the connection portion 71 illustrated in FIG. 13(A) has a function of transmitting visible light. Note that the conductive layer 46b is not necessarily provided, and the conductive layer 222f may be in contact with the pixel electrode 41. In the connection portion 72, the conductive layer 46a is electrically connected to the common electrode 43a. Specifically, the conductive layer 46a is in contact with the common electrode 43a.

When a conductive material that transmits visible light is used for the conductive layer 222f functioning as the source or the drain of the transistor 102 in this manner, the connection portion 71 can be a region transmitting visible light, leading to an increase in the aperture ratio of the pixel. Thus, the power consumption of the display device can be reduced.

As illustrated in FIG. 13(B) and the like, the conductive layer 222b functioning as a signal line is electrically connected to the semiconductor layer 231 through the conductive layer 222g. Note that the conductive layer 222g is not necessarily provided, and the conductive layer 222b may be in contact with the semiconductor layer 231.

Embodiment 1 can be referred to for a conductive material that transmits visible light and can be used for the conductive layer 222f and the conductive layer 222g functioning as the source and the drain of the transistor 102. The resistivity of the conductive material that transmits visible light is sometimes higher than that of a conductive material that blocks visible light, such as copper or aluminum. A bus line such as a scan line or a signal line is preferably formed using a conductive material (metal material) with low resistivity to prevent signal delay. Note that the conductive material that transmits visible light can be used for the bus line, depending on the size of a pixel, the width of the bus line, the thickness of the bus line, and the like.

Specifically, the conductive layer 222b functioning as a signal line is preferably formed using a conductive material having low resistivity. The gate 221 also functions as a conductive layer that functions as a scan line, and thus is preferably formed using a conductive material having low resistivity. As a conductive material having low resistivity, a metal, an alloy, or the like can be used. The conductive layer 222b and the gate 221 may each be formed using a conductive material that blocks visible light.

When a conductive layer blocking visible light is used as the gate 221, irradiation of a channel formation region of the semiconductor layer 231 with light from a backlight can be inhibited. The overlapping of the channel formation region of the semiconductor layer and the conductive layer blocking visible light can reduce variations in the characteristics of the transistor due to light. Thus, the transistor can be more reliable.

The common electrode 43a illustrated in FIG. 13(A) has a top surface shape including a plurality of slits. Although FIG. 4(A) illustrates an example in which slits are provided in substantially parallel to the conductive layer 222b functioning as a signal line, the slits may be provided diagonally to the conductive layer 222b as illustrated in FIG. 13(A). The shapes of the common electrode 43a and the pixel electrode 41 (the existence of slits and the number, the size, the shape, and the like of the slits) can be set as appropriate depending on the pixel layout. It is preferable to use the connection portion 71, the connection portion 72, and a periphery region thereof as a display region as large as possible to increase the aperture ratio of the pixel.

<<Cross-Sectional Structure of Display Module>>

Figure 14:
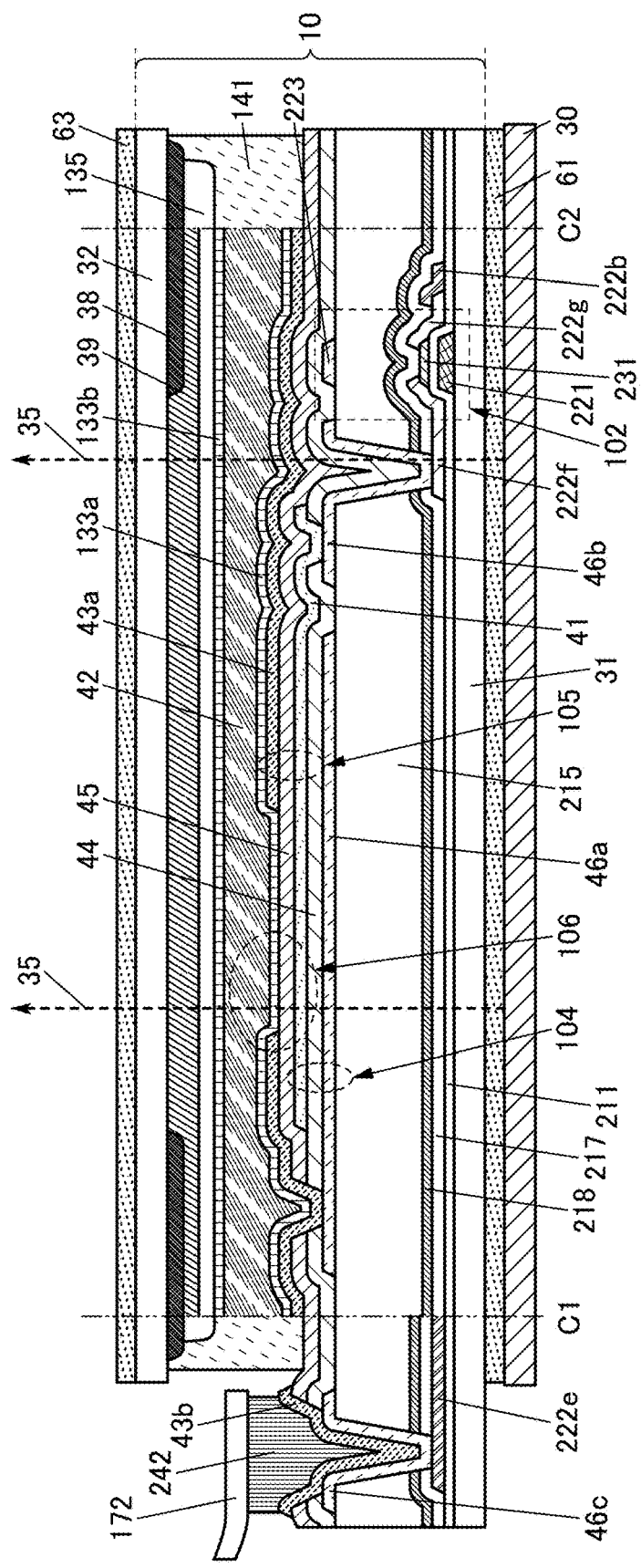
FIG. 14 A cross-sectional view illustrating an example of a display device.

FIG. 14 is a cross-sectional view of the display module. The display module illustrated in FIG. 14 is a modification example of the display module illustrated in FIG. 5. For the detailed description of the common components of the display module illustrated in FIG. 14 and the display module illustrated in FIG. 5, Embodiment 1 can be referred to. The cross-sectional structure of the pixel in FIG. 14 corresponds to a cross-sectional view taken along dashed-dotted line C1-C2 in FIG. 13(A).

The display module illustrated in FIG. 14 includes the display device 10, the polarizing plate 61, the polarizing plate 63, the backlight unit 30, the FPC 172, and the like.

The light 35 emitted from a light source of the backlight unit 30 is emitted to the outside of the display module through the polarizing plate 61, the display device 10, and the polarizing plate 63 in this order. As materials for these layers that transmit the light 35, materials transmitting visible light are used.

The display device 10 includes the coloring layer 39; thus, a color image can be displayed. In the light 35 emitted from the light source included in the backlight unit 30, light other than a particular wavelength region is absorbed by the coloring layer 39. Thus, light emitted from the red pixel (subpixel) to the outside of the display module is red, light emitted from the green pixel (subpixel) to the outside of the display module is green, and light emitted from the blue pixel (subpixel) to the outside of the display module is blue.

The display device 10 includes the substrate 31, the substrate 32, the transistor 102, the conductive layer 222b, the conductive layer 46a, the conductive layer 46b, the conductive layer 46c, the insulating layer 44, the insulating layer 45, the pixel electrode 41, the liquid crystal layer 42, the common electrode 43a, the conductive layer 43b, the conductive layer 222e, the alignment film 133a, the alignment film 133b, the adhesive layer 141, the overcoat 135, the light-blocking layer 38, the coloring layer 39, and the like.

The transistor 102 is provided over the substrate 31. The transistor 102 includes the gate 221, the gate insulating layer 211, the semiconductor layer 231, the conductive layer 222f, the conductive layer 222g, the insulating layer 217, the insulating layer 218, the insulating layer 215, and the gate 223. One of the conductive layer 222f and the conductive layer 222g functions as a source and the other functions as a drain. The insulating layer 217, the insulating layer 218, and the insulating layer 215 function as gate insulating layers. In the transistor 102 in FIG. 14, the detailed description of a part similar to that of the transistor 102 in FIG. 5 is omitted.

The conductive layer 46b is positioned over the insulating layer 215, the insulating layer 44 is positioned over the conductive layer 46b, and the pixel electrode 41 is positioned over the insulating layer 44. The pixel electrode 41 is electrically connected to the conductive layer 222f. Specifically, the conductive layer 222f is in contact with the conductive layer 46b, and the conductive layer 46b is in contact with the pixel electrode 41.

The conductive layer 222f and the conductive layer 222g are formed using a material transmitting visible light. Thus, the light 35 illustrated in FIG. 14 is emitted to the outside of the display module through the connection portion of the conductive layer 46b and the conductive layer 222f. Thus, the aperture ratio of the pixel can be increased, and the power consumption of the display device can be reduced. The conductive layer 222g is electrically connected to the conductive layer 222b functioning as a signal line.

The conductive layer 46a is positioned over the insulating layer 215. The insulating layer 44 and the insulating layer 45 are positioned over the conductive layer 46a. The common electrode 43a is positioned over the insulating layer 45. The common electrode 43a is electrically connected to the conductive layer 46a. Specifically, the common electrode 43a is in contact with the conductive layer 46a through an opening provided in the insulating layer 44 and the insulating layer 45.

The FPC 172 is electrically connected to the conductive layer 222e. The conductive layer 222e can be formed in the same process and the same material as those for the conductive layer 222b.

In each of the structure examples of the display devices described in this embodiment, the conductive layer 46a, the insulating layer 44, and the pixel electrode 41 can function as one capacitor 104. The pixel electrode 41, the insulating layer 45, and the common electrode 43a can function as one capacitor 105. The display device 10 thus includes two capacitors in one pixel. As a result, the storage capacity of the pixel can be increased. The two capacitors each include a material transmitting visible light and a region where they overlap with each other. Accordingly, the pixel can achieve high aperture ratio and high storage capacity.

Similarly, a structure having a function of transmitting visible light can be applied to a connection portion where the transistor and the pixel electrode that are included in the display module illustrated in FIG. 6 or FIG. 7 are electrically connected to each other.

<<Top Surface Layout of Pixel>>

Figures 15A, 15B, 15C:
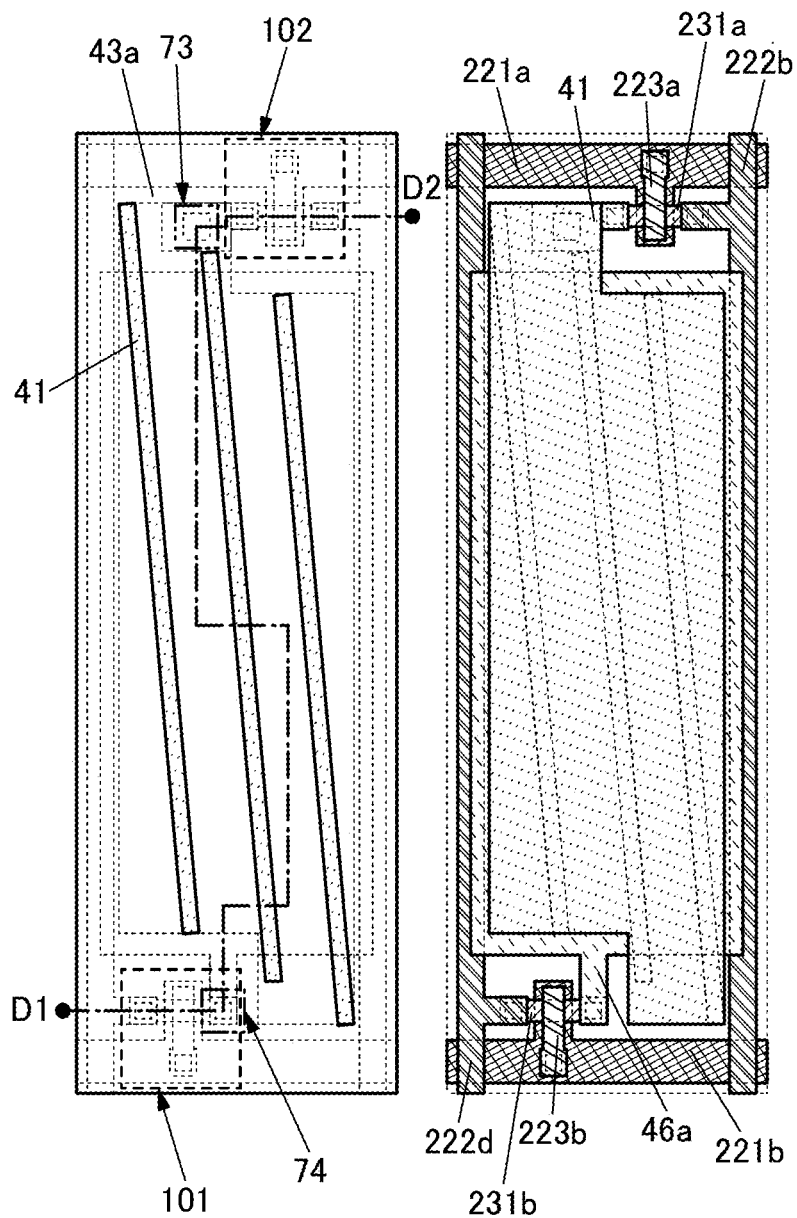
FIG. 15 Top views illustrating an example of a pixel.

FIGS. 15(A) to 15(C) are top views of a pixel. The pixel illustrated in FIG. 15(A) to 15(C) is a modification example of the pixel illustrated in FIG. 9(A) to 9(C). FIG. 15(A) is a top view of a stacked-layer structure from the gate 221a and the gate 221b to the common electrode 43a, which is seen from the common electrode 43a side. FIG. 15(B) is a top view of the stacked-layer structure of FIG. 15(A) except the common electrode 43a, and FIG. 15(C) is a top view of the stacked-layer structure of FIG. 15(A) except the common electrode 43a and the pixel electrode 41.

The pixel includes the connection portion 73 and the connection portion 74. In the connection portion 73, the pixel electrode 41 is electrically connected to the transistor 102. Specifically, low-resistance regions included in the semiconductor layer 231a in the transistor 102 are in contact with the conductive layer 46b, and the conductive layer 46b is in contact with the pixel electrode 41. The semiconductor layer 231a, the conductive layer 46b, and the pixel electrode 41 each have a function of transmitting visible light. That is, the connection portion 73 illustrated in FIG. 15(A) has a function of transmitting visible light. In the connection portion 74, the conductive layer 46a is electrically connected to the transistor 101. Specifically, low-resistance regions included in the semiconductor layer 231b in the transistor 102 are in contact with the conductive layer 46a. The conductive layer 46a and the semiconductor layer 231b each have a function of transmitting visible light. As illustrated in FIG. 15(A), the connection portion 74 may also have a function of transmitting visible light.

The semiconductor layer of the transistor is formed using a material transmitting visible light, and low-resistance regions of the semiconductor layer and the pixel electrode transmitting visible light are electrically connected to each other (a conductive layer transmitting visible light may be interposed therebetween), so that the connection portion 73 (and the connection portion 74), can be regions that transmit visible light, and the aperture ratio of the pixel can be increased. Thus, the power consumption of the display device can be reduced.

As a material that transmits visible light used for the semiconductor layer of the transistor, a metal oxide is preferably used. For the detail of the metal oxide. Embodiment 1 can be referred to.

<<Cross-Sectional Structure of Display Module>>

FIG. 16(A) is a cross-sectional view of the display module. The display module illustrated in FIG. 16(A) is a modification example of the display module illustrated in FIG. 10. For the detailed description of the common components of the display module illustrated in FIG. 16(A) and the display module illustrated in FIG. 10. Embodiment 1 can be referred to. The cross-sectional structure of the pixel in FIG. 16(A) corresponds to a cross-sectional view taken along dashed-dotted line D1-D2 in FIG. 15(A).

The display module illustrated in FIG. 16(A) includes the display device 10, the polarizing plate 61, the polarizing plate 63, the backlight unit 30, the FPC 172, and the like.

The display device 10 includes the substrate 31, the substrate 32, the transistor 102, the conductive layer 46a, the conductive layer 46b, the insulating layer 44, the insulating layer 45, the pixel electrode 41, the liquid crystal layer 42, the common electrode 43a, a the conductive layer 43b, the conductive layer 222e, the alignment film 133a, the alignment film 133b, the adhesive layer 141, the overcoat 135, the light-blocking layer 38, the coloring layer 39, and the like.

The transistor 101 and the transistor 102 are positioned over the substrate 31. The transistor 102 includes the gate 221a, the gate insulating layer 211, the semiconductor layer 231a, the conductive layer 222b, the insulating layer 212, the insulating layer 213, the gate insulating layer 225a, and the gate 223a. The transistor 101 includes the gate 221b, the gate insulating layer 211, the semiconductor layer 231b, the conductive layer 222d, the insulating layer 212, the insulating layer 213, the gate insulating layer 225b, and the gate 223b. As for the transistor 101 and the transistor 102 in FIG. 16(A), the detailed description of a part similar to that of the transistor 102 in FIG. 7 is omitted.

The conductive layer 46b is positioned over the insulating layer 215, the insulating layer 44 is positioned over the conductive layer 46b, and the pixel electrode 41 is positioned over the insulating layer 44. The pixel electrode 41 is electrically connected to one of the low-resistance regions 231n of the semiconductor layer 231a. Specifically, one of the low-resistance regions 231n of the semiconductor layer 231a is in contact with the conductive layer 46b, and the conductive layer 46b is in contact with the pixel electrode 41. The other of the low-resistance region 231n of the semiconductor layer 231a is electrically connected to the conductive layer 222b functioning as a signal line.

The light 35 illustrated in FIG. 16(A) transmits a connection portion of the conductive layer 46b and the low-resistance region 231n, and is emitted to the outside of the display module. Thus, the aperture ratio of the pixel can be increased, and the power consumption of the display device can be reduced.

The conductive layer 46a is positioned over the insulating layer 215. In FIG. 16(A), the conductive layer 46a is electrically connected to one of the low-resistance regions 231n of the semiconductor layer 231b. Specifically, the conductive layer 46a is in contact with the one of the low-resistance regions 231n of the semiconductor layer 231b through an opening provided in the insulating layer 212, the insulating layer 213, the insulating layer 214, and the insulating layer 215. The other of the low-resistance regions 231n of the semiconductor layer 231b is electrically connected to the conductive layer 222d functioning as a signal line.

The light 35 illustrated in FIG. 16(A) transmits a connection portion of the conductive layer 46a and the low-resistance region 231n, and is emitted to the outside of the display module. Thus, the aperture ratio of the pixel can be increased, and the power consumption of the display device can be further reduced.

The pixel may include a connection portion that overlaps with the light-blocking layer 38 like the connection portion of the semiconductor layer 231b and the conductive layer 46a illustrated in FIG. 16(B) (corresponding to the connection portion 74 in FIG. 15(A)). In other words, in the case where the pixel included in the display device of one embodiment of the present invention includes a first connection portion and a second connection portion, the display device may have a structure in which the light 35 is emitted to the outside of the display module through the first connection portion, and the light 35 is not emitted to the outside of the display module through the second connection portion. As illustrated in FIG. 10, the conductive layer 46a may be in contact with the conductive layer 222c through an opening provided in the insulating layer 214 and the insulating layer 215.

The FPC 172 is electrically connected to the conductive layer 222e. The conductive layer 222e can be formed in the same process and the same material as those for the conductive layer 222b and the conductive layer 222d.

Similarly, a structure having a function of transmitting visible light can be applied to a connection portion where the transistor and the pixel electrode that are included in the display module illustrated in FIG. 11 or FIG. 12 are electrically connected to each other.

<Structure Example 4 of Display Device>

Structure examples of a display device having a function of performing display by a field-sequential driving method are described with reference to FIG. 17 to FIG. 20. A field-sequential driving method performs color display by time division. Specifically, light-emitting elements of red, green, blue, and the like are sequentially emitted at different timings, and the pixels are driven in synchronization with the above, so that, color display is performed on the basis of a successive additive color mixing method.

In the case of employing a field-sequential driving method, one pixel does not need to include subpixels of different colors; thus, the aperture ratio of a pixel can be increased. Moreover, the resolution of the display device can be increased. In addition, since a coloring layer such as a color filter is unnecessary, light is not absorbed by the coloring layer, so that the transmittance of a pixel can be improved. Accordingly, needed luminance can be obtained with low power; thus, low power consumption is possible. Furthermore, the manufacturing process of the display device can be simplified and the manufacturing cost can be reduced.

In the case of employing a field-sequential driving method, a high frame frequency is required. Since the display device of one embodiment of the present invention includes two capacitors in one pixel, the storage capacity of the pixel can be increased and a high voltage can be supplied to a liquid crystal element; thus, the response speed of the liquid crystal element can be increased. For example, the response speed of the liquid crystal element can be improved by overdriving in which a voltage applied to a liquid crystal element is temporarily increased so that the alignment of liquid crystals is changed rapidly. Therefore, it can be said that the display device of one embodiment of the present invention is favorable in application of a field-sequential driving method in which a high frame frequency is required.

The rotational viscosity coefficient of the liquid crystal material is preferably low because the response of the liquid crystal element can be quick. Specifically, the rotational viscosity coefficient of the liquid crystal material is preferably higher than or equal to 10 mPa-sec and lower than or equal to 150 mPa·sec.

In the case of an FFS mode used in the display device of this embodiment, a positive liquid crystal material is preferably used because the response of the liquid crystal can be quick as compared with a negative liquid crystal material. In the case of using a positive liquid crystal material, the rubbing angle (angle between the long side of the slit and the rubbing orientation) of the alignment film is preferably greater than or equal to 15° and less than or equal to 45°. If the rubbing angle is large, the response of the liquid crystal can be quick; however, the driving voltage is increased in some cases. Since a high voltage can be supplied to a liquid crystal element in the display device of one embodiment of the present invention, high display quality can be achieved even when the rubbing angle is increased.

In the case of using a negative liquid crystal material, the rubbing angle of the alignment film is preferably greater than or equal to 45° and less than or equal to 75°.

The thickness (cell gap) of the liquid crystal layer is preferably small, in which case the response of the liquid crystal can be quick. For example, in the case of employing a field-sequential driving method, the cell gap is preferably greater than or equal to 1 μm and less than or equal to 2.5 μm. For example, the minimum value of the thickness of the liquid crystal layer in one pixel is preferably greater than or equal to 1 μm and less than or equal to 2.5 μm. Alternatively, the height of a member (also referred to as a spacer) having a function of adjusting a cell gap is preferably greater than or equal to 1 μm and less than or equal to 2.5 μm.

Moreover, the liquid crystal exhibiting a blue phase is preferable because of its high response speed. The display device of this embodiment is preferably used when a liquid crystal exhibiting a blue phase is used because the liquid crystal element can be driven with application of high voltage.

<<Top Surface Layout of Pixel>>

Figure 17A:
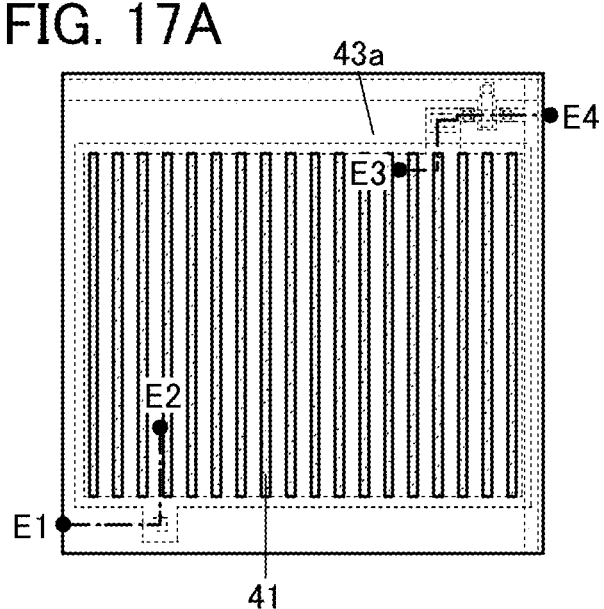
FIG. 17 Top views illustrating an example of a pixel.
Figure 17C:
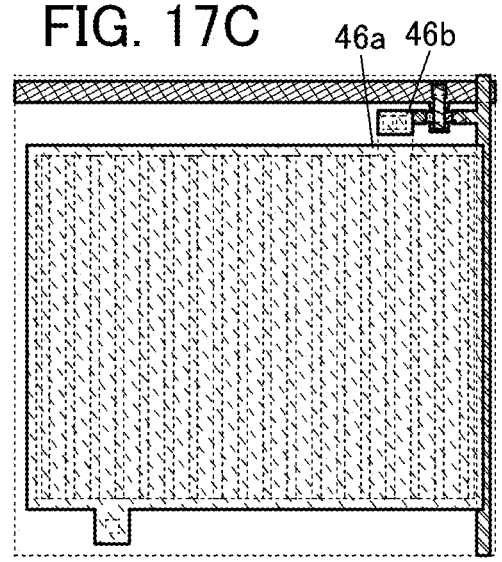
Figure 17B:
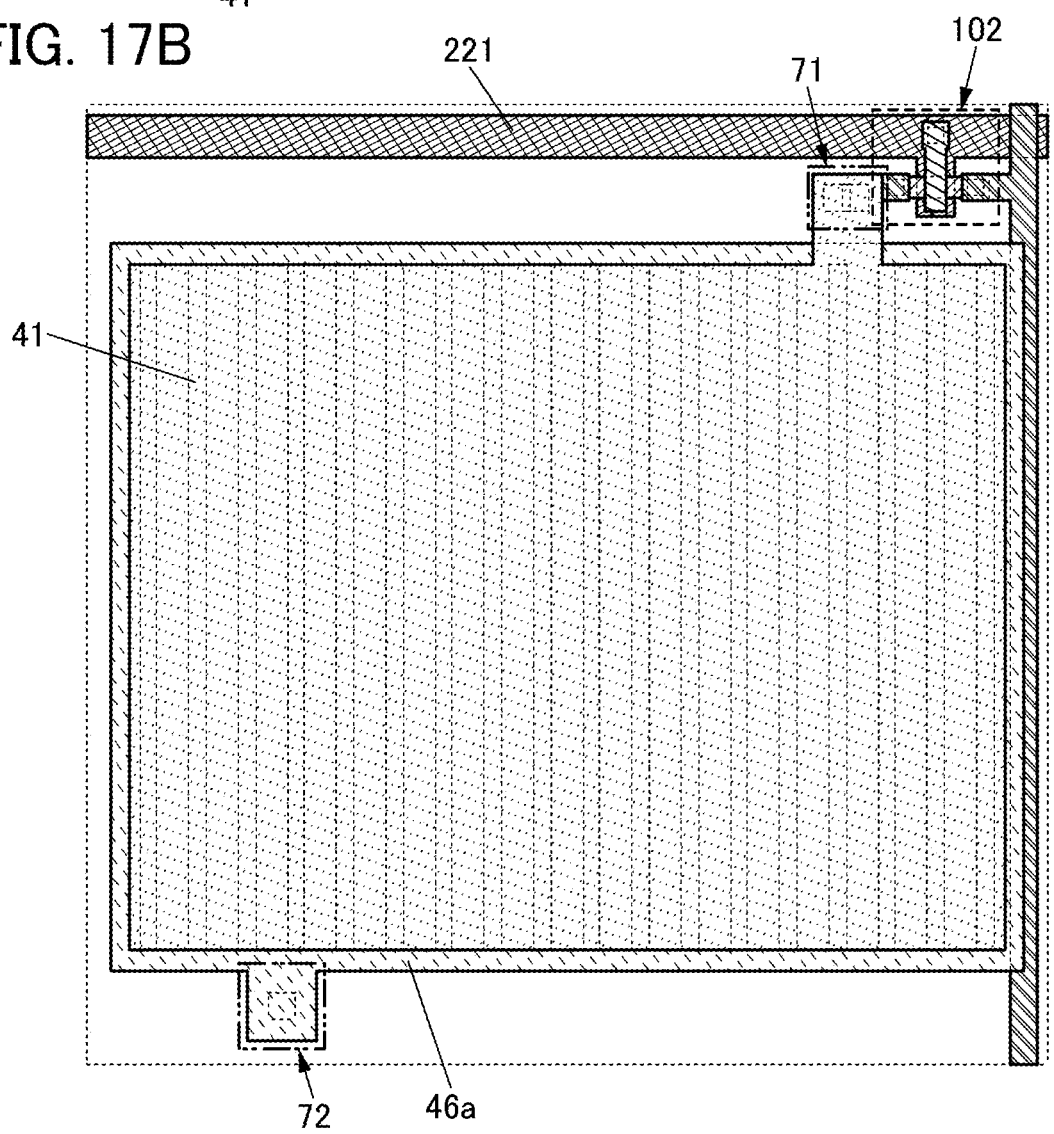

FIGS. 17(A) to 17(C) are top views of a pixel. The pixel illustrated in FIG. 17(A) to 17(C) is a modification example of the pixel illustrated in FIGS. 4(A) to 4(C). FIG. 17(A) is a top view of a stacked-layer structure from the gate 221 to the common electrode 43a, which is seen from the common electrode 43a side. FIG. 17(B) is a top view of the stacked-layer structure of FIG. 17(A) except the common electrode 43a, and FIG. 17(C) is a top view of the stacked-layer structure of FIG. 17(A) except electrode 43a and the pixel electrode 4.

The pixel illustrated in FIGS. 17(A) to 17(C) includes, like the pixel illustrated in FIGS. 4(A) to 4(C), the connection portion 71, the connection portion 72, the transistor 102, the pixel electrode 41, the common electrode 43a, the conductive layer 46a, and the like. The pixel illustrated in FIGS. 4(A) to 4(C) corresponds to one of the plurality of subpixels included in the pixel. In contrast, the pixel illustrated in FIGS. 17(A) to 17(C) corresponds to one pixel that does not include a subpixel. Accordingly, the aperture ratio of the pixel can be increased.

<<Cross-Sectional Structure of Display Module>>

Figure 18:
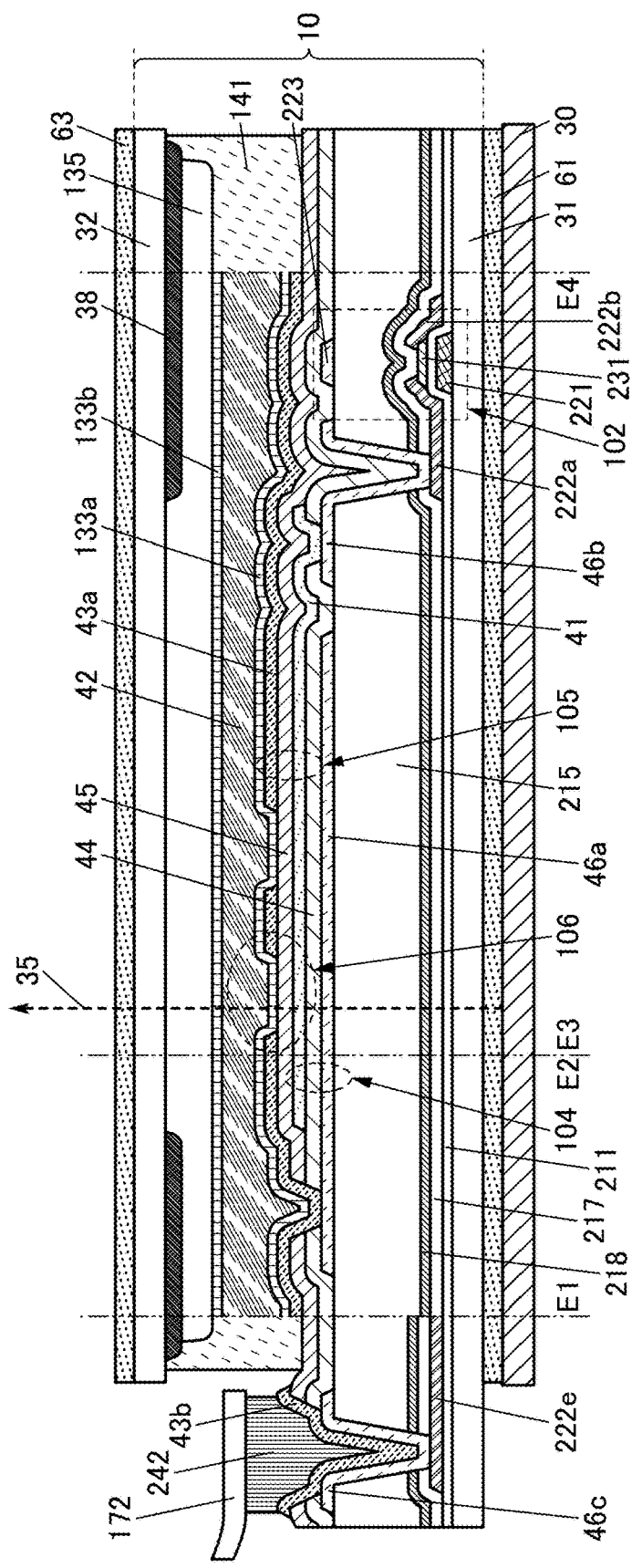
FIG. 18 A cross-sectional view illustrating an example of a display device.

FIG. 18 is a cross-sectional view of the display module. The display module illustrated in FIG. 18 is a modification example of the display module illustrated in FIG. 5. For the detailed description of the common components of the display module illustrated in FIG. 18 and the display module illustrated in FIG. 5, Embodiment 1 can be referred to. The cross-sectional structure of the pixel in FIG. 18 corresponds to cross-sectional views taken along dashed-dotted line E1-E2 and dashed-dotted line E3-E4 in FIG. 17(A).

The display module illustrated in FIG. 18 includes the display device 10, the polarizing plate 61, the polarizing plate 63, the backlight unit 30, the FPC 172, and the like.

The light 35 emitted from a light source included in the backlight unit 30 is transmitted through the polarizing plate 61, the display device 10, and the polarizing plate 63, in this order, and is emitted to the outside of the display module. As materials for these layers that transmit the light 35, materials transmitting visible light are used.

The display device 10 illustrated in FIG. 18 can display a color image using the field-sequential driving method. Thus, the display device 10 illustrated in FIG. 18 does not include a coloring layer such as a color filter. Therefore, the transmittance of the pixel can be improved.

As the backlight unit 30, light-emitting diodes (LEDs) of three colors of red, green, and blue can be used, for example.

The display device 10 includes the substrate 31, the substrate 32, the transistor 102, the conductive layer 46a, the conductive layer 46b, the conductive layer 46c, the insulating layer 44, the insulating layer 45, the pixel electrode 41, the liquid crystal layer 42, the common electrode 43a, the conductive layer 43b, the conductive layer 222e, the alignment film 133a, the alignment film 133b, the adhesive layer 141, the overcoat 135, the light-blocking layer 38, and the like.

The transistor 102 is provided over the substrate 31. The structure of the transistor 102 is similar to that in FIG. 5.

The conductive layer 46b is positioned over the insulating layer 215, the insulating layer 44 is positioned over the conductive layer 46b, and the pixel electrode 41 is positioned over the insulating layer 44. The pixel electrode 41 is electrically connected to the conductive layer 222a. Specifically, the conductive layer 222a is in contact with the conductive layer 46b, and the conductive layer 46b is in contact with the pixel electrode 41.

The conductive layer 46a is positioned over the insulating layer 215. The insulating layer 44 and the insulating layer 45 are positioned over the conductive layer 46a. The common electrode 43a is positioned over the insulating layer 45. The common electrode 43a is electrically connected to the conductive layer 46a. Specifically, the common electrode 43a is in contact with the conductive layer 46a through an opening provided in the insulating layer 44 and the insulating layer 45.

The light-blocking layer 38 is provided with the substrate 32 and the overcoat 135 is provided to cover the light-blocking layer 38. The alignment film 133b is provided in contact with the overcoat 135. The alignment film 133a is provided over the common electrode 43a. The liquid crystal layer 42 is sandwiched between the alignment film 133a and the alignment film 133b. The overcoat 135 can inhibit the diffusion of impurities contained in the light-blocking layer 38 and the like into the liquid crystal layer 42.

Similarly, a structure having a function of performing display by the field-sequential driving method can also be employed for the display device included in the display module illustrated in FIG. 6 or FIG. 7.

<<Top Surface Layout of Pixel>>

Figure 19A:
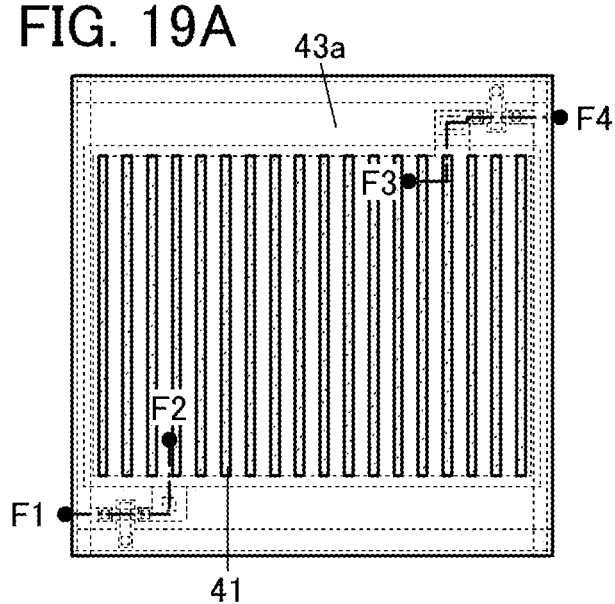
FIG. 19 Top views illustrating an example of a pixel.
Figure 19C:
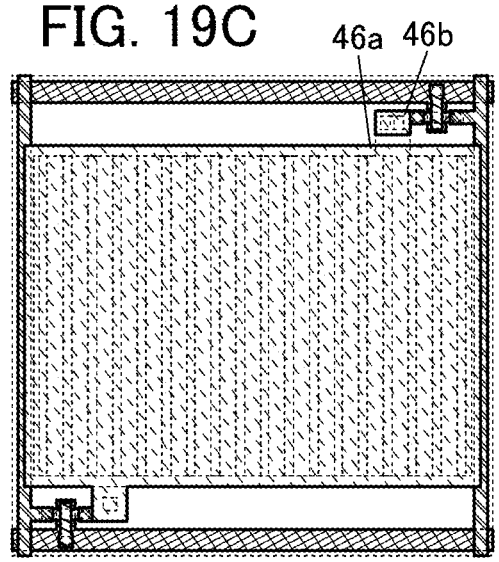
Figure 19B:
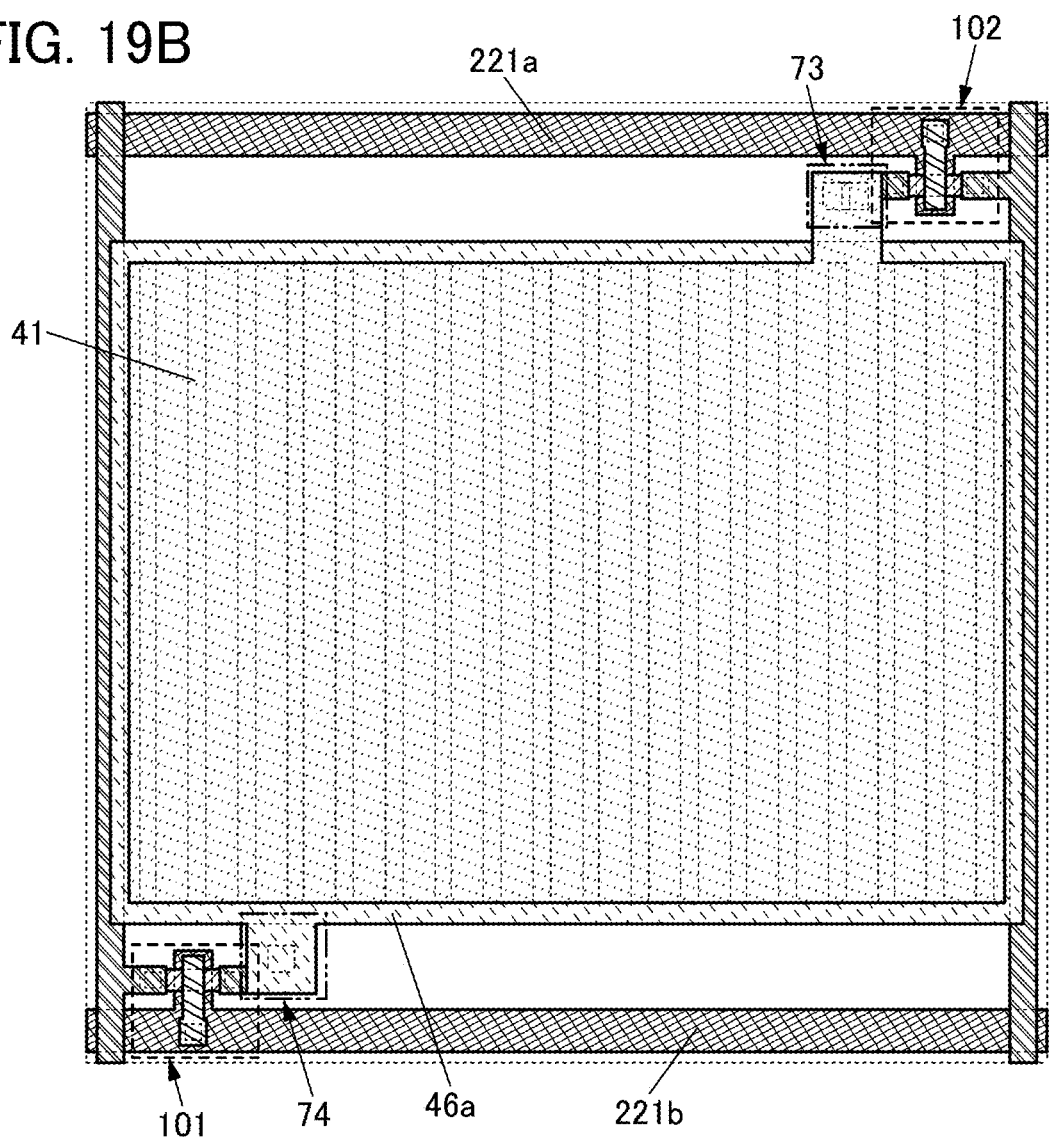

FIGS. 19(A) to 19(C) are top views of a pixel. The pixel illustrated in FIG. 19(A) to 19(C) is a modification example of the pixel illustrated in FIGS. 9(A) to 9(C). FIG. 19(A) is a top view of a stacked-layer structure from the gate 221a and the gate 221b to the common electrode 43a, which is seen from the common electrode 43a side. FIG. 19(B) is a top view of the stacked-layer structure of FIG. 19(A) except the common electrode 43, and FIG. 19(C) is a top view of the stacked-layer structure of FIG. 19(A) except the common electrode 43a and the pixel electrode 41.

The pixel illustrated in FIGS. 19(A) to 19(C) includes, like the pixels illustrated in FIGS. 9(A) to 9(C), the connection portion 73, the connection portion 74, the transistor 101, the transistor 102, the pixel electrode 41, the common electrode 43a, the conductive layer 46a, and the like. The pixel illustrated in FIGS. 9(A) to 9(C) is one of the plurality of subpixels included in the pixel. In contrast, the pixel illustrated in FIGS. 19(A) to 19(C) corresponds to one pixel that does not include a subpixel. Accordingly, the aperture ratio of the pixel can be increased.

<<Cross-Sectional Structure of Display Module>>

Figure 20:
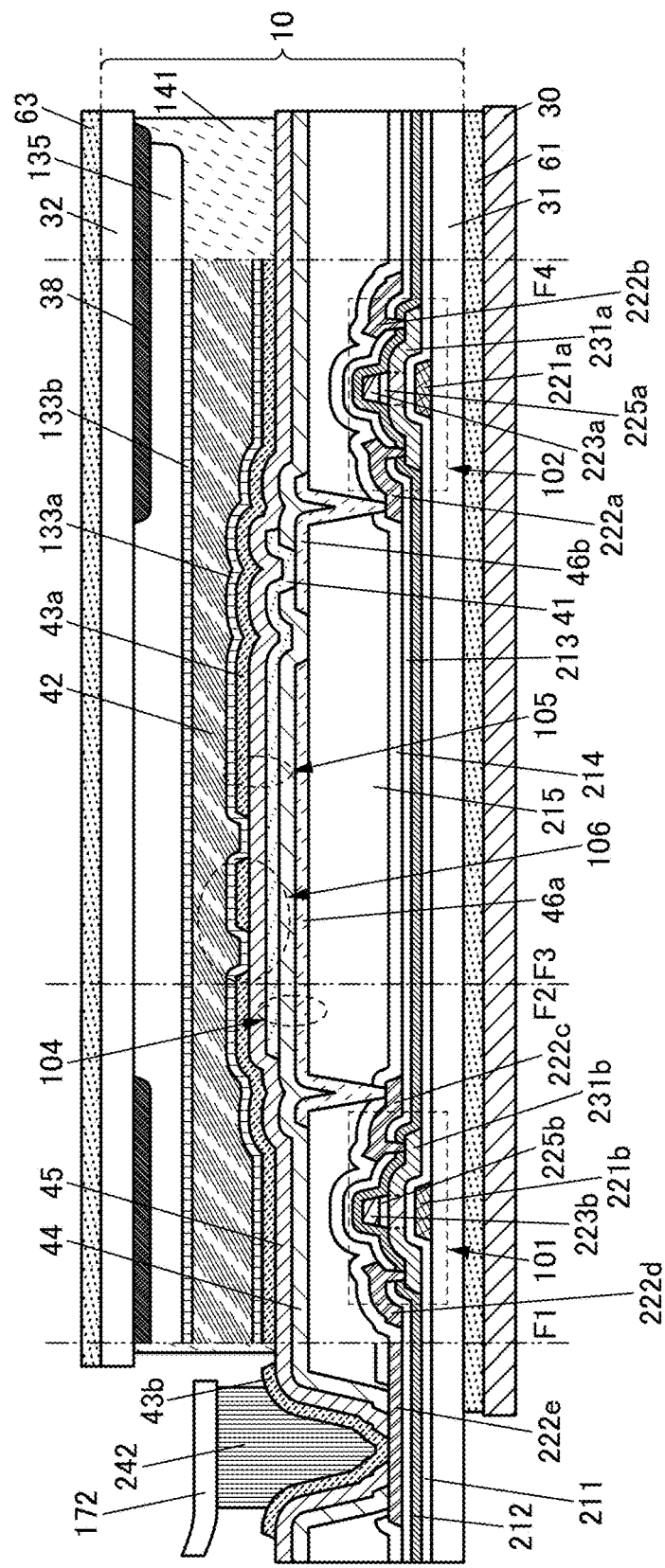
FIG. 20 A cross-sectional view illustrating an example of a display device.

FIG. 20 is a cross-sectional view of the display module. The display module illustrated in FIG. 20 is a modification example of the display module illustrated in FIG. 10. For the detailed description of the common components of the display module illustrated in FIG. 20 and the display module illustrated in FIG. 10, Embodiment 1 can be referred to. The cross-sectional structure of the pixel in FIG. 20 corresponds to cross-sectional views taken along dashed-dotted line F1-F2 and dashed-dotted line F3-F4 in FIG. 19(A).

The display module illustrated in FIG. 20 includes the display device 10, the polarizing plate 61, the polarizing plate 63, the backlight unit 30, the FPC 172, and the like.

The display device 10 illustrated in FIG. 20 can display a color image using the field-sequential driving method. Thus, the display device 10 illustrated in FIG. 20 does not include a coloring layer such as a color filter. Therefore, the transmittance of the pixel can be improved.

The display device 10 includes the substrate 31, the substrate 32, the transistor 102, the conductive layer 46a, the conductive layer 46b, the insulating layer 44, the insulating layer 45, the pixel electrode 41, the liquid crystal layer 42, the common electrode 43a, the conductive layer 43b, the conductive layer 222e, the alignment film 133a, the alignment film 133b, the adhesive layer 141, the overcoat 135, the light-blocking layer 38, and the like.

The transistor 101 and the transistor 102 are positioned over the substrate 31. The structures of the transistor 101 and the transistor 102 are similar to those in FIG. 10.

Similarly, a structure having a function of performing display by the field-sequential driving method in the display device included in the display module illustrated in FIG. 11 or FIG. 12 can also be employed.

<Structure Example 5 of Display Device>

Structure examples of a display device which has a function of performing display by the field-sequential driving method and in which a connection portion where a transistor and a pixel electrode are electrically connected to each other has a function of transmitting visible light are described with reference to FIG. 21 to FIG. 24.

As described above, in the case where the field-sequential driving method is used, the aperture ratio of the pixel can be increased and the transmittance of the pixel can be improved. In addition, when the connection portion where the transistor and the pixel electrode are electrically connected to each other transmits visible light, the aperture ratio of the pixel and the transmittance of the pixel can be further increased.

For the structures illustrated in FIG. 21 to FIG. 24, for the detailed description of the structures common to those in the above-described drawings, the above description can be referred to.

<<Op Surface Layout of Pixel>>

Figure 21A:
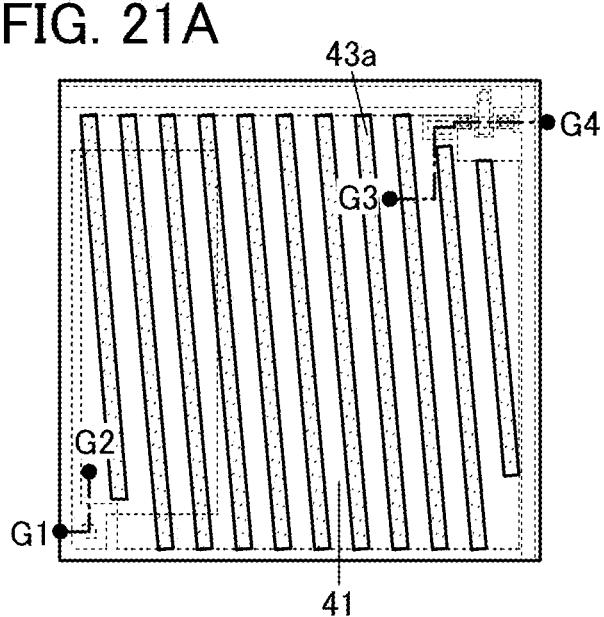
FIG. 21 Top views illustrating an example of a pixel.
Figure 21C:
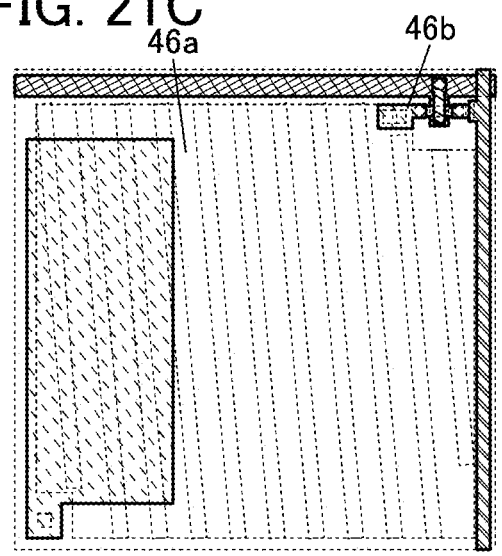
Figure 21B:
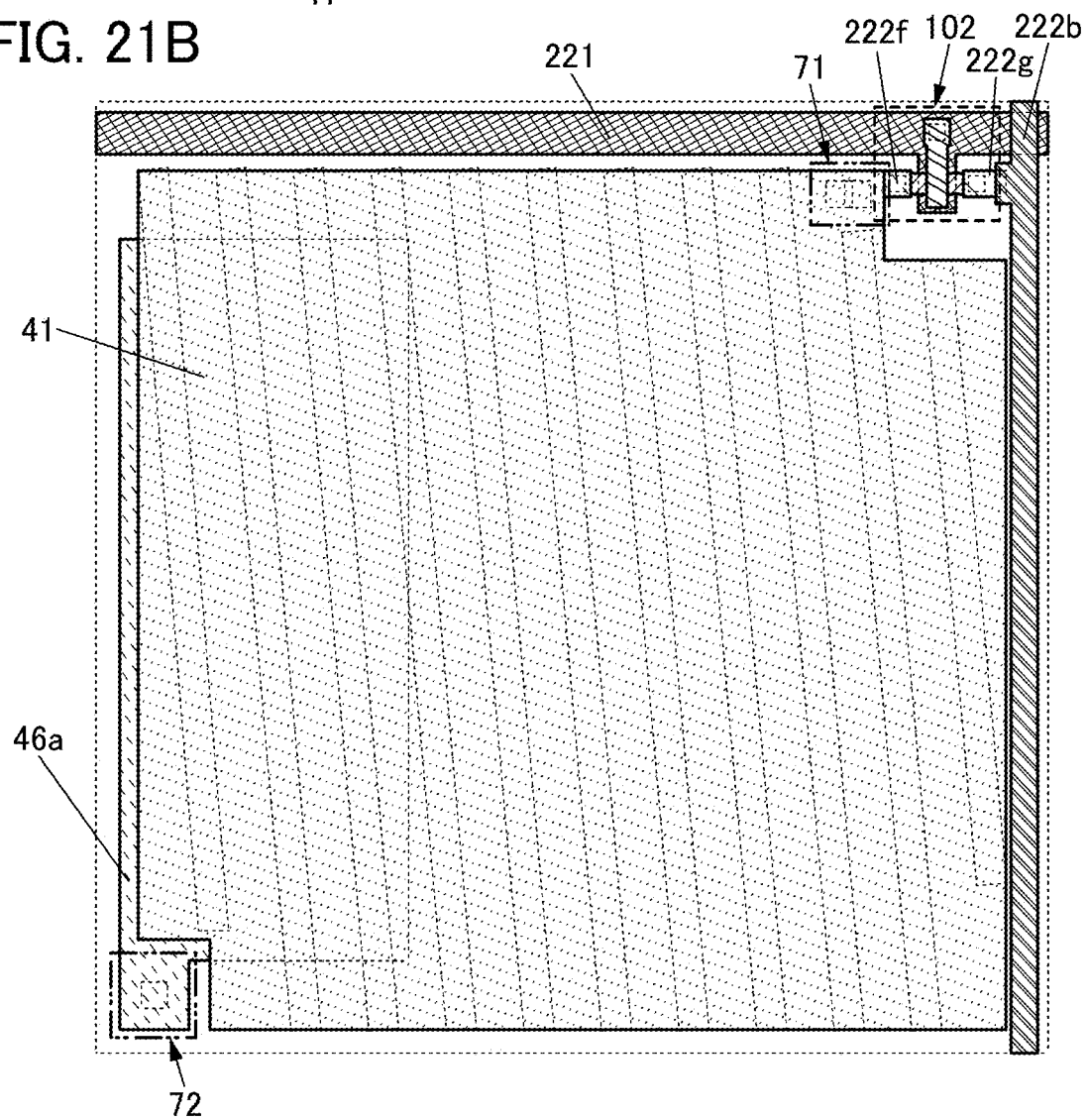

FIGS. 21(A) to 21(C) are top views of a pixel. The pixel illustrated in FIG. 21(A) to 21(C) is a modification example of the pixel illustrated in FIGS. 17(A) to 17(C). FIG. 21(A) is a top view of a stacked-layer structure from the gate 221 to the common electrode 43a, which is seen from the common electrode 43a side. FIG. 21(B) is atop view of the stacked-layer structure of FIG. 21(A) except the common electrode 43a, and FIG. 21(C) is atop view of the stacked-layer structure of FIG. 21(A) except the common electrode 43a and the pixel electrode 41.

The pixel includes the connection portion 71 and the connection portion 72. In the connection portion 71, the pixel electrode 41 is electrically connected to the transistor 102. Specifically, the conductive layer 222f functioning as the source or the drain of the transistor 102 is in contact with the conductive layer 46b, and the conductive layer 46b is in contact with the pixel electrode 41. The conductive layer 222f, the conductive layer 46b, and the pixel electrode 41 each have a function of transmitting visible light. That is, the connection portion 71 illustrated in FIG. 21(A) has a function of transmitting visible light. Note that the conductive layer 46b is not necessarily provided, and the conductive layer 222f may be in contact with the pixel electrode 41. In the connection portion 72, the conductive layer 46a is electrically connected to the common electrode 43a. Specifically, the conductive layer 46a is in contact with the common electrode 43a.

When a conductive material that transmits visible light is used for the conductive layer 222f functioning as the source or the drain of the transistor 102, the connection portion 71 can be a region transmitting visible light, leading to an increase in the aperture ratio of the pixel. Thus, the power consumption of the display device can be reduced.

Note that an example in which most regions except the connection portion 71 of the pixel electrode 41 and the periphery thereof overlap with the conductive layer 46a is shown in FIGS. 17(A) to 17(C), and an example in which only part of a region of the pixel electrode 41 overlaps with the conductive layer 46a is shown in FIGS. 21(A) to 21(C). The top surface layout of the conductive layer 46a can be set as appropriate depending on the storage capacity of the capacitor 104. For example, the conductive layer 46a may have a slit. Similarly, the top surface layout of the pixel electrode 41 can be set as appropriate depending on the storage capacity of the capacitor 104 and the capacitor 105. For example, the pixel electrode 41 may have a slit.

<<Cross-Sectional Structure of Display Module>>

Figure 22:
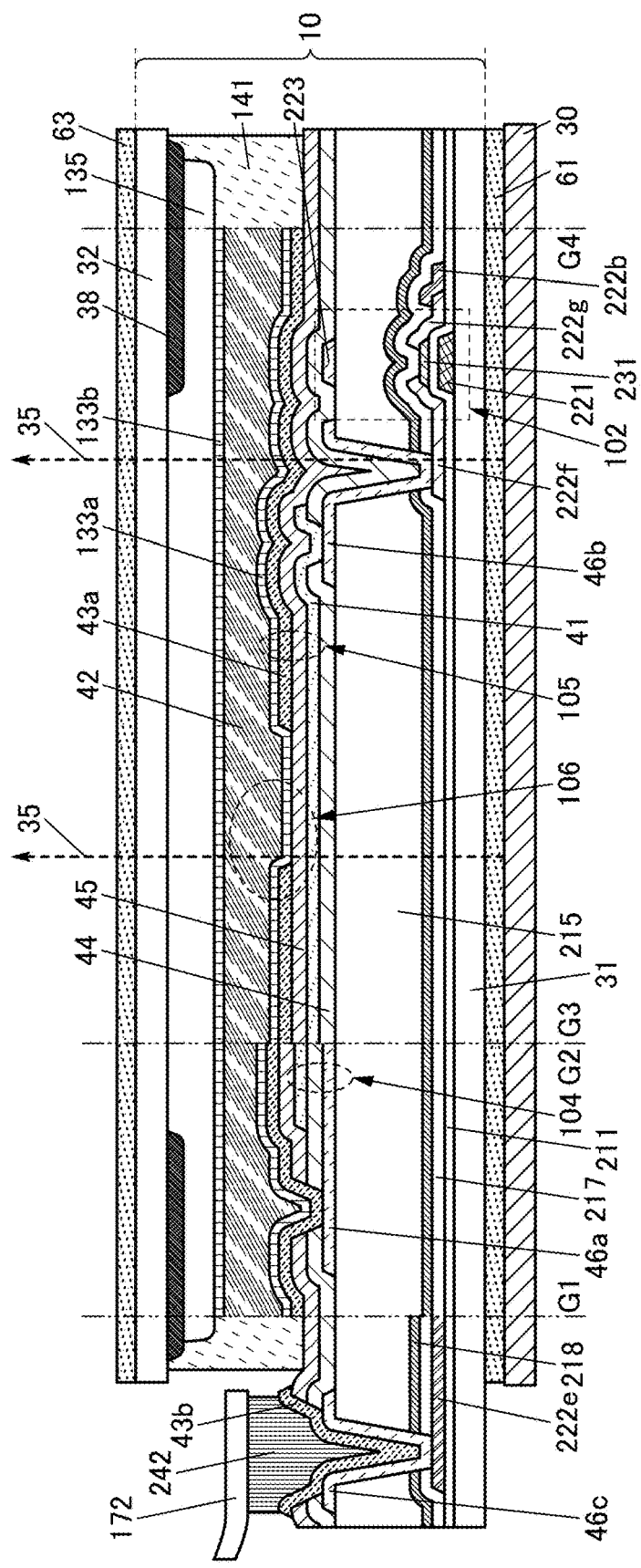
FIG. 22 A cross-sectional view illustrating an example of a display device.

FIG. 22 is a cross-sectional view of the display module. The cross-sectional structure of the pixel in FIG. 22 corresponds to cross-sectional views taken along dashed-dotted line G1-G2 and dashed-dotted line G3-G4 in FIG. 21(A).

The display module illustrated in FIG. 22 includes the display device 10, the polarizing plate 61, the polarizing plate 63, the backlight unit 30, the FPC 172, and the like.

The light 35 emitted from a light source included in the backlight unit 30 is transmitted through the polarizing plate 61, the display device 10, and the polarizing plate 63, in this order, and is emitted to the outside of the display module. As materials for these layers that transmit the light 35, materials transmitting visible light are used.

The display device 10 illustrated in FIG. 22 can display a color image using the field-sequential driving method. Thus, the display device 10 illustrated in FIG. 22 does not include a coloring layer such as a color filter. Therefore, the transmittance of the pixel can be improved.

The display device 10 includes the substrate 31, the substrate 32, the transistor 102, the conductive layer 222b, the conductive layer 46a, the conductive layer 46b, the conductive layer 46c, the insulating layer 44, the insulating layer 45, the pixel electrode 41, the liquid crystal layer 42, the common electrode 43a, the conductive layer 43b, the conductive layer 222e, the alignment film 133a, the alignment film 133b, the adhesive layer 141, the overcoat 135, the light-blocking layer 38, and the like.

The transistor 102 is positioned over the substrate 31. The structure of the transistor 102 is similar to that in FIG. 14.

The conductive layer 46b is positioned over the insulating layer 215, the insulating layer 44 is positioned over the conductive layer 46b, and the pixel electrode 41 is positioned over the insulating layer 44. The pixel electrode 41 is electrically connected to the conductive layer 222f. Specifically, the conductive layer 222f is in contact with the conductive layer 46b, and the conductive layer 46b is in contact with the pixel electrode 41.

The conductive layer 222f and the conductive layer 222g are formed using a conductive material transmitting visible light. Thus, the light 35 illustrated in FIG. 22 is emitted to the outside of the display module through a connection portion of the conductive layer 46b and the conductive layer 222f. Thus, the aperture ratio of the pixel can be increased, and the power consumption of the display device can be reduced. The conductive layer 222g is electrically connected to the conductive layer 222b functioning as a signal line.

The conductive layer 46a is positioned over the insulating layer 215. The insulating layer 44 and the insulating layer 45 are positioned over the conductive layer 46a. The common electrode 43a is positioned over the insulating layer 45. The common electrode 43a is electrically connected to the conductive layer 46a. Specifically, the common electrode 43a is in contact with the conductive layer 46a through an opening provided in the insulating layer 44 and the insulating layer 45.

The light-blocking layer 38 is provided with the substrate 32 and the overcoat 135 is provided to cover the light-blocking layer 38. The alignment film 133b is provided in contact with the overcoat 135. The alignment film 133a is provided over the common electrode 43a. The liquid crystal layer 42 is sandwiched between the alignment film 133a and the alignment film 133b. The overcoat 135 can inhibit the diffusion of impurities contained in the light-blocking layer 38, and the like into the liquid crystal layer 42.

The FPC 172 is electrically connected to the conductive layer 222e. The conductive layer 222e can be formed in the same process and the same material as those for the conductive layer 222b.

<<Top Surface Layout of Pixel>>

Figure 23A:
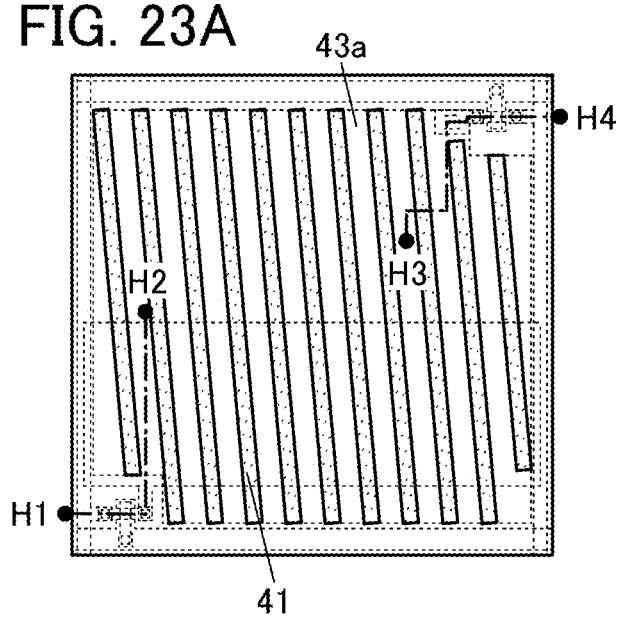
FIG. 23 Top views illustrating an example of a pixel.
Figure 23C:
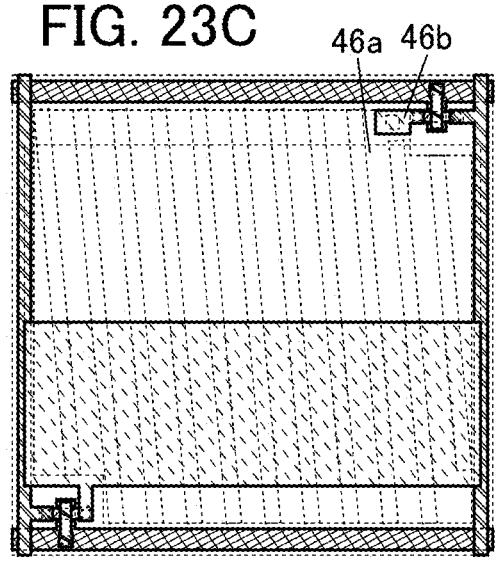
Figure 23B:
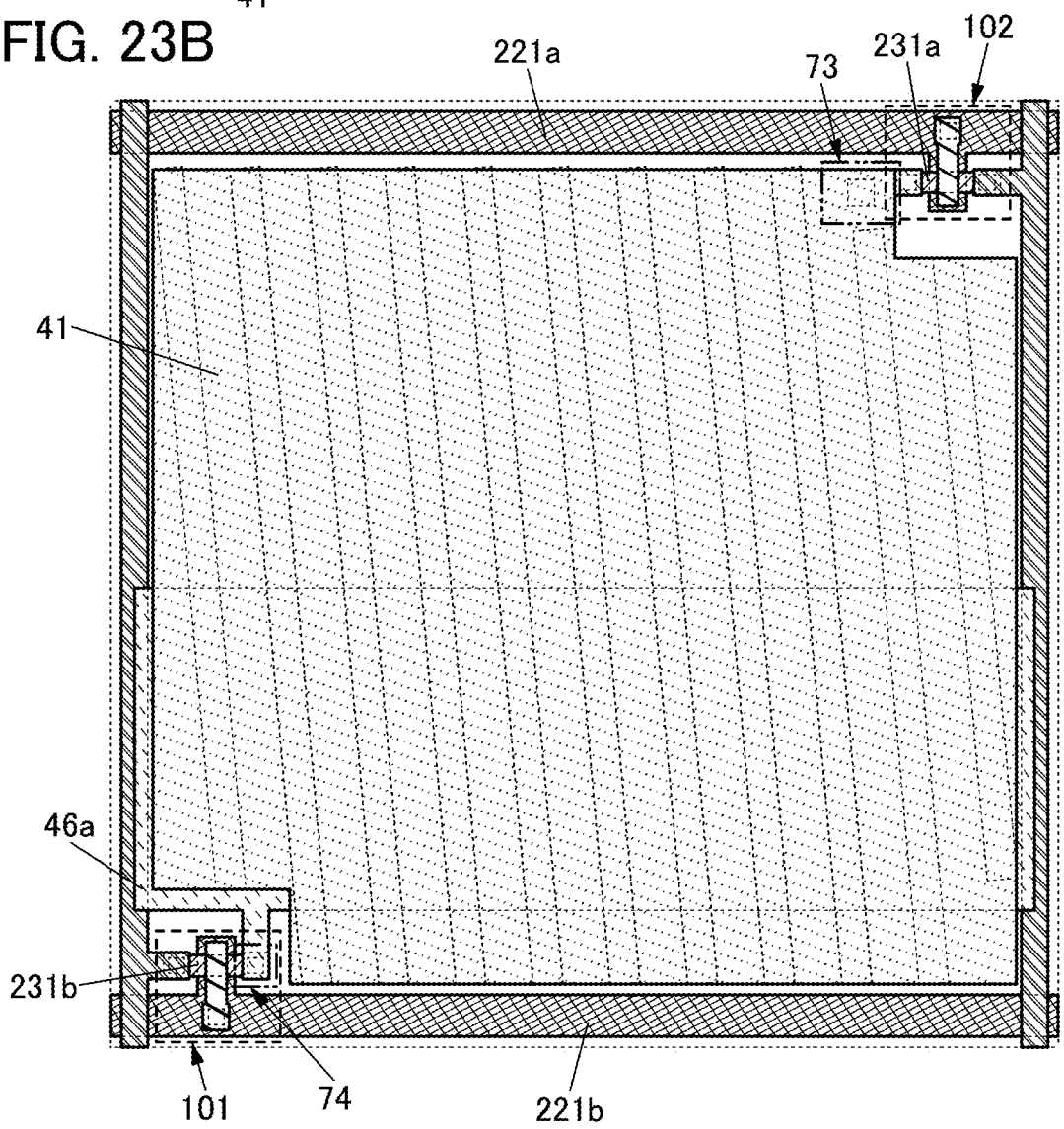

FIGS. 23(A) to 23(C) are top views of a pixel. The pixel illustrated in FIG. 23(A) to 23(C) is a modification example of the pixel illustrated in FIG. 19(A) to 19(C). FIG. 23(A) is a top view of a stacked-layer structure from the gate 221a and the gate 221b to the common electrode 43a, which is seen from the common electrode 43a side. FIG. 23(B) is a top view of the stacked-layer structure of FIG. 23(A) except the common electrode 43a, and FIG. 23(C) is a top view of the stacked-layer structure of FIG. 23(A) except the common electrode 43a and the pixel electrode 41.

The pixel includes the connection portion 73 and the connection portion 74. In the connection portion 73, the pixel electrode 41 is electrically connected to the transistor 102. Specifically, low-resistance regions included in the semiconductor layer 231a in the transistor 102 are in contact with the conductive layer 46b, and the conductive layer 46b is in contact with the pixel electrode 41. The semiconductor layer 231a, the conductive layer 46b, and the pixel electrode 41 each have a function of transmitting visible light. That is, the connection portion 73 illustrated in FIG. 23(A) has a function of transmitting visible light. In the connection portion 74, the conductive layer 46a is electrically connected to the transistor 101. Specifically, low-resistance regions included in the semiconductor layer 231b in the transistor 102 are in contact with the conductive layer 46a. The conductive layer 46a and the semiconductor layer 231b each have a function of transmitting visible light. As illustrated in FIG. 23(A), the connection portion 74 may also have a function of transmitting visible light.

The semiconductor layer of the transistor is formed using a material transmitting visible light, and low-resistance regions of the semiconductor layer and the pixel electrode transmitting visible light are electrically connected to each other (a conductive layer transmitting visible light may be interposed therebetween), so that the connection portion 73 (and the connection portion 74), can be regions that transmit visible light, and the aperture ratio of the pixel can be increased. Thus, the power consumption of the display device can be reduced.

As a material that transmits visible light used for the semiconductor layer of the transistor, a metal oxide is preferably used. For the detail of the metal oxide. Embodiment 1 can be referred to.

<<Cross-Sectional Structure of Display Module>>

Figure 24:
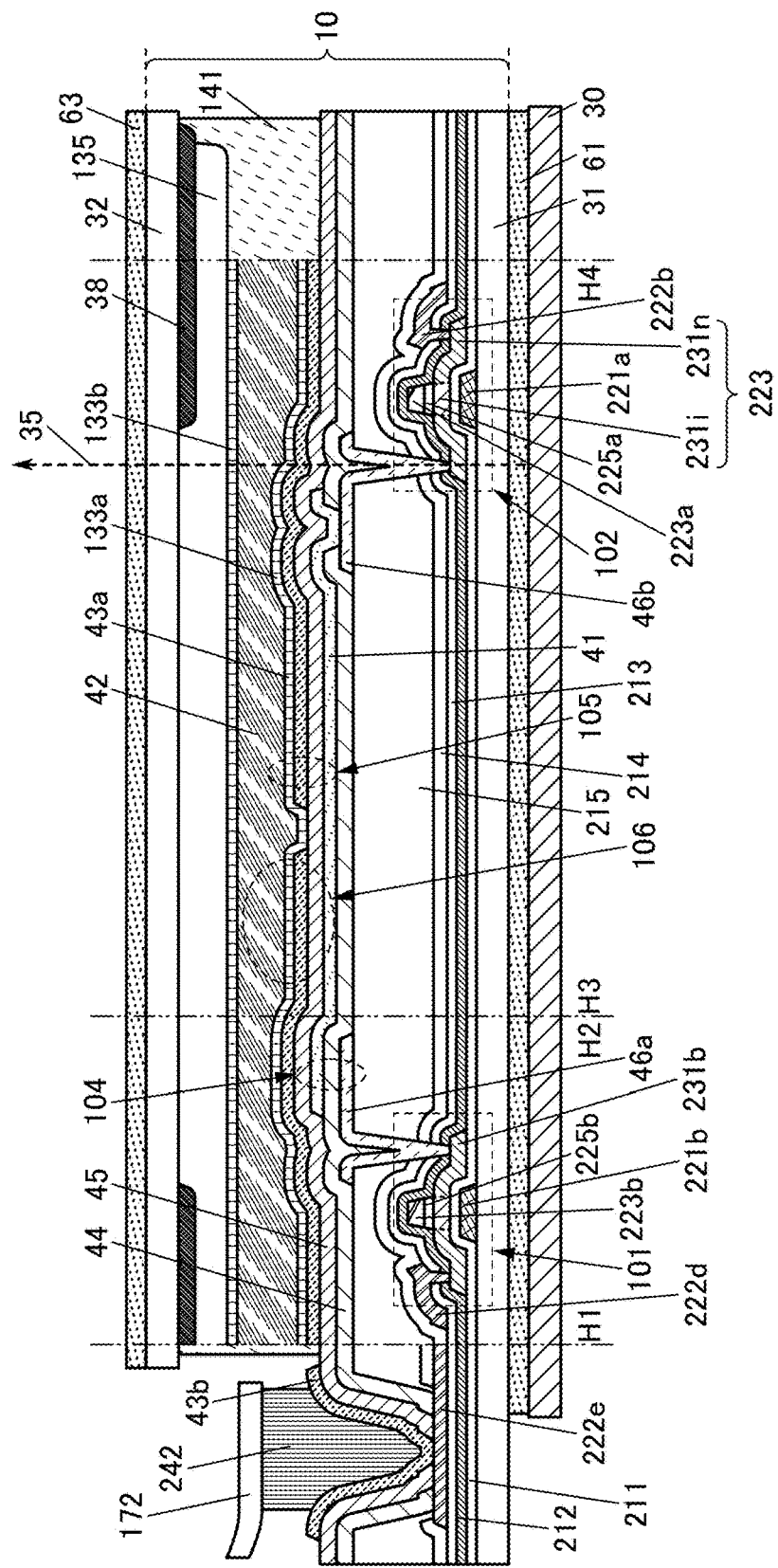
FIG. 24 A cross-sectional view illustrating an example of a display device.

FIG. 24 is a cross-sectional view of the display module. The cross-sectional structure of the pixel in FIG. 24 corresponds to cross-sectional views taken along dashed-dotted line H1-H2 and dashed-dotted line H3-H4 in FIG. 23(A).

The display module illustrated in FIG. 24 includes the display device 10, the polarizing plate 61, the polarizing plate 63, the backlight unit 30, the FPC 172, and the like.

The display device 10 illustrated in FIG. 24 can display a color image using the field-sequential driving method. Thus, the display device 10 illustrated in FIG. 24 does not include a coloring layer such as a color filter. Therefore, the transmittance of the pixel can be improved.

The display device 10 includes the substrate 31, the substrate 32, the transistor 102, the conductive layer 46a, the conductive layer 46b, the insulating layer 44, the insulating layer 45, the pixel electrode 41, the liquid crystal layer 42, the common electrode 43a, the conductive layer 43b, the conductive layer 222e, the alignment film 133a, the alignment film 133b, the adhesive layer 141, the overcoat 135, the light-blocking layer 38, and the like.

The transistor 101 and the transistor 102 are positioned over the substrate 31. The structures of the transistor 101 and the transistor 102 are similar to those in FIG. 16(A).

The conductive layer 46b is positioned over the insulating layer 215, the insulating layer 44 is positioned over the conductive layer 46b, and the pixel electrode 41 is positioned over the insulating layer 44. The pixel electrode 41 is electrically connected to one of the low-resistance regions 231n of the semiconductor layer 231a. Specifically, one of the low-resistance regions 231n is in contact with the conductive layer 46b, and the conductive layer 46b is in contact with pixel electrode 41. The other of the low-resistance region 231n of the semiconductor layer 231a is electrically connected to the conductive layer 222b functioning as a signal line.

The light 35 illustrated in FIG. 24 transmits a connection portion of the conductive layer 46b and the low-resistance region 231n, and is emitted to the outside of the display module. Thus, the aperture ratio of the pixel can be increased, and the power consumption of the display device can be reduced.

The FPC 172 is electrically connected to the conductive layer 222e. The conductive layer 222e can be formed in the same process and the same material as those for the conductive layer 222b and the conductive layer 222d.

As described above, the display device of one embodiment of the present invention includes, in the pixel, two capacitors that transmit visible light and a region where they overlap with each other; therefore, the pixel can achieve both a high aperture ratio and high storage capacity.

In the display device of one embodiment of the present invention, since the connection portion where the transistor and the pixel electrode are electrically connected to each other has a function of transmitting visible light, the aperture ratio of the pixel can be further increased.

Since the display device of one embodiment of the present invention has a function of adding correction signals to an image signal, a liquid crystal element can be driven at higher voltage than the output voltage of the source driver.

Furthermore, since the display device of one embodiment of the present invention has a function of performing display by the field-sequential driving method, the aperture ratio of the pixel can be further increased, and since a coloring layer such as a color filter can be unnecessary, the transmittance of the pixels can be increased.

This embodiment can be combined with the other embodiments as appropriate.

Embodiment 3

In this embodiment, electronic devices of one embodiment of the present invention are described with reference to FIG. 25 and FIG. 26.

An electronic device in this embodiment is provided with the display device of one embodiment of the present invention in a display portion. Therefore, the display portion of the electronic device can display a high-quality image. Moreover, display can be performed with high reliability in a wide temperature range.

The display unit of the electronic device of this embodiment can display an image with a resolution of, for example, full high definition, 2K, 4K, 8K, 16K, or more. In addition, the screen size of the display unit can be 20 inches diagonal or more, 30 inches diagonal or more, 50 inches diagonal or more, 60 inches diagonal or more, or 70 inches diagonal or more.

Examples of the electronic devices in which the display device of one embodiment of the present invention can be used include a digital camera, a digital video camera, a digital photo frame, a mobile phone, a portable game console, a portable information terminal, and an audio reproducing device, in addition to electronic devices with a relatively large screen, such as a television device, a desktop or notebook personal computer, a monitor for a computer or the like, digital signage, and a large game machine such as a pachinko machine. Furthermore, the display device of one embodiment of the present invention can be suitably used in portable electronic devices, wearable electronic devices (wearable devices), VR (Virtual Reality) devices, AR (Augmented Reality) devices, and the like.

The electronic device of one embodiment of the present invention may include a secondary battery, and it is preferable that the secondary battery be capable of being charged by contactless power transmission.

Examples of the secondary battery include a lithium ion secondary battery such as a lithium polymer battery using a gel electrolyte (lithium ion polymer battery), a nickel-hydride battery, a nickel-cadmium battery, an organic radical battery, a lead-acid battery, an air secondary battery, a nickel-zinc battery, and a silver-zinc battery.

The electronic device of one embodiment of the present invention may include an antenna. When a signal is received by the antenna, the electronic device can display a video, data, or the like on the display portion. When the electronic device includes the antenna and a secondary battery, the antenna may be used for contactless power transmission.

The electronic device of one embodiment of the present invention may include a sensor (a sensor having a function of measuring force, displacement, position, speed, acceleration, angular velocity, rotational frequency, distance, light, liquid, magnetism, temperature, a chemical substance, sound, time, hardness, an electric field, current, voltage, power, radioactive rays, flow rate, humidity, a gradient, oscillation, odor, or infrared rays).

The electronic device of one embodiment of the present invention can have a variety of functions. For example, the electronic device can have a function of displaying a variety of data (a still image, a moving image, a text image, and the like) on the display portion, a touch panel function, a function of displaying a calendar, date, time, and the like, a function of executing a variety of software (programs), a wireless communication function, and a function of reading out a program or data stored in a recording medium.

Furthermore, an electronic device including a plurality of display units can have a function of displaying image data mainly on one display unit while displaying text data mainly on another display unit, a function of displaying a three-dimensional image by displaying images on a plurality of display units with a parallax taken into account, or the like. Furthermore, an electronic device including an image receiving portion can have a function of taking a still image or a moving image, a function of automatically or manually correcting a taken image, a function of storing a taken image in a recording medium (an external recording medium or a recording medium incorporated in the electronic device), a function of displaying a taken image on a display unit, or the like. Note that functions of the electronic device of one embodiment of the present invention are not limited thereto, and the electronic devices can have a variety of functions.

Figure 25A:
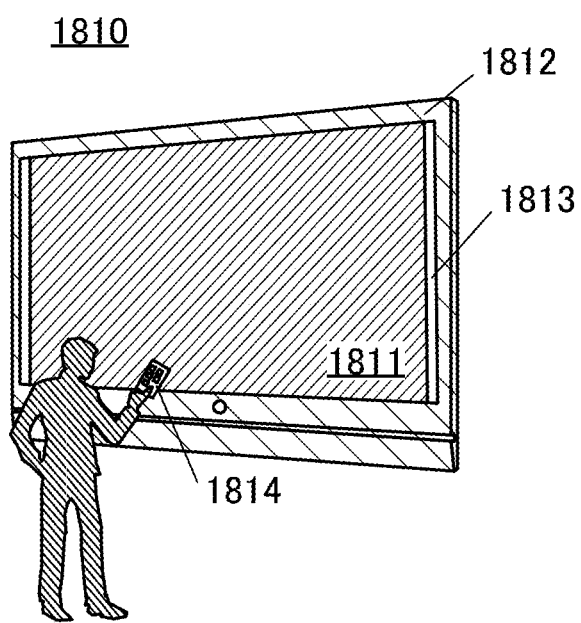
FIG. 25 Views illustrating examples of electronic devices.

FIG. 25(A) illustrates a television device 1810. The television device 1810 includes a display unit 1811, a housing 1812, a speaker 1813, and the like. Furthermore, the digital signage can include an LED lamp, operation keys (including a power switch or an operation switch), a connection terminal, a variety of sensors, a microphone, and the like.

The television device 1810 can be controlled with a remote controller 1814.

As airwaves the television device 1810 can receive, ground waves, waves transmitted from a satellite, and the like can be given. The example of the airwaves also include analog broadcasting, digital broadcasting, image-sound-only broadcasting, and sound-only broadcasting. For example, airwaves transmitted in a certain frequency band in a UHF band (approximately 300 MHz to 3 GHz) or a VHF band (30 MHz to 300 MHz) can be received. When a plurality of pieces of data received in a plurality of frequency bands is used, the transfer rate can be increased and more information can be obtained. Accordingly, the display unit 1811 can display an image with a resolution higher than the full high definition. For example, an image with a resolution of 4K, 8K, 16K, or higher can be displayed.

A structure may be employed in which an image to be displayed on the display unit 1811 is generated using broadcasting data transmitted with a technology for transmitting data via a computer network such as the Internet, a LAN (Local Area Network), or Wi-Fi (registered trademark). In that case, the television device 1810 does not necessarily include a tuner.

Figure 25B:
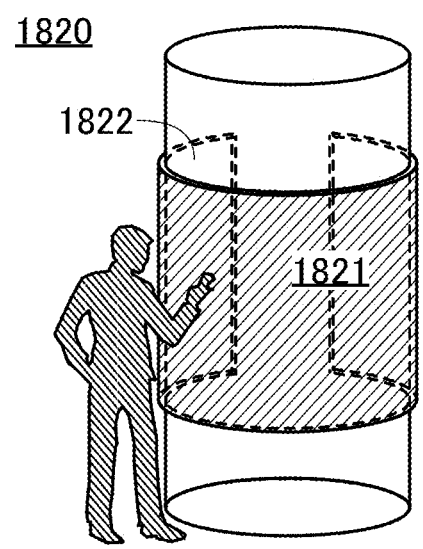

FIG. 25(B) illustrates a digital signage 1820 mounted on a cylindrical pillar 1822. The digital signage 1820 includes a display portion 1821.

The larger the display portion 1821 is, the more information the display portion 1821 can provide at a time. In addition, the larger the display portion 1821 is, the more the display portion 1821 attracts attention, so that the effectiveness of the advertisement can be increased, for example.

It is preferable to use a touch panel in the display portion 1821 because not only a still image or a moving image is displayed on the display portion 1821 but also users can operate intuitively. Moreover, for an application for providing information such as route information or traffic information, usability can be enhanced by intuitive operation.

Figure 25C:
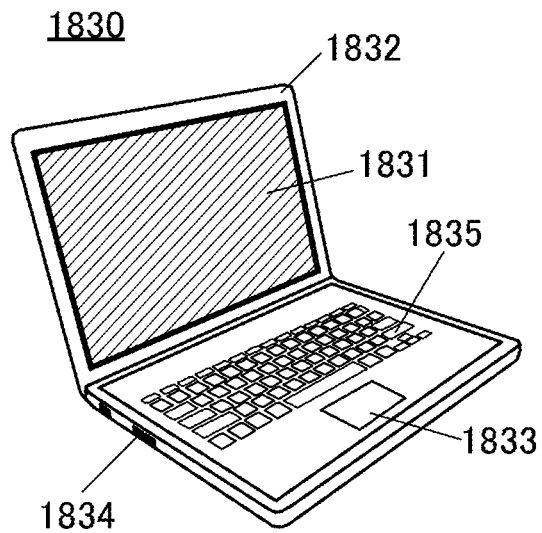

FIG. 25(C) illustrates a notebook personal computer 1830. The personal computer 1830 includes a display unit 1831, a housing 1832, a touch pad 1833, a connection port 1834, and the like.

The touch pad 1833 functions as an input means such as a pointing device or a pen tablet and can be controlled with a finger, a stylus, or the like.

Furthermore, a display element is incorporated in the touch pad 1833. As illustrated in FIG. 25(C), when input keys 1835 are displayed on a surface of the touch pad 1833, the touch pad 1833 can be used as a keyboard. In that case, a vibration module may be incorporated in the touch pad 1833 so that sense of touch is achieved by vibration when the input keys 1835 are touched.

Figure 26A:
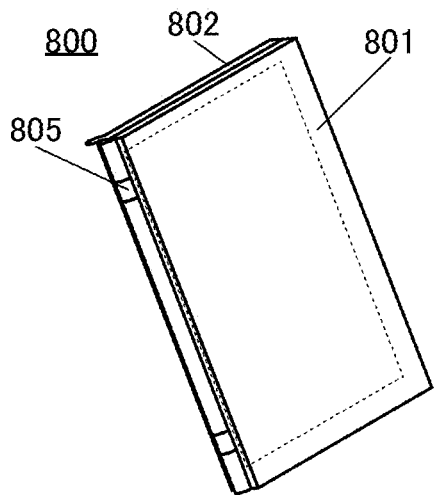
FIG. 26 Views illustrating examples of electronic devices.
Figure 26B:
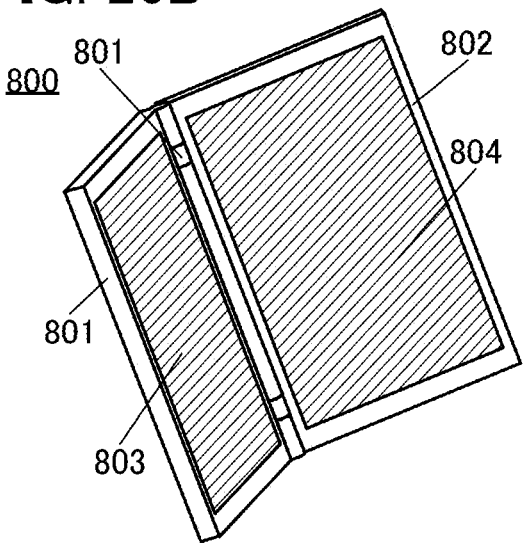

FIGS. 26(A) and 26(B) illustrate an example of a portable information terminal 800. The portable information terminal 800 includes a housing 801, a housing 802, a display portion 803, a display portion 804, a hinge portion 805, and the like.

The housing 801 and the housing 802 are joined together with the hinge portion 805. As for the portable information terminal 800, the housing 801 and the housing 802 can be opened as illustrated in FIG. 26(B) from a folded state illustrated in FIG. 26(A).

For example, text information can be displayed on the display portion 803 and the display portion 804; thus, the portable information terminal can be used as an e-book reader. Furthermore, still images and moving images can be displayed on the display portion 803 and the display portion 804.

The portable information terminal 800 can be folded when being carried, and thus is highly versatile.

Note that the housing 801 and the housing 802 may have a power button, an operation button, an external connection port, a speaker, a microphone, and the like.

Figure 26C:
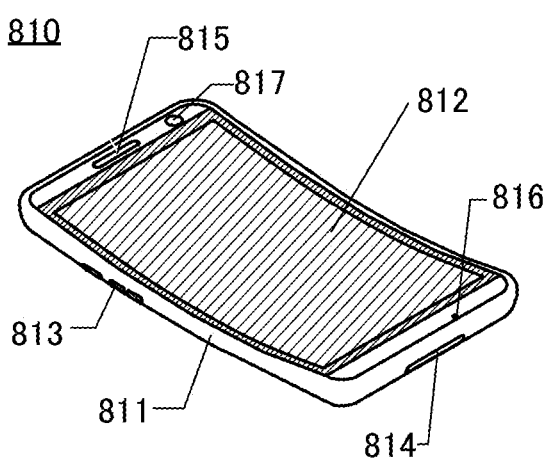

FIG. 26(C) illustrates an example of a portable information terminal. A portable information terminal 810 illustrated in FIG. 26(C) includes a housing 811, a display portion 812, an operation button 813, an external connection port 814, a speaker 815, a microphone 816, a camera 817, and the like.

The portable information terminal 810 includes a touch sensor in the display portion 812. All operations including making a call and inputting text can be performed by touch on the display portion 812 with a finger, a stylus, or the like.

By an operation with the operation button 813, power on/off operations and types of images displayed on the display portion 812 can be switched. For example, switching from a mail creation screen to a main menu screen can be performed.

When a detection device such as a gyroscope sensor or an acceleration sensor is provided inside the portable information terminal 810, the direction of display on the screen of the display portion 812 can be automatically changed by determining the orientation (horizontal or vertical) of the portable information terminal 810. Furthermore, the direction of display on the screen can be changed by touch on the display portion 812, operation with the operation button 813, sound input using the microphone 816, or the like.

The portable information terminal 810 has, for example, one or more functions selected from a telephone set, a notebook, an information browsing system, and the like. Specifically, the portable information terminal can be used as a smartphone. The portable information terminal 810 is capable of executing a variety of applications such as mobile phone calls, e-mailing, text viewing and writing, music replay, video replay, Internet communication, and games, for example.

Figure 26D:
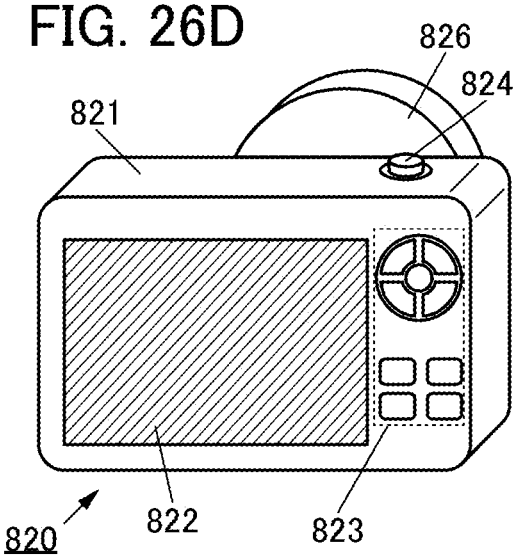

FIG. 26(D) illustrates an example of a camera. A camera 820 includes a housing 821, a display portion 822, operation buttons 823, a shutter button 824, and the like. Furthermore, a detachable lens 826 is attached to the camera 820.

Although the lens 826 of the camera 820 here is detachable from the housing 821 for replacement, the lens 826 may be integrated with the housing.

A still image or a moving image can be taken with the camera 820 at the press of the shutter button 824. In addition, the display portion 822 has a function of a touch panel, and images can also be taken by the touch on the display portion 822.

Note that a stroboscope, a viewfinder, or the like can be additionally attached to the camera 820. Alternatively, these may be incorporated into the housing 821.

Figure 26E:
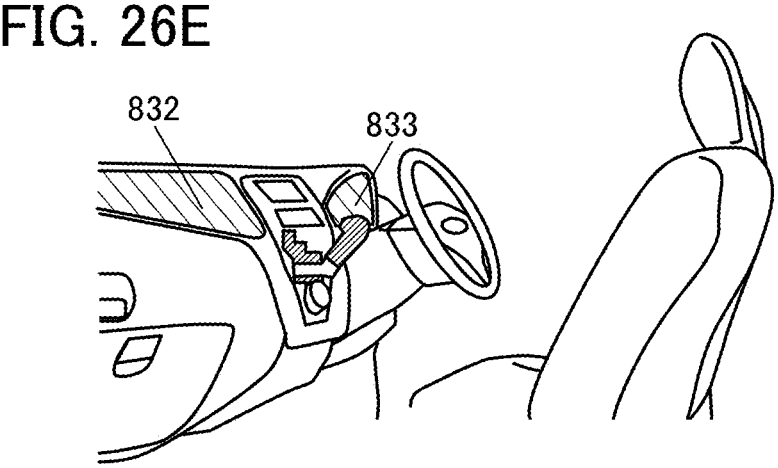

FIG. 26(E) illustrates an example in which the display device of one embodiment of the present invention is used as an in-vehicle display. A display portion 832 and a display portion 833 can provide various kinds of information by displaying navigation information, a speedometer, a tachometer, a mileage, a fuel meter, a gearshift indicator, air-conditioning settings, and the like. The content or layout of the display can be changed as appropriate in accordance with the preference of a user. The display device of one embodiment of the present invention can be used in a wide temperature range, so that display can be performed with high reliability in both low temperature environment and high temperature environment. Thus, when the display device of one embodiment of the present invention is used as an in-vehicle display, the safety of driving can be increased.

As described above, electronic devices and lighting devices can be obtained by application of the light-emitting display device of one embodiment of the present invention. The display device has a remarkably wide application range, and can be used in electronic devices in a variety of fields.

This embodiment can be combined with the other embodiments as appropriate.

Example

In this example, the results of fabricating the display device of one embodiment of the present invention are described.

The display device fabricated in this example is an FFS-mode liquid crystal display device having a screen size of 10.2 inches diagonal, an effective pixel number of 720 (H)×RGB×1920 (V), a pixel size of 42 μm (H)×126 μm (V), a resolution of 201 ppi, and an aperture ratio of 46.2%.

A gate driver is incorporated, and an external IC is used for a source driver. The frame frequency is 60 Hz.

The configuration of the pixel circuit corresponds to the circuit diagram of the pixel 11$b$ illustrated in FIG. 8(A). The display device of this example can perform display with addition of a correction signal to an image signal (see FIG. 8(B)). The top surface layout of the pixel corresponds to that in FIGS. 9(A) to 9(C). The cross-sectional structure of the pixel corresponds to the structure illustrated in FIG. 10.

A liquid crystal material whose saturated voltage is approximately 10 V was used as the liquid crystal material. Although the saturation voltage can be about 5 V in the liquid crystal display device of the FFS mode, in this example, the liquid crystal material was selected such that the driving voltage of the liquid crystal element becomes high in order to confirm if high voltage can be applied to the liquid crystal element by addition of the correction signal to the image signal.

Figure 27A:
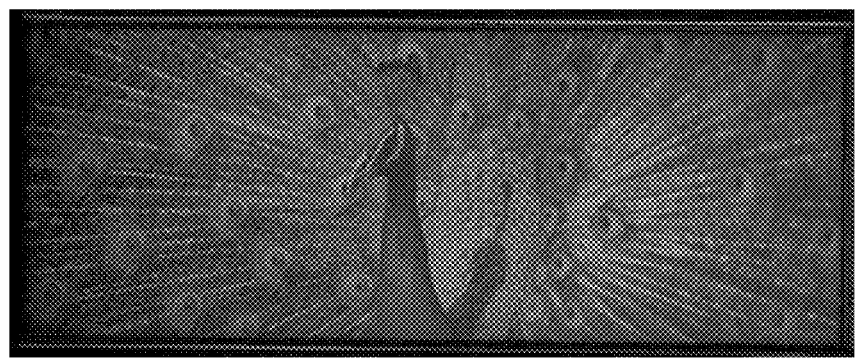
FIG. 27 Photographs showing display results of a display device in Example.
Figure 27B:
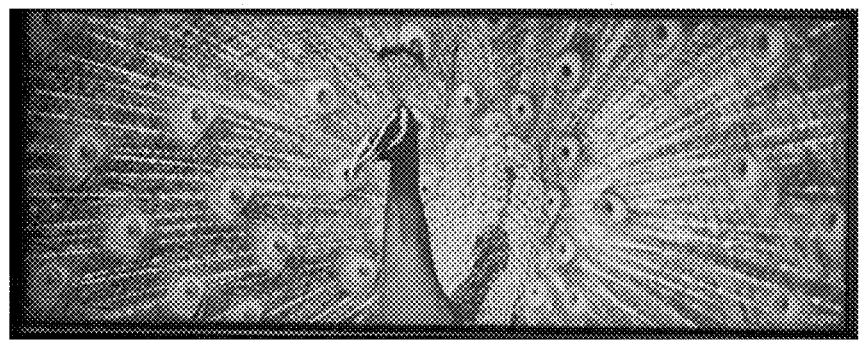

FIG. 27(A) shows the display result of the case where the correction signal is not added and display is performed using only image signals. FIG. 27(B) shows the display result of the case where the correction signal is added to the image signal. The display in FIG. 27(B) is brighter than that in FIG. 27(A). It can be said that a sufficient voltage is not applied to the liquid crystal elements using only image signals but a higher voltage is applied to the liquid crystal element by addition of the correction signal, so that the display becomes brighter. It is found from FIGS. 27(A) and 27(B) that display can be performed with higher luminance by addition of a high voltage to the liquid crystal element when the correction signal is added to the image signal, as compared with the case of using only the image signal.

In addition, in the case where the correction signal was not added and display was performed using only the image signal, the luminance of white display was 76 cd/m$^2$ and the contrast was 35:1. On the other hand, in the case where the correction signal was added to the image signal and display was performed, the luminance of white display was 344 cd/m$^2$ and the contrast was 114:1. This means that the contrast of the display device having high driving voltage can be increased by addition of the correction signal to the image signal.

REFERENCE NUMERALS

10: display device, 11: pixel, 11$a$: pixel, 11$b$: pixel, 30: backlight unit, 31: substrate, 32: substrate, 35: light, 38: light-blocking layer, 39: coloring layer, 41: pixel electrode, 42: liquid crystal layer, 43: common electrode, 43$a$: common electrode, 43$b$: conductive layer, 44: insulating layer, 45: insulating layer, 46: conductive layer, 46$a$: conductive layer, 46$b$: conductive layer, 46$c$: conductive layer, 61: polarizing plate, 63: polarizing plate, 71: connection portion, 72: connection portion, 73: connection portion, 74: connection portion, 100: display region, 101: transistor, 102: transistor, 104: capacitor, 105: capacitor, 106: liquid crystal element, 121: wiring, 122: wiring, 124: wiring, 125: wiring, 126: wiring, 133$a$: alignment film, 133$b$: alignment film, 135: overcoat, 141: adhesive layer, 172: FPC, 211: gate insulating layer, 212: insulating layer, 213: insulating layer, 214: insulating layer, 215: insulating layer, 217: insulating layer, 218: insulating layer, 221: gate, 221$a$: gate, 221$b$: gate, 222$a$: conductive layer, 222$b$: conductive layer, 222$c$: conductive layer, 222$d$: conductive layer, 222$e$: conductive layer, 222$f$: conductive layer, 222$g$: conductive layer, 223: gate, 223$a$: gate, 223$b$: gate, 225: gate insulating layer, 225$a$: gate insulating layer, 225$b$: gate insulating layer, 231: semiconductor layer, 231$a$: semiconductor layer, 231$b$: semiconductor layer, 231$i$: channel formation region, 231$n$: low-resistance region, 233: gate, 235: gate insulating layer, 242: connector, 800: portable information terminal, 801: housing, 802: housing, 803: display portion, 804: display portion, 805: hinge portion, 810: portable information terminal, 811: housing, 812: display portion, 813: operation button, 814: external connection port, 815: speaker, 816: microphone, 817: camera, 820: camera, 821: housing, 822: display portion, 823: operation button, 824: shutter button, 826: lens, 832: display portion, 833: display portion, 1810: television device, 1811: display portion, 1812: housing, 1813: speaker, 1814: remote controller, 1820: digital signage, 1821: display portion, 1822: pillar, 1830: personal computer, 1831: display portion, 1832: housing, 1833: touch pad, 1834: connection port, 1835: input key

The invention claimed is:

1. A display device comprising:
    a pixel comprising a first transistor comprising a semiconductor layer containing silicon, and a second transistor;
    a first insulating layer over a channel formation region of the first transistor;
    a first conductive layer over the first insulating layer;
    a second insulating layer over the first transistor, the second transistor, the first insulating layer, and the first conductive layer;
    a pixel electrode over the second insulating layer;
    a third insulating layer over the pixel electrode;
    a common electrode over the third insulating layer; and
    a liquid crystal layer over the common electrode,
    wherein the common electrode comprises a region overlapping with the first conductive layer with the pixel electrode therebetween,
    wherein in a first connection portion, the pixel electrode is electrically connected to the first transistor,
    wherein in a second connection portion, the first conductive layer is electrically connected to the second transistor,
    wherein each of the first conductive layer, the pixel electrode, and the common electrode is configured to transmit visible light, and
    wherein the first conductive layer contains one or more kinds selected from indium, zinc, and tin.

2. The display device according to claim 1, further comprising a second conductive layer over the first insulating layer,
    wherein the first conductive layer and the second conductive layer comprise the same material, and
    wherein in the first connection portion, the pixel electrode comprises a region in contact with the second conductive layer and the second conductive layer comprises a region in contact with one of a source and a drain of the first transistor.

3. The display device according to claim 1,
    wherein an area of a region where the pixel electrode and the first conductive layer overlap with each other is larger than an area of a region where the pixel electrode and the common electrode overlap with each other.

4. The display device according to claim 1,
    wherein a thickness of the second insulating layer between the first conductive layer and the pixel electrode is smaller than a thickness of the third insulating layer between the pixel electrode and the common electrode.

5. A display module comprising:
    the display device according to claim 1; and
    at least one of a connector and an integrated circuit.

6. An electronic device comprising:
    the display module according to claim 5; and
    at least one of an antenna, a battery, a housing, a camera, a speaker, a microphone, and an operation button.

* * * * *